United States Patent [19]
Ando et al.

[11] Patent Number: 5,965,080
[45] Date of Patent: Oct. 12, 1999

[54] METHOD OF MANUFACTURING STARCH-BASED BIODEGRADABLE MOLDED OBJECTS

[75] Inventors: Sadamasa Ando, Minoo; Taizo Karasawa, Ibaraki; Toshitaka Haruta, Hirakata; Akio Ozasa, Kyoto; Takayuki Kurisaka, Yawata; Tsutomu Oowada; Shinji Tanaka, both of Takatsuki, all of Japan

[73] Assignee: Nissei Kabushiki Kaisha, Osaka, Japan

[21] Appl. No.: 09/117,689

[22] PCT Filed: Dec. 1, 1997

[86] PCT No.: PCT/JP97/04376

§ 371 Date: Aug. 3, 1998

§ 102(e) Date: Aug. 3, 1998

[87] PCT Pub. No.: WO98/24609

PCT Pub. Date: Jun. 11, 1998

[30] Foreign Application Priority Data

Dec. 3, 1996 [JP] Japan .................................. 8-323185
Nov. 21, 1997 [JP] Japan .................................. 9-321739

[51] Int. Cl.[6] ........................... B29C 44/02; B29C 44/06
[52] U.S. Cl. ........................... 264/404; 264/46.4; 264/51; 264/134; 264/402; 264/416
[58] Field of Search ................................. 264/402, 403, 264/404, 51, 415, 416, 46.4, 134; 425/812

[56] References Cited

U.S. PATENT DOCUMENTS

| | | | |
|---|---|---|---|
| 3,530,209 | 9/1970 | Ho | 264/403 |
| 4,481,159 | 11/1984 | Itoh | 264/403 |
| 5,281,383 | 1/1994 | Ueki et al. | 425/812 |
| 5,415,819 | 5/1995 | Tisack | 264/402 |
| 5,441,675 | 8/1995 | Souders | 264/402 |
| 5,591,491 | 1/1997 | Ando et al. | 264/51 |
| 5,602,188 | 2/1997 | Nakanishi | 264/51 |
| 5,639,518 | 6/1997 | Ando et al. | 264/450 |
| 5,762,972 | 6/1998 | Byon | 264/403 |

FOREIGN PATENT DOCUMENTS

| | | |
|---|---|---|
| 5-254565 | 10/1993 | Japan . |
| 7-60763 | 3/1995 | Japan . |
| 8-81565 | 3/1996 | Japan . |
| 8-300358 | 11/1996 | Japan . |

*Primary Examiner*—Allan R. Kuhns
*Attorney, Agent, or Firm*—Nixon & Vanderhye P.C.

[57] ABSTRACT

Using a metal mold (8) having an insulating section provided with vapor release sections, pressure outside the metal mold (8) is reduced, and heating is performed while releasing vapor produced thereby through the vapor release sections. This can prevent insulation breakdown caused by condensation of large amounts of vapor produced by materials during molding and heating of starch-based biodegradable molded objects by means of resistance heating, dielectric heating, etc.

30 Claims, 24 Drawing Sheets

FIG.13(a)
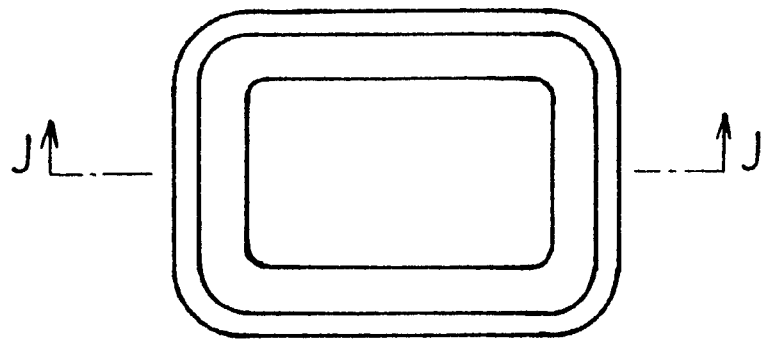
FIG.13(b)
FIG.14(a)
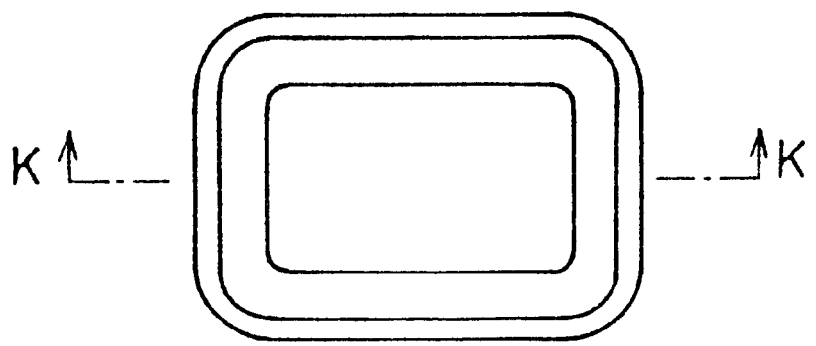
FIG.14(b)

L ↑ . .  ─                    . . ─ ↑ L

M ↑ . .  ─                    . . ─ ↑ M

FIG.17(a)         FIG.17(b)
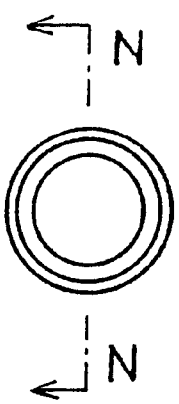   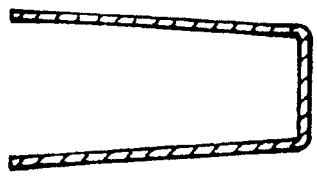
FIG.18
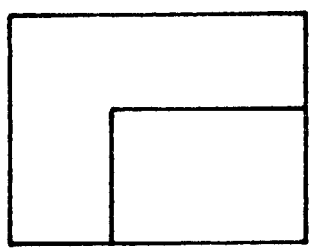   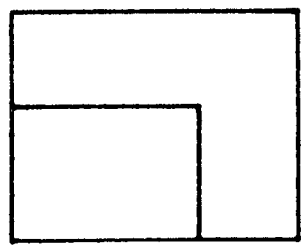
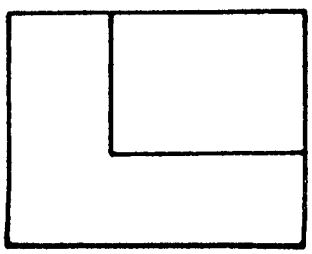

METHOD OF MANUFACTURING STARCH-BASED BIODEGRADABLE MOLDED OBJECTS

TECHNICAL FIELD

The present invention relates to a method of manufacturing starch-based biodegradable molded objects made of biodegradable materials including starch.

BACKGROUND ART

Examples of starch-based biodegradable molded objects include trays, cups, corner pads, etc. One method of manufacturing this kind of starch-based biodegradable molded object is the external heating method, in which the materials are placed into a mold previously heated to a predetermined temperature, and molding is performed using heat conductivity.

However, with methods of this kind, slow molding leads to low productivity, and unevenness in the temperature of the mold causes uneven baking, thus making it impossible to obtain a uniform consistency.

For this reason, in another method, alternating current is supplied to a metal mold, and internal heating is induced in the materials in the mold by electromagnetic wave heating, such as resistance heating or dielectric heating, thereby baking and molding the materials. In this case, the metal mold is divided into two mold halves, which are insulated from each other by an insulating material provided therebetween, and an alternating current electrode is connected to each mold half. Then alternating current is applied to the metal mold through these electrodes, and the materials in the mold are baked and molded by resistance heating or dielectric heating.

However, with the foregoing method using resistance heating or dielectric heating, during molding, liquid contained in the materials evaporates, producing a large amount of vapor, which condenses, causing insulation breakdown, and thus resistance heating or dielectric heating does not go well.

DISCLOSURE OF THE INVENTION

The object of the present invention is to provide a method of manufacturing starch-based biodegradable molded objects capable of preventing insulation breakdown due to condensation of a large amount of vapor evaporating from the materials during heating and molding of the molded objects by resistance heating or dielectric heating.

In order to attain the foregoing object, a first method of manufacturing starch-based biodegradable molded objects according to the present invention is a method of manufacturing molded objects by placing biodegradable materials containing starch in a mold made up of first and second conductive mold halves and an insulating section therebetween, and applying across both mold halves alternating current from an alternating current power source, thus heating and expanding the materials by means of resistance heating and/or dielectric heating, in which the insulating section of the mold is provided with a vapor release section, pressure is reduced outside the mold, and the heating is performed while releasing vapor produced thereby through the vapor release section.

A second method of manufacturing starch-based biodegradable molded objects is a method of manufacturing molded objects by placing biodegradable materials containing starch in a mold made up of first and second conductive mold halves and an insulating section therebetween, and applying across both mold halves alternating current from an alternating current power source, thus heating and expanding the materials by means of resistance heating and/or dielectric heating, in which the insulating section of the mold is provided with a vapor release section, the vapor release section is heated, and the heating of the materials is performed while releasing vapor produced thereby through the vapor release section.

With these methods, condensation of vapor can be prevented, and thus insulation breakdown can be prevented.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6(a) is a horizontal sectional view, FIG. 6(b) a side view, and FIG. 6(c) a cross-sectional view taken along line F—F of FIG. 6(a).

FIG. 7(a) is a horizontal sectional view, FIG. 7(b) a side view, and FIG. 7(c) a cross-sectional view taken along line G—G of FIG. 7(a).

FIGS. 13(a) and 13(b) show one structural example of a starch-based biodegradable molded object; FIG. 13(a) is a plan view, and FIG. 13(b) a cross-sectional view taken along line J—J of FIG. 13(a).

FIGS. 14(a) and 14(b) show another structural example of a starch-based biodegradable molded object; FIG. 14(a) is a plan view, and FIG. 14(b) a cross-sectional view taken along line K—K of FIG. 14(a).

FIG. 15(a)

Figure 15A:
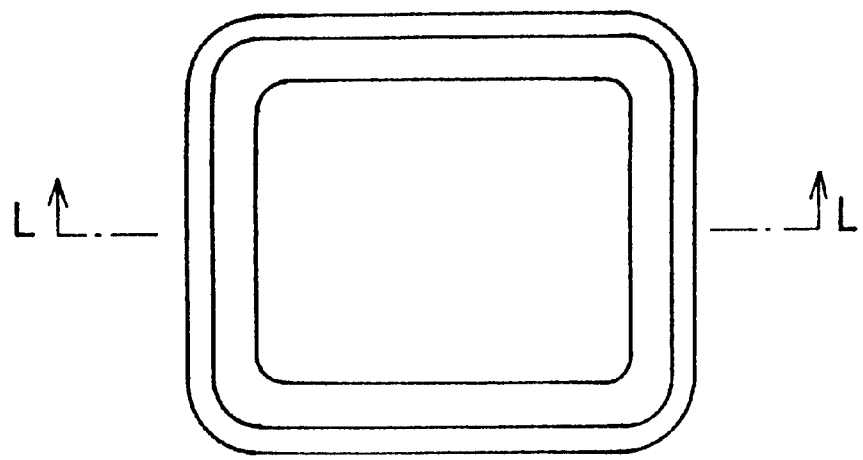
FIGS. 15(a) and 15(b) show a further structural example of a starch-based biodegradable molded object.
Figure 15B:

is a plan view, and FIG. 15(b) a cross-sectional view taken along line L—L of FIG. 15(a).

Figure 16A:
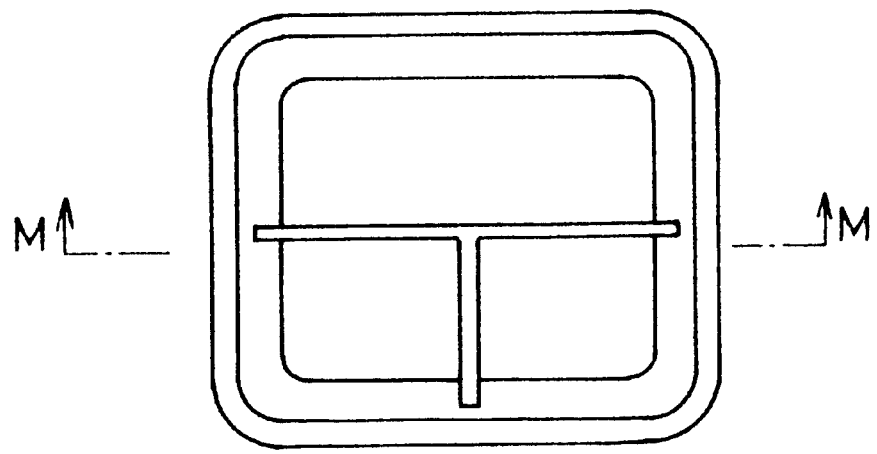
Figure 16B:

FIGS. 16(a) and 16(b) show a further structural example of a starch-based biodegradable molded object; FIG. 16(a) is a plan view, and FIG. 16(b) a cross-sectional view taken along line M—M of FIG. 16(a).

FIGS. 17(a) and 17(b) show a further structural example of a starch-based biodegradable molded object; FIG. 17(a) is a plan view, and FIG. 17(b) a cross-sectional view taken along line N—N of FIG. 17(a).

FIG. 18 is a plan view showing a further structural example of a starch-based biodegradable molded object.

Figure 19:
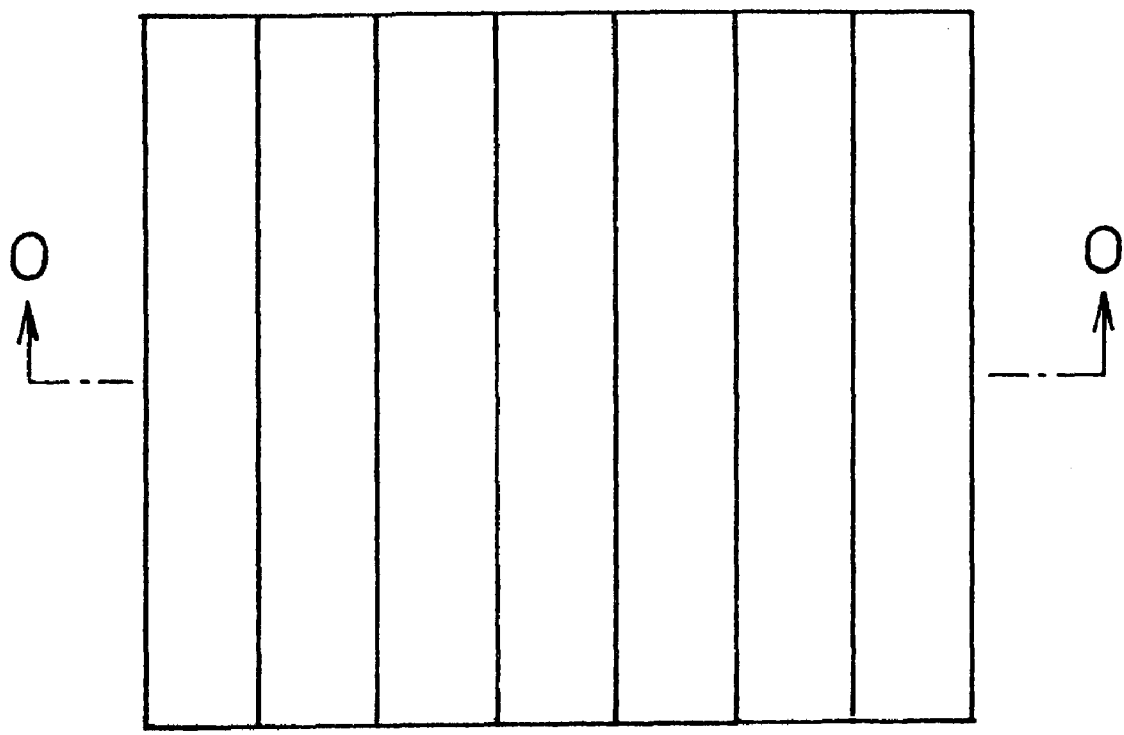
Figure 19B:
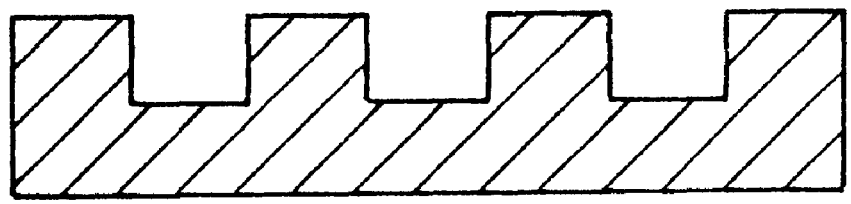

FIGS. 19(a) and 19(b) show a further structural example of a starch-based biodegradable molded object; FIG. 19(a) is a plan view, and FIG. 19(b) a cross-sectional view taken along line O—O of FIG. 19(a).

Figure 20:
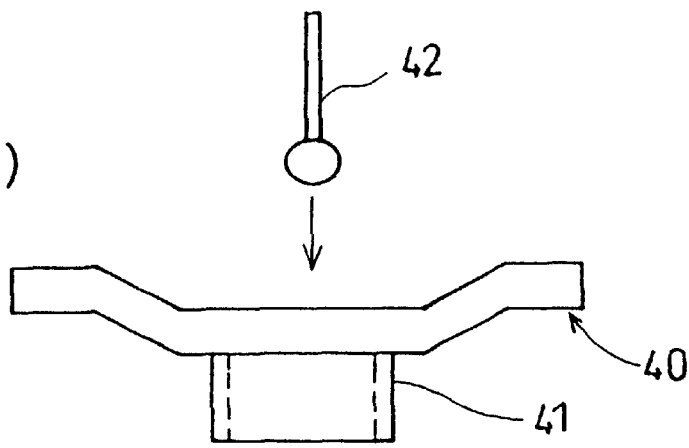
Figure 20B:
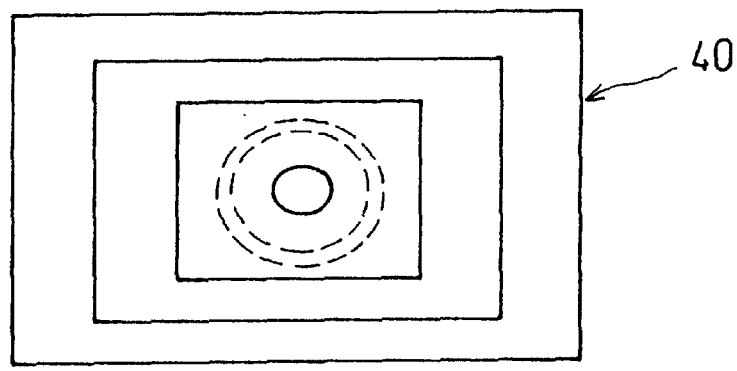

FIGS. 20(a) and 20(b) are explanatory drawings showing one example of a method of measuring the strength of a starch-based biodegradable molded object.

Figure 21A:
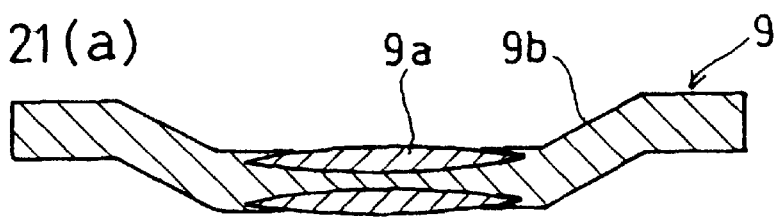
Figure 21B:
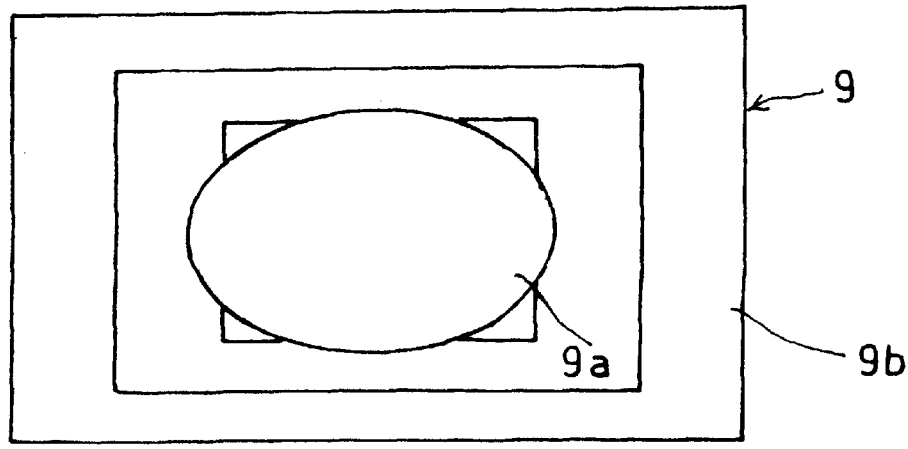

FIGS. 21(a) and 21(b) show one example of the consistency of a starch-based biodegradable molded object; FIG. 21(a) is a cross-sectional view, and FIG. 21(b) a plan view.

Figure 22:
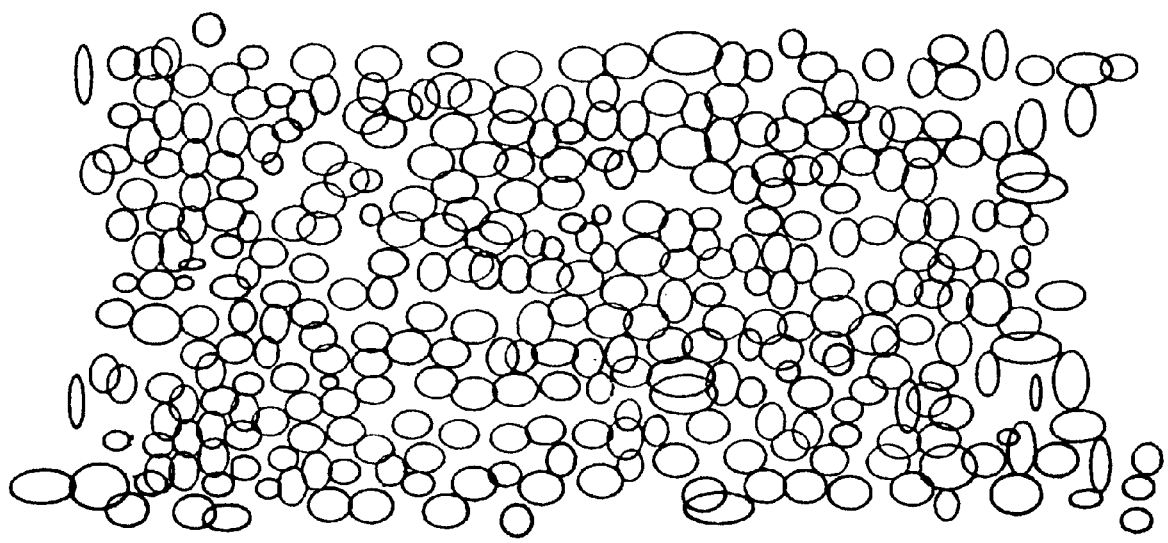

FIG. 22 is an explanatory drawing showing the state of a cross-section of a starch-based biodegradable molded object manufactured by internal heating.

Figure 23:
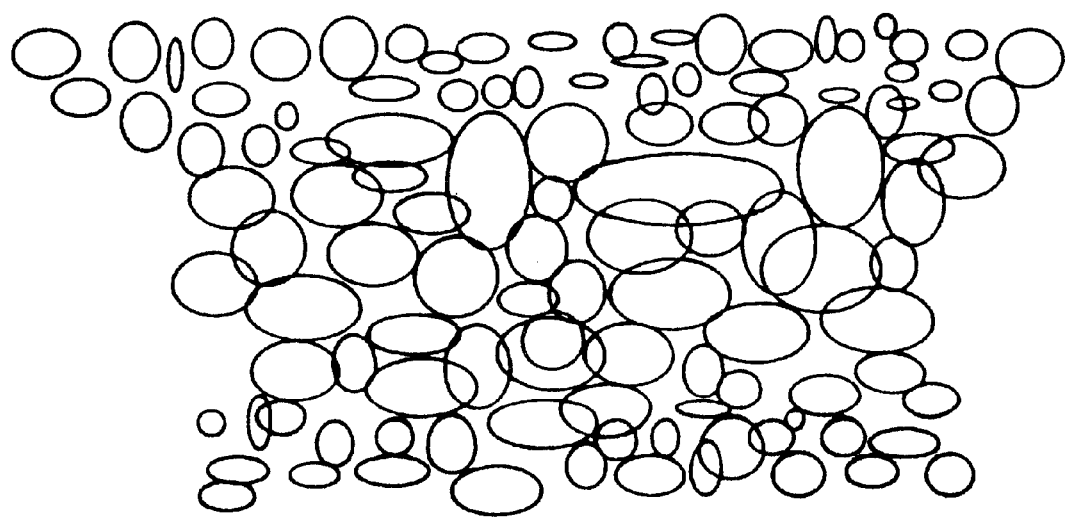

FIG. 23 is an explanatory drawing showing the state of a cross-section of a starch-based biodegradable molded object manufactured by external heating.

Figure 24:
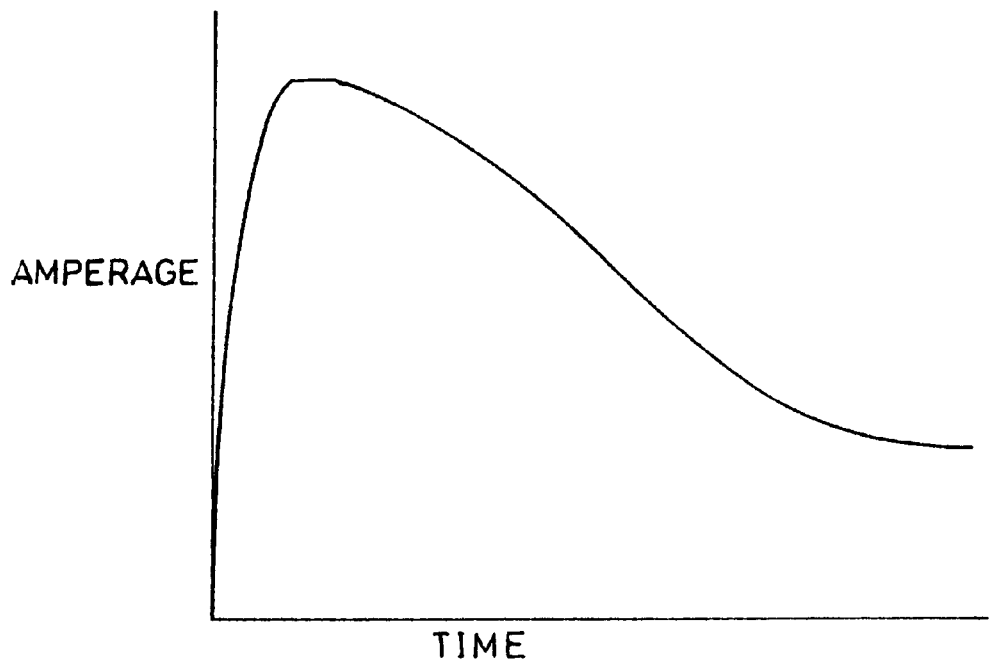

FIG. 24 is a graph showing the relationship between amperage and heating time of starch-based biodegradable molded objects.

Figure 25:
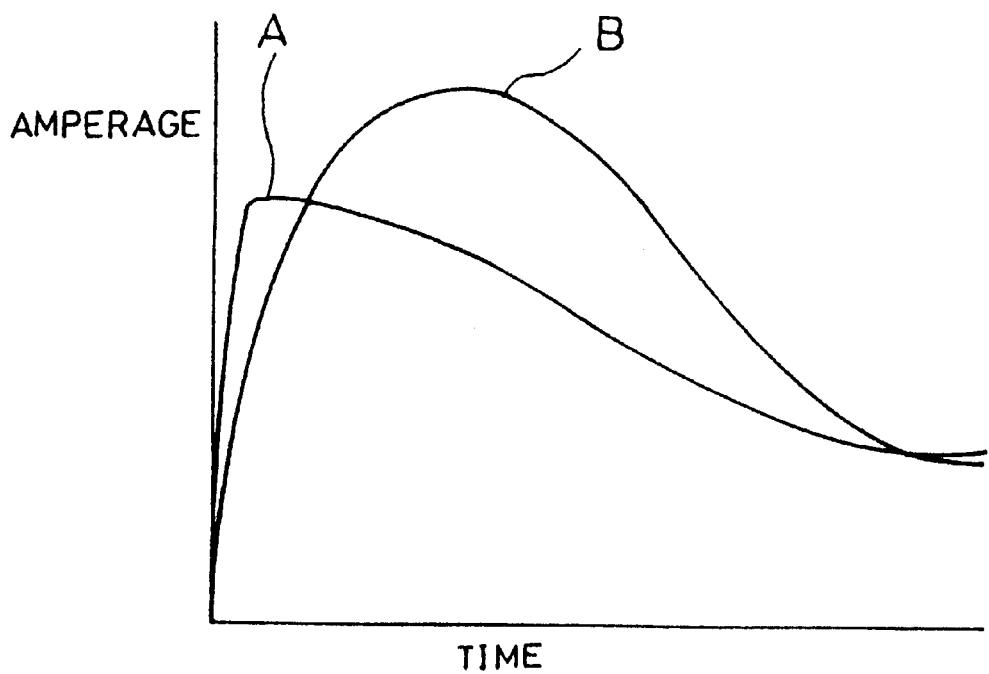

FIG. 25 is a graph showing the relationship between amperage and heating time of starch-based biodegradable molded objects.

Figure 26:
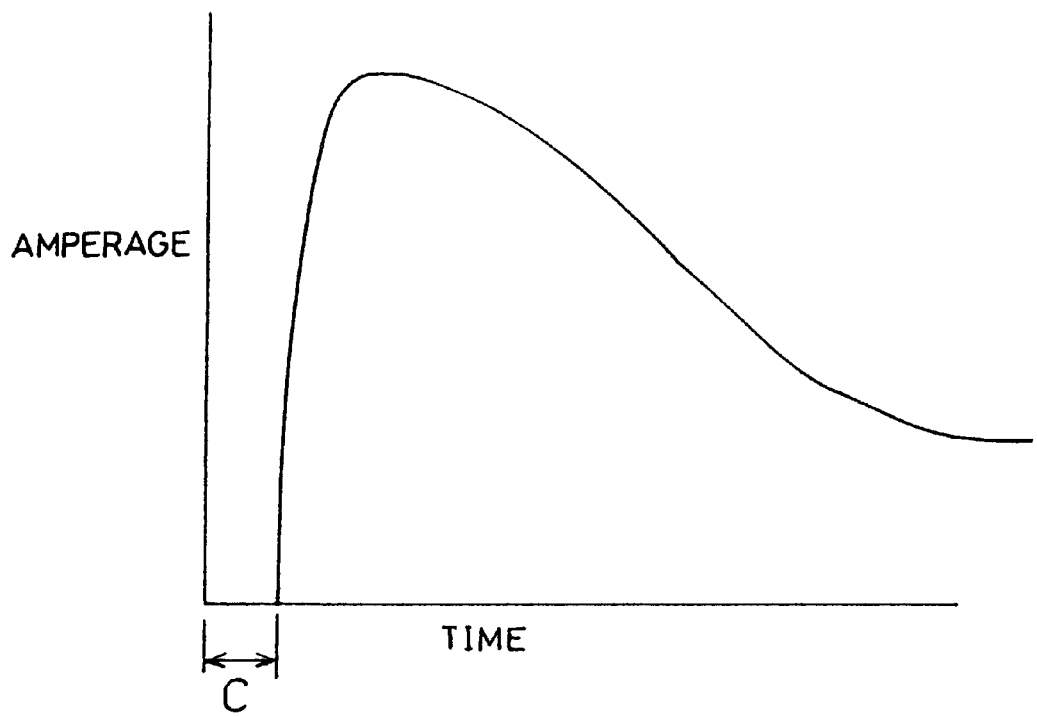

FIG. 26 is a graph showing the relationship between amperage and heating time of starch-based biodegradable molded objects.

Figure 27:
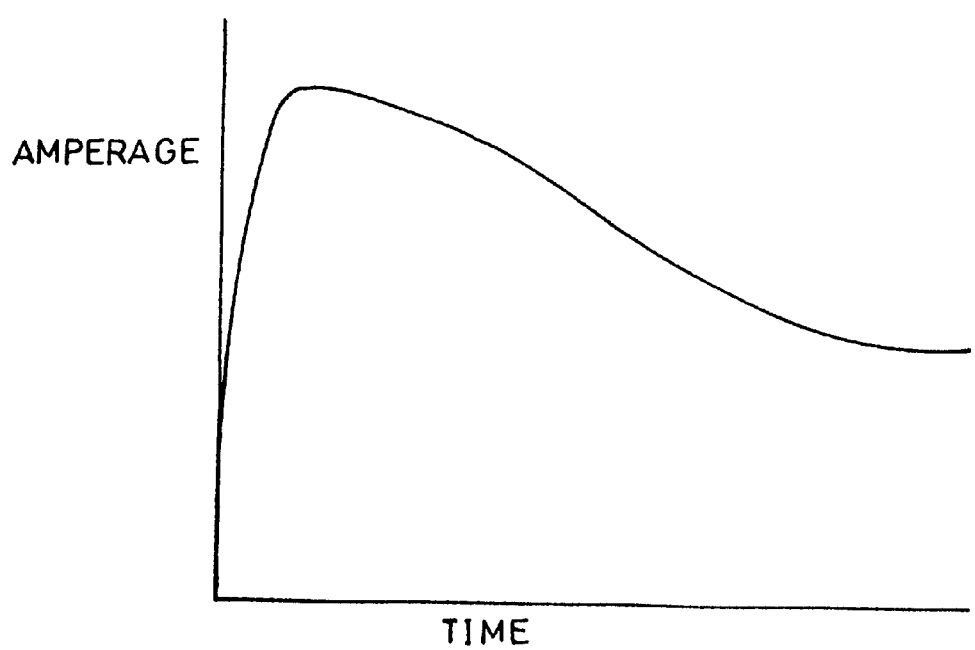

FIG. 27 is a graph showing the relationship between amperage and heating time of starch-based biodegradable molded objects.

Figure 28:
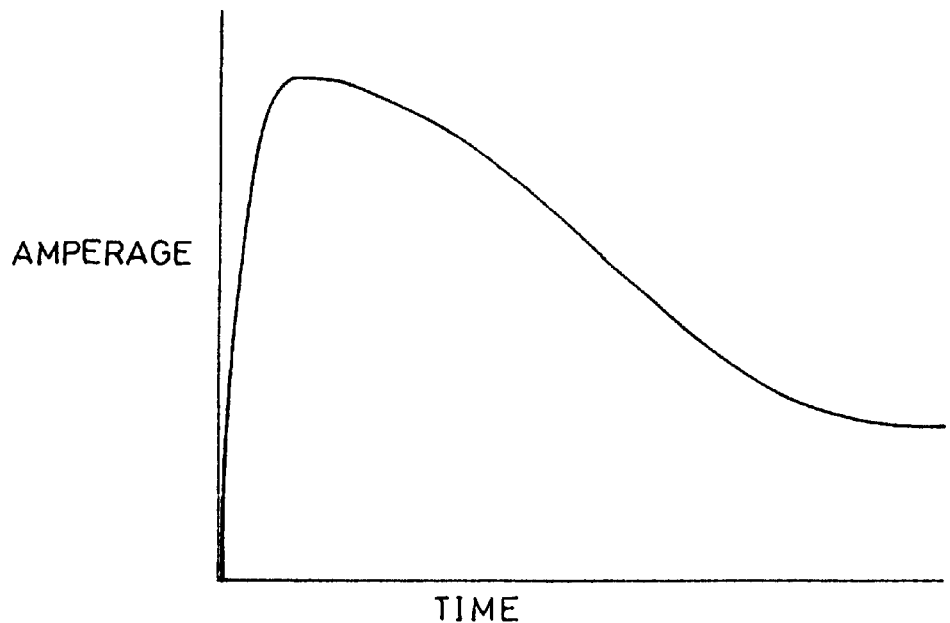

FIG. 28 is a graph showing the relationship between amperage and heating time of starch-based biodegradable molded objects.

Figure 29:
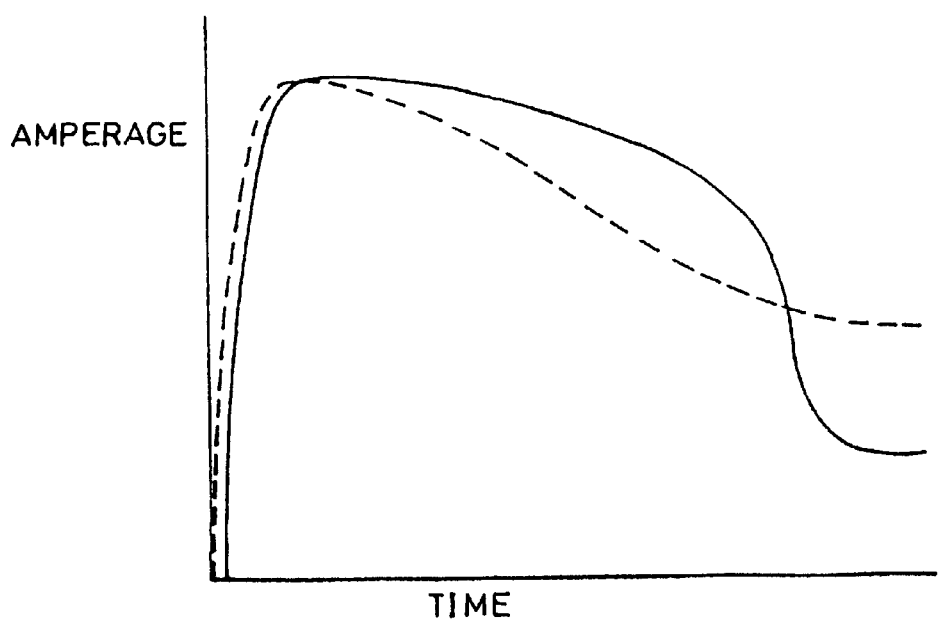

FIG. 29 is a graph showing the relationship between amperage and heating time of starch-based biodegradable molded objects.

Figure 30:
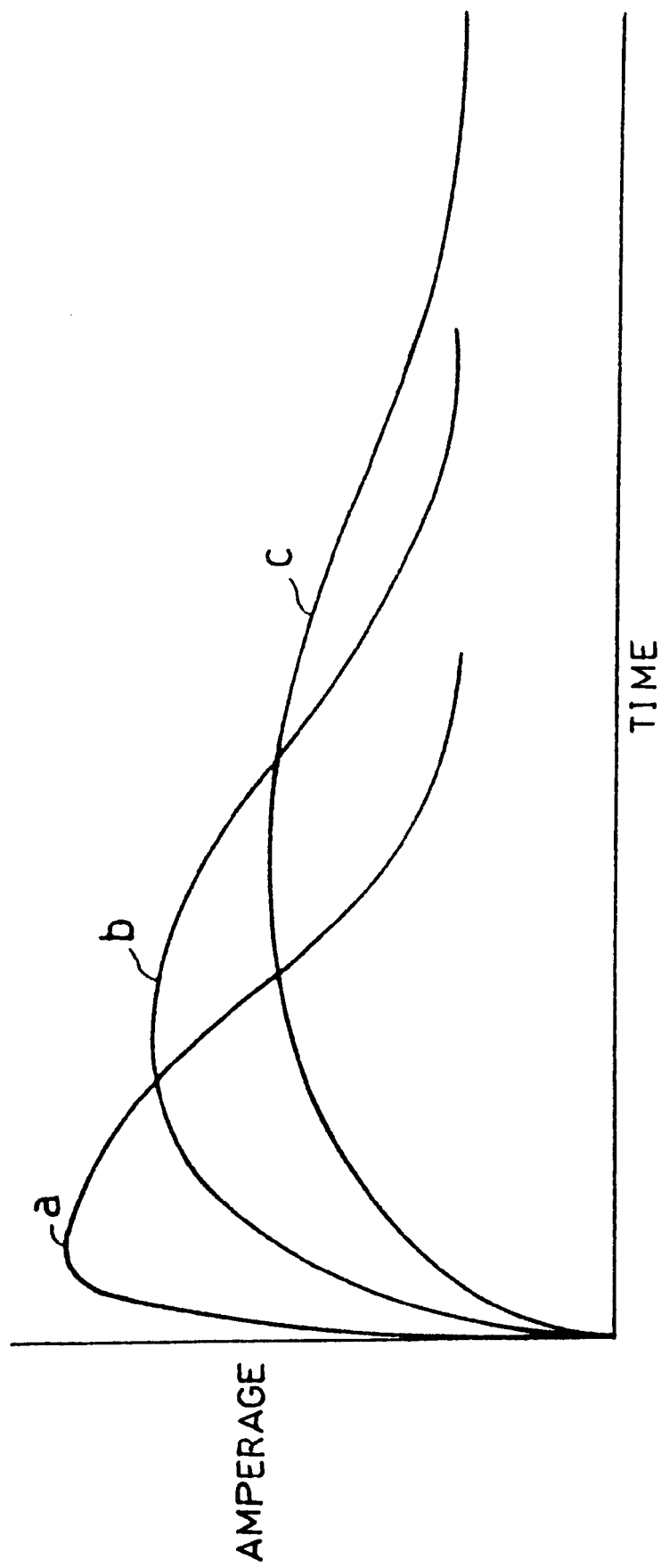

FIG. 30 is a graph showing the relationship between amperage and heating time of starch-based biodegradable molded objects.

Figure 31:
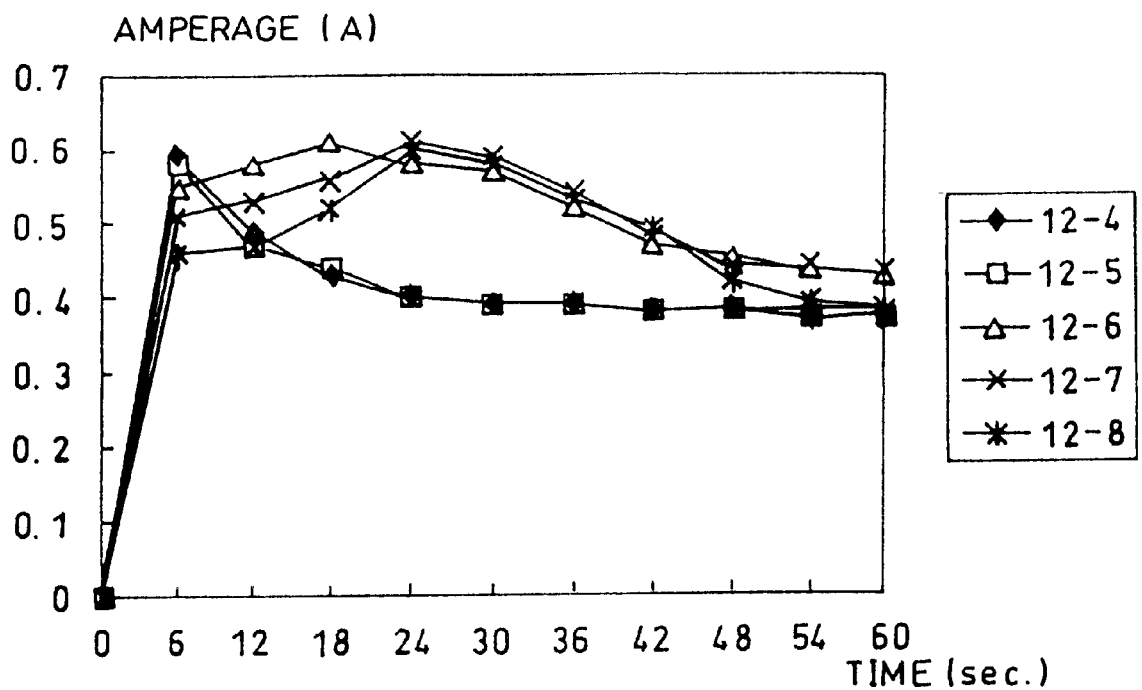

FIG. 31 is a graph showing the relationship between amperage and heating time of starch-based biodegradable molded objects.

Figure 32:
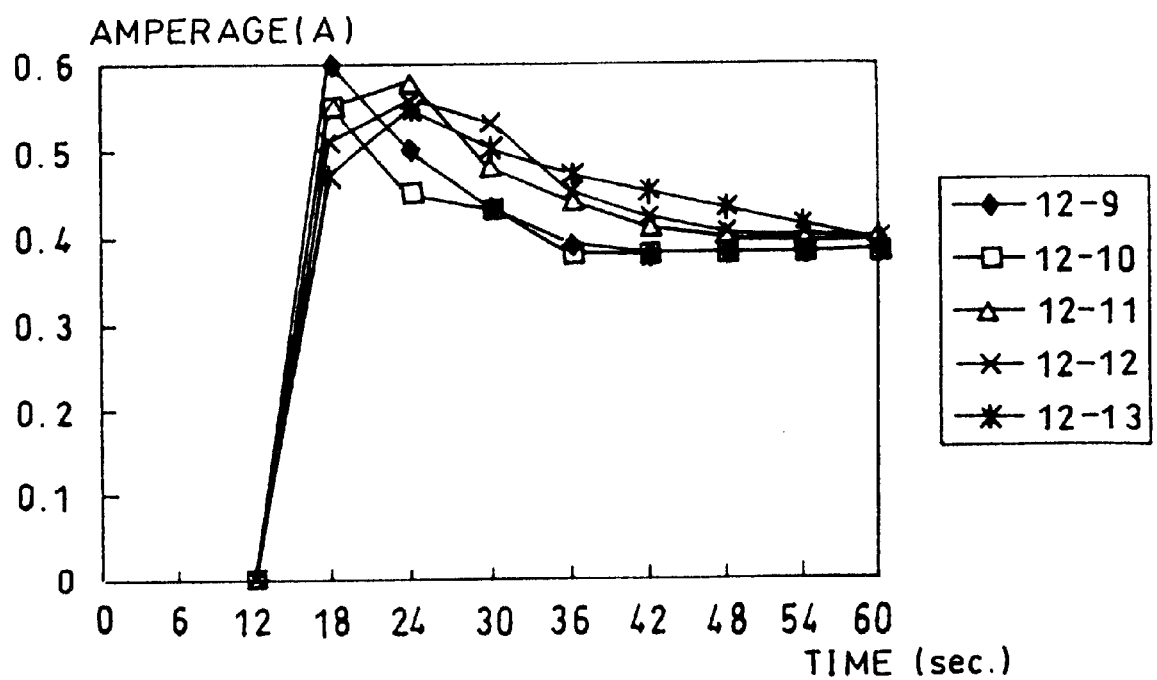

FIG. 32 is a graph showing the relationship between amperage and heating time of starch-based biodegradable molded objects.

Figure 33:
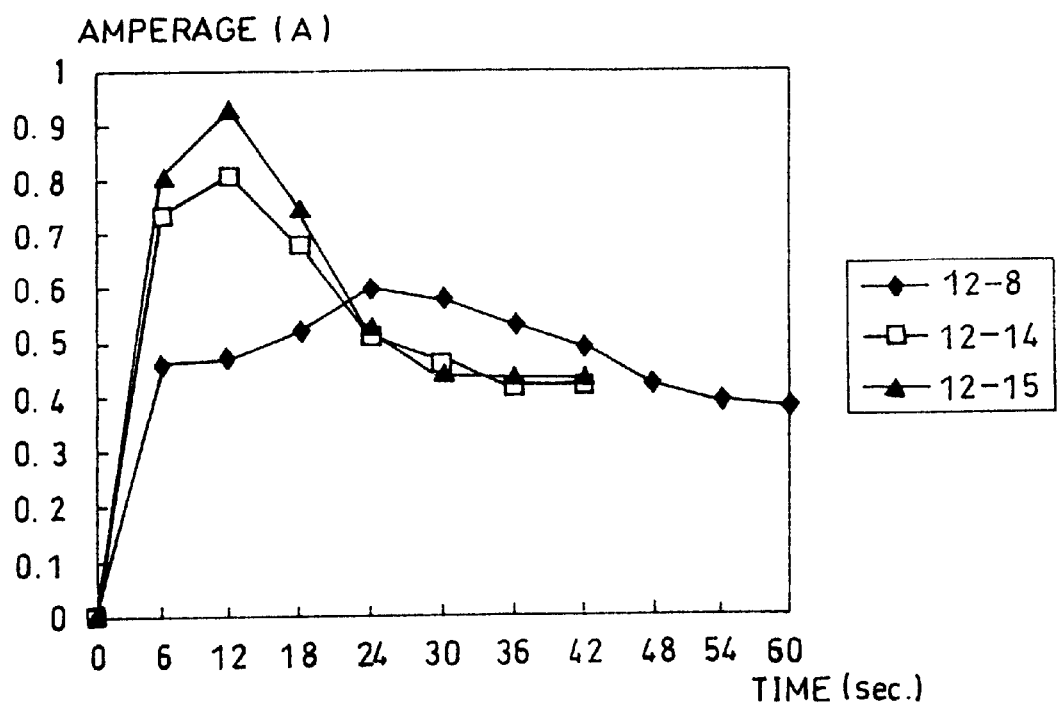

FIG. 33 is a graph showing the relationship between amperage and heating time of starch-based biodegradable molded objects.

Figure 34:
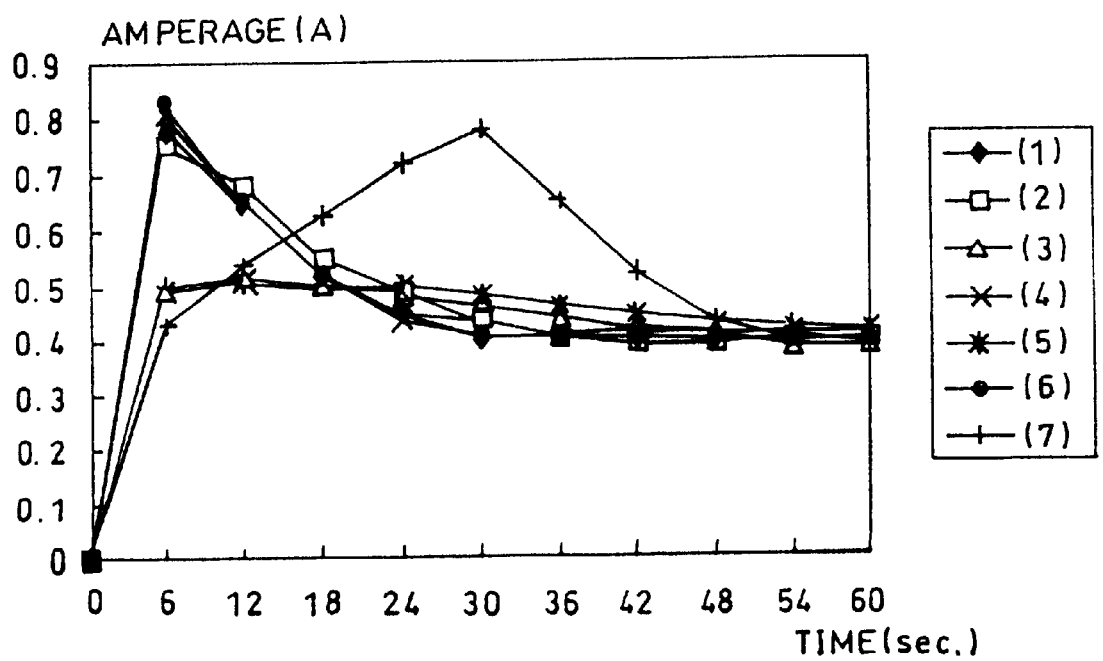

FIG. 34 is a graph showing the relationship between amperage and heating time of starch-based biodegradable molded objects.

Figure 35:
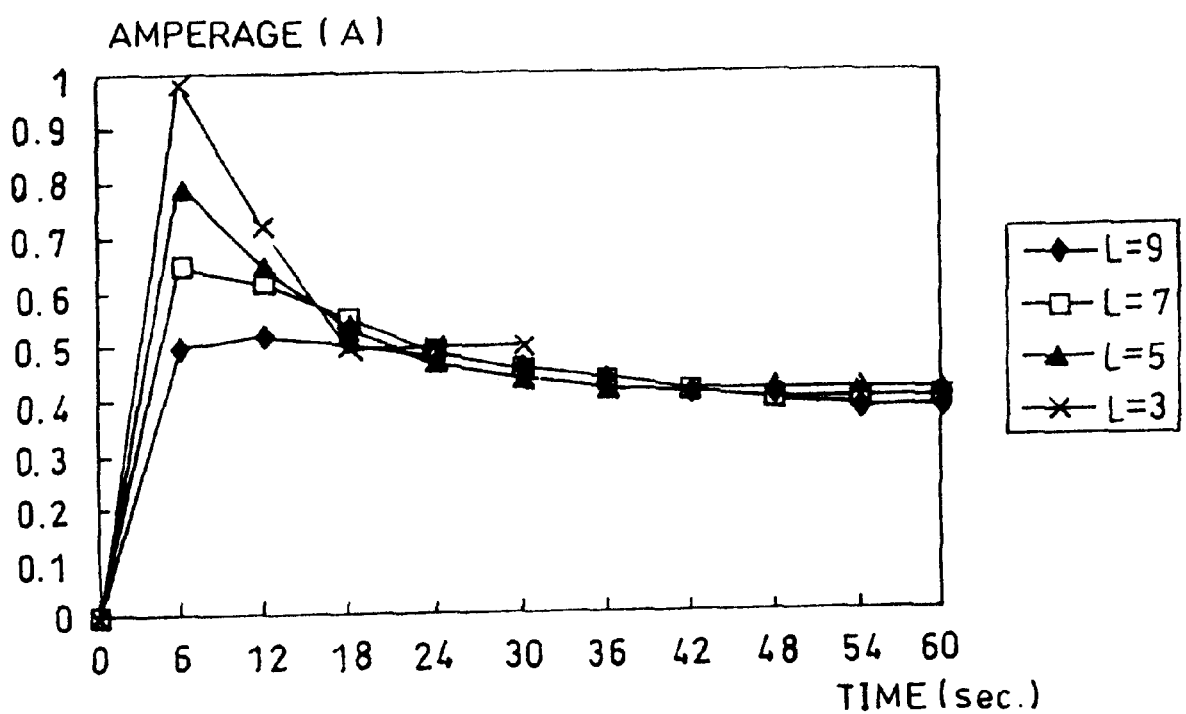

FIG. 35 is a graph showing the relationship between amperage and heating time of starch-based biodegradable molded objects.

BEST MODE FOR CARRYING OUT THE INVENTION

The following will explain embodiments of the present invention with reference to FIGS. 1 through 35. First, structures common to all of the embodiments will be discussed.

Materials

The materials used in the present invention are shown in Tables 1 through 6.

TABLE 1

| MATERIAL MIXTURE NO. | 1 | 2 | 3 | 4 | 5 | 6 | 7 |
|---|---|---|---|---|---|---|---|
| POTATO STARCH | 100 | 100 | 100 | 100 | 100 | 100 | 100 |
| SALT | 0 | 0.2 | 0.5 | 1 | 2 | 5 | 0 |
| SODIUM LACTATE | 0 | 0 | 0 | 0 | 0 | 0 | 0.5 |
| DIATOMACEOUS EARTH | 1 | 1 | 1 | 1 | 1 | 1 | 1 |
| LOCUST BEAM GUM | 2 | 2 | 2 | 2 | 2 | 2 | 2 |
| STEARIC ACID | 1 | 1 | 1 | 1 | 1 | 1 | 1 |
| TOTAL SOLIDS | 104.0 | 104.2 | 104.5 | 105.0 | 106.0 | 109.0 | 104.5 |
| WATER | 100 | 100 | 100 | 110 | 110 | 110 | 100 |
| PROPORTION OF SOLIDS (%) | 50.98 | 51.03 | 51.10 | 48.84 | 49.07 | 49.77 | 51.10 |
| VISCOSITY (CP) | 3500 | 3700 | 3800 | 2700 | 2800 | 2800 | 3600 |

TABLE 2

| MATERIAL MIXTURE NO. | 8 | 9 | 10 | 11 | 12 | 13 | 14 |
|---|---|---|---|---|---|---|---|
| POTATO STARCH | 100 | 100 | 100 | 100 | 100 | 100 | 100 |
| CROSSLINKED POTATO STARCH | 50 | 50 | 50 | 50 | 50 | 50 | 50 |
| SODIUM HYDROGENCARBONATE | 0.5 | 0.5 | 0.5 | 0.5 | 0.5 | 0.5 | 0.5 |
| MICROCRYSTALLINE CELLULOSE | 3 | 3 | 3 | 3 | 3 | 3 | 3 |
| XANTHENE GUM | 2 | 2 | 2 | 2 | 2 | 2 | 2 |
| STEARIC ACID | 1.5 | 1.5 | 1.5 | 1.5 | 1.5 | 1.5 | 1.5 |
| SOYBEAN OIL | 1 | 1 | 1 | 1 | 1 | 1 | 1 |
| LECITHIN | 0.1 | 0.1 | 0.1 | 0.1 | 0.1 | 0.1 | 0.1 |
| TOTAL SOLIDS | 156.1 | 156.1 | 156.1 | 156.1 | 156.1 | 156.1 | 156.1 |
| WATER | 60 | 90 | 120 | 150 | 180 | 210 | 240 |

TABLE 2-continued

| MATERIAL MIXTURE NO. | 8 | 9 | 10 | 11 | 12 | 13 | 14 |
|---|---|---|---|---|---|---|---|
| PROPORTION OF SOLIDS (%) | 72.24 | 63.43 | 56.54 | 51.00 | 46.44 | 42.64 | 39.41 |
| VISCOSITY (CP) | DOUGH | DOUGH | 8500 | 4000 | 1500 | 900 | 600 |

TABLE 3

| MATERIAL MIXTURE NO. | 15 | 16 | 17 | 18 | 19 | 20 | 21 |
|---|---|---|---|---|---|---|---|
| POTATO STARCH | 100 | 100 | 100 | 100 | 100 | 100 | 100 |
| CORN STARCH | 20 | 20 | 20 | 20 | 20 | 20 | 20 |
| PULVERIZED PREVIOUSLY MOLDED OBJECTS | 3 | 3 | 3 | 3 | 3 | 3 | 3 |
| CALCIUM STEARATE | 0 | 0 | 0 | 0 | 0 | 0 | 2 |
| MAGNESIUM STEARATE | 0 | 0 | 0 | 0 | 0 | 2 | 0 |
| LOCUST BEAN GUM | 1 | 1 | 1 | 1 | 1 | 1 | 1 |
| PALMITIC ACID | 0 | 1 | 2 | 5 | 10 | 0 | 0 |
| SOYBEAN OIL | 2 | 0 | 0 | 0 | 0 | 0 | 0 |
| LECITHIN | 0.2 | 0 | 0 | 0 | 0 | 0 | 0 |
| FATTY ACID ESTER | 0 | 0.1 | 0.2 | 0.5 | 1 | 0 | 0 |
| TOTAL SOLIDS | 126.2 | 125.1 | 126.2 | 129.5 | 135.0 | 126.0 | 126.0 |
| WATER | 130 | 130 | 130 | 130 | 140 | 130 | 130 |
| PROPORTION OF SOLIDS (%) | 49.26 | 49.04 | 49.26 | 49.90 | 49.09 | 49.22 | 49.22 |
| VISCOSITY (CP) | 2500 | 2500 | 2300 | 3000 | 2000 | 2200 | 2500 |

TABLE 5

| MATERIAL MIXTURE NO. | 32 | 33 | 34 | 35 | 36 | 37 | 38 |
|---|---|---|---|---|---|---|---|
| POTATO STARCH | 100 | 100 | 100 | 100 | 100 | 100 | 100 |
| PULVERIZED PREVIOUSLY MOLDED OBJECTS | 3 | 3 | 3 | 3 | 3 | 3 | 3 |
| DIATOMACEOUS EARTH | 0 | 5 | 0 | 0 | 0 | 0 | 0 |
| MICRO-CRYSTALLINE CELLULOSE | 0 | 0 | 2 | 5 | 10 | 0 | 0 |
| PROPYLENE GLYCOL | 0 | 0 | 0 | 0 | 0 | 2 | 5 |
| LOCUST BEAN GUM | 1 | 1 | 1 | 1 | 1 | 1 | 1 |
| SOYBEAN OIL | 5 | 5 | 5 | 5 | 5 | 5 | 5 |
| FATTY ACID ESTER | 0.5 | 0.5 | 0.5 | 0.5 | 0.5 | 0.5 | 0.5 |
| TOTAL SOLIDS | 109.5 | 114.5 | 111.5 | 114.5 | 119.5 | 111.5 | 114.5 |
| WATER | 110 | 110 | 110 | 110 | 120 | 120 | 110 |
| PROPORTION OF SOLIDS (%) | 49.89 | 51.00 | 50.34 | 51.00 | 49.90 | 48.16 | 51.00 |
| VISCOSITY (CP) | 3500 | 4800 | 4300 | 4800 | 3800 | 3900 | 5000 |

TABLE 4

| MATERIAL MIXTURE NO. | 22 | 23 | 24 | 25 | 26 | 27 | 28 | 29 | 30 | 31 |
|---|---|---|---|---|---|---|---|---|---|---|
| POTATO STARCH | 100 | 100 | 100 | 100 | 0 | 0 | 0 | 0 | 0 | 0 |
| TAPIOCA STARCH | 0 | 0 | 0 | 0 | 100 | 100 | 100 | 100 | 100 | 0 |
| CORN STARCH | 0 | 0 | 0 | 0 | 0 | 0 | 0 | 0 | 0 | 100 |
| PRE-GELATINIZED POTATO STARCH | 3 | 3 | 3 | 0 | 0 | 0 | 0 | 0 | 0 | 0 |
| PRE-GELATINIZED TAPIOCA STARCH | 0 | 0 | 0 | 0 | 2 | 5 | 5 | 5 | 10 | 0 |
| PRE-GELATINIZED CORN STARCH | 0 | 0 | 0 | 0 | 0 | 0 | 0 | 0 | 0 | 5 |
| CROSSLINKED POTATO STARCH | 20 | 50 | 100 | 0 | 0 | 0 | 0 | 0 | 0 | 0 |
| CROSSLINKED CORN STARCH | 0 | 0 | 0 | 0 | 0 | 0 | 0 | 0 | 0 | 20 |
| PULVERIZED PREVIOUSLY MOLDED OBJECTS | 0 | 0 | 0 | 3 | 0 | 0 | 0 | 0 | 0 | 0 |
| CALCIUM STEARATE | 2 | 2 | 2 | 2 | 2 | 2 | 2 | 2 | 2 | 2 |
| SORBITOL | 5 | 5 | 5 | 5 | 5 | 5 | 5 | 5 | 5 | 5 |
| XANTHENE GUM | 0.8 | 0.8 | 0.8 | 0.8 | 0.8 | 0 | 0.4 | 0 | 0 | 0.8 |
| TOTAL SOLIDS | 130.8 | 160.8 | 210.8 | 110.8 | 109.8 | 109.0 | 112.4 | 112.0 | 117.0 | 132.8 |
| WATER | 130 | 160 | 210 | 110 | 110 | 110 | 110 | 110 | 110 | 130 |
| PROPORTION OF SOLIDS (%) | 50.15 | 50.12 | 50.10 | 50.18 | 49.95 | 49.77 | 50.54 | 50.45 | 51.54 | 50.53 |
| VISCOSITY (CP) | 4200 | 4500 | 5200 | 5000 | 4200 | 2800 | 5500 | 3200 | 5200 | 5000 |

TABLE 6

| MATERIAL MIXTURE NO. | 39 | 40 | 41 | 42 | 43 | 44 | 45 |
|---|---|---|---|---|---|---|---|
| POTATO STARCH | 100 | 100 | 100 | 100 | 100 | 100 | 100 |
| MICRO-CRYSTALLINE CELLULOSE | 3 | 3 | 3 | 3 | 3 | 3 | 3 |
| MAGNESIUM STEARATE | 2 | 2 | 2 | 2 | 2 | 2 | 2 |
| PROPYLENE GLYCOL | 5 | 5 | 5 | 5 | 5 | 5 | 5 |
| TITANIUM DIOXIDE | 0 | 2 | 5 | 0 | 0 | 0 | 2 |
| CARAMEL | 0 | 0 | 0 | 2 | 0 | 0 | 0 |
| R-106 | 0 | 0 | 0 | 0 | 2 | 0 | 0 |
| B-2 | 0 | 0 | 0 | 0 | 0 | 2 | 2 |
| LOCUST BEAN GUM | 2 | 2 | 2 | 2 | 2 | 2 | 2 |
| TOTAL SOLIDS | 112.0 | 114.0 | 117.0 | 114.0 | 114.0 | 114.0 | 116.0 |
| WATER | 110 | 110 | 120 | 110 | 110 | 110 | 120 |
| PROPORTION OF SOLIDS (%) | 50.45 | 50.89 | 49.37 | 50.89 | 50.89 | 50.89 | 49.15 |
| VISCOSITY (CP) | 4600 | 5000 | 3500 | 5000 | 5000 | 5000 | 3000 |

By varying the quantity of salt added, as shown in Table 1, the conductivity of the materials changes, and this influences molding by internal heating. By changing the quantity and type of salt, conductivity can be controlled. Control of conductivity is definitely necessary in low-frequency heating.

The material mixtures include various amounts of water, as shown in Table 2, but, if an appropriate depositing (injection) structure is used, each of these material mixtures can be molded in each of the metal molds used in the present invention. When molding using a metal mold, pressure inside the mold does not rise easily unless a fair amount of water is included.

In Table 3, when molding by internal heating, a liberal amount of mold release agent is required in order to obtain a clean surface pattern. By adding mold release agent, the interior texture is made finer, and better results can be obtained in water resistance processing.

In Table 4, starch is the main material, and molding is determined by the type and proportion of starch in the mixture. It is necessary to change the proportion of starch in the mixture according to the shape of the molded object. Starch also plays an important role with regard to hardness and flexibility.

With internal heating, there is a tendency for initial expansion to increase more rapidly than with external heating. For this reason, molding materials with stable expansion are needed.

In Table 5, strength/flexibility imparting agents not only impart strength and flexibility, but also control stable expansion. By adding these, foam bubbles can be made finer, and surface water resistance processing is more effective.

In Table 6, with internal heating, bright colors can be obtained more easily than with external heating.

As discussed above, the mixtures No. 1 through No. 45 set forth in Tables 1 through 6 are used for materials in the present invention.

Preparation of Materials for Molding

The process of the present invention, from preparation of materials through molding, is as follows.
(1) Measuring of materials.
(2) Mixing, in a mixer, of water and materials other than those in (3) and (4) below.
(3) Mixing in of starch.
(4) Mixing in of mold release agent.
(5) Ageing (a two-level cooling tank is used).
(6) Depositing (injection).
(7) Placing in mold and molding.

The molded objects are prepared by means of the foregoing steps.

Devices

Next, the devices used in the present invention will be explained. Since the mixers, etc. used were equivalent to conventional ones, explanation thereof will be omitted. The molded objects were prepared by placing the foregoing materials in a mold to be discussed below, and then heating and expanding in a heating device. For the heating device, a total of four devices were used: three types of electromagnetic wave heating devices (referred to as "HB," "HC," and "HD"), and, for purposes of comparison, an external heating device (referred to as "HA"). The structural details of each of these heating devices are as shown in Table 7 below. Further, the schematic structures of electromagnetic wave heating devices are shown in FIGS. 1 through 4. Incidentally, the frequency used is not limited to that shown in Table 7; an appropriate frequency within a range from 50 Hz through 100 MHz may be used.

TABLE 7

| HEATING DEVICE | | PRIMARY POWER SOURCE | FREQUENCY CONVERTER | OUTPUT REGULATOR | ELECTRODES | INSULATION | TEMPERATURE ADJUSTMENT |
|---|---|---|---|---|---|---|---|
| HA: EXTERNAL HEATING | | 60 Hz, 200 V | NONE | NONE PROVIDED | NONE | NONE | 150° C. TO 230° C. |
| INTERNAL HEATING | HB: 50 Hz TO 1 MHz | 60 Hz, 200 V | WITHIN 50 Hz TO 10 kHz RANGE | PROVIDED | METAL MOLD MADE OF Al | BASICALLY PRESENT | 50° C. TO 230° C. |
| | HC: 1 MHz TO 100 MHz | 60 Hz, 200 V | THREE TYPES WITHIN 1 MHz TO 100 MHz RANGE | PROVIDED IN OSCILLATOR AREA | METAL MOLD MADE OF Al | BASICALLY PRESENT | 50° C. TO 230° C. |
| | HD: BOTH HB AND HC USED | 60 Hz, 200 V | WITHIN 50 Hz TO 10 kHz RANGE THREE TYPES WITHIN 1 MHz TO 100 MHz RANGE | PROVIDED IN OSCILLATOR AREA PROVIDED IN OSCILLATOR AREA | METAL MOLD MADE OF Al | BASICALLY PRESENT | 50° C. TO 230° C. |

Device HB includes three types: HB1, HB2, and HB3. Device HC also includes three types: HC1, HC2, and HC3.

Here, the power source for the devices HA, HB, HC, and HD is an industrial power source with a voltage of 200 V and a frequency of 60 Hz.

The output regulators of devices HB, HC, and HD are devices which regulate output to a desired constant output.

The frequency converters of devices HB, HC, and HD are devices which output frequency converted to a desired frequency within a specified range.

The oscillators of devices HC and HD are devices which oscillate at a specified frequency only. However, in the case of device HB, there is a frequency zone for which an oscillator is unnecessary. In other words, device HB1 uses a frequency of 60 Hz, HB2 a frequency of 200 Hz, and HB3 a frequency of 10.0 kHz, but an oscillator is unnecessary in each of these cases. Using oscillators, device HC1 uses a frequency of 5.0 MHz, HC2 a frequency of 13.56 MHz, and HC3 a frequency of 40.68 MHz. Device HD uses a combination of the foregoing oscillators.

The electrodes of devices HB, HC, and HD are devices for supplying high- or low-frequency current to the materials through the mold.

In devices HA, HB, HC, and HD, temperature adjustment refers to adjustment of the temperature of the metal mold, prior to molding, using an electric heater installed in the metal mold, or directly heating the metal mold externally using a gas burner, or using IH (induction heating) to heat the metal mold, etc. Without this kind of temperature adjustment, the temperature of the metal mold is within a range up to 100° C.

The following will explain the individual structures of the foregoing electromagnetic wave heating devices.

Figure 1:
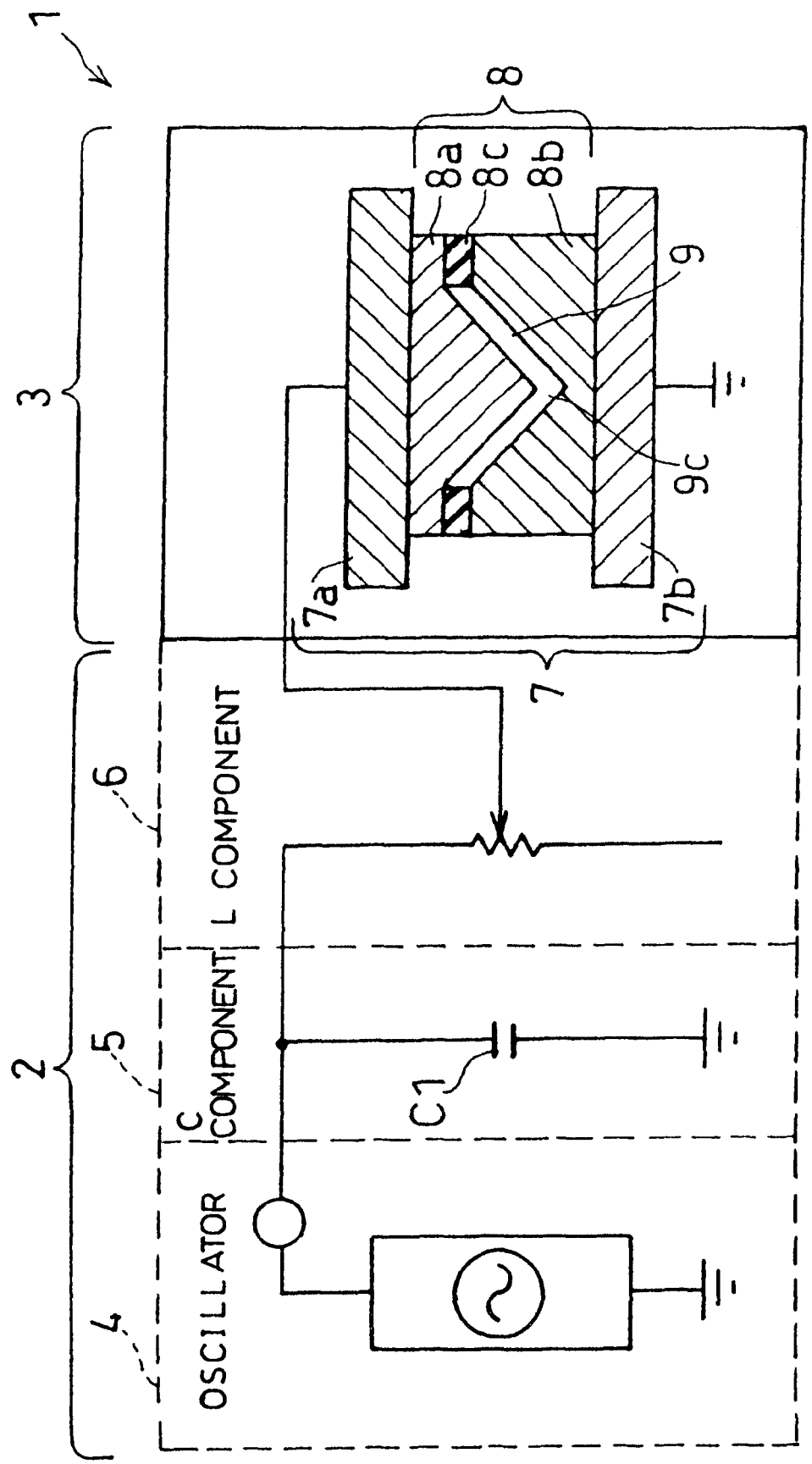
FIG. 1 is an explanatory drawing showing one structural example of a heating device for a method of manufacturing starch-based biodegradable molded objects according to the present invention.

As shown in FIG. 1, an electromagnetic wave heating device 1 includes a power section 2 and a heating section 3 (electrode section). Further, although not shown in the drawing, the heating section 3 includes a vacuum pump, a lock section which fixes the upper and lower mold halves, and an external heating section.

When the frequency is 5 MHz, 13.56 MHz, or 40.68 MHz, the power section 2 uses for a power source an oscillator 4 of the vacuum tube type. Energy efficiency is determined by the output of the oscillator 4. Mold halves 8a and 8b (to be discussed below) must not come into direct contact with one another, and thus an insulating section is provided therebetween. An insulating body 8c is used for the insulating section. The insulating section is for preventing the mold halves 8a and 8b from touching one another, and may be provided as a space. In addition, each of the necessary devices should be provided with a ground and an electromagnetic wave shield.

Further, as a regulating circuit, a variable capacitor (referred to as "C component") 5 and a variable coil (referred to as "L component") 6 are provided. By changing the C component 5 and the L component 6 according to the object to be heated, optimum output and tuning can be obtained. As the C component 5, a manual capacitor C1 (referred to as the "C1 component") is provided.

Figure 2:
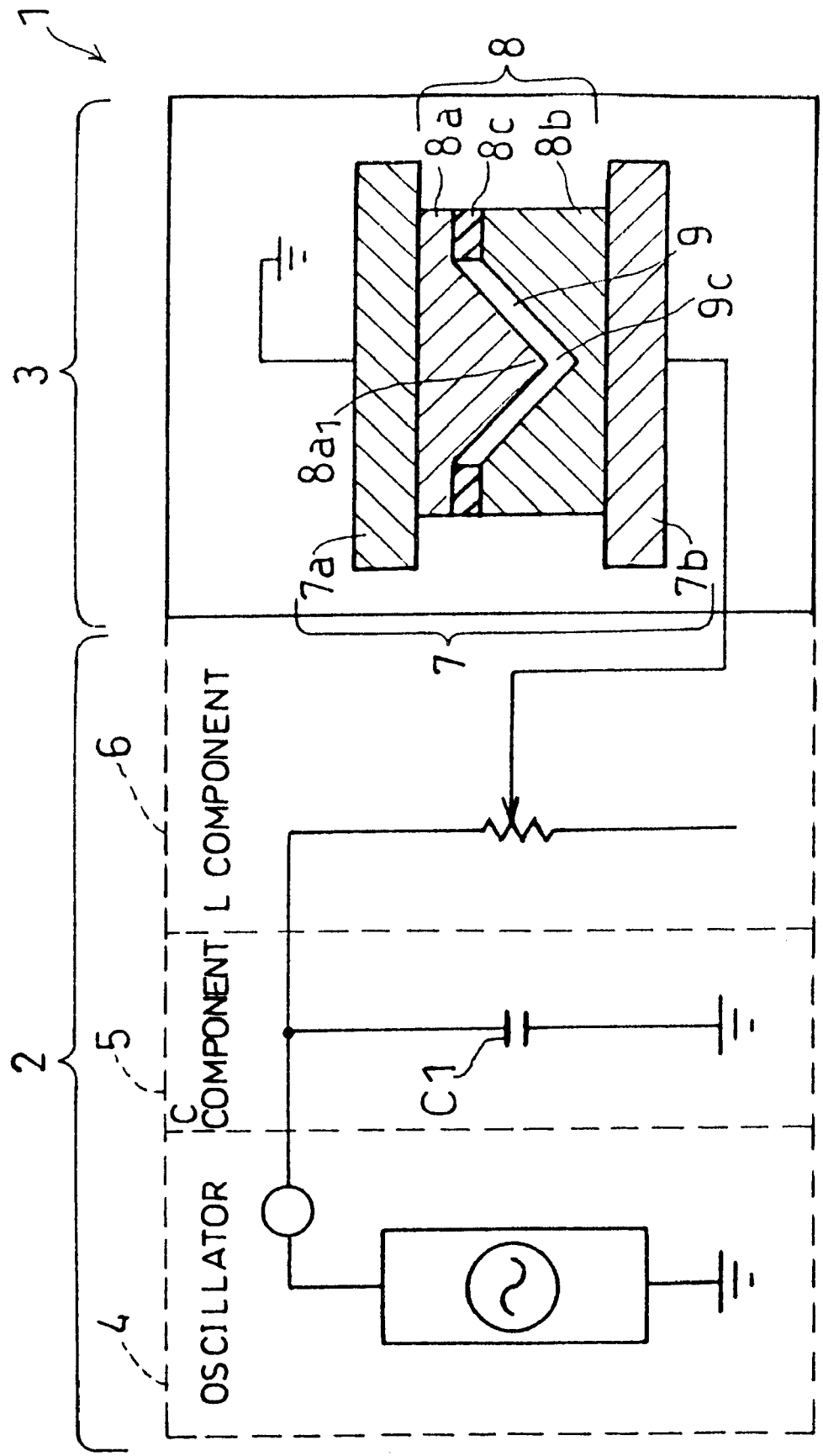
FIG. 2 is an explanatory drawing showing another structural example of a heating device for a method of manufacturing starch-based biodegradable molded objects according to the present invention.

In the device shown in FIG. 2, the side with the mold half 8a, having more pointed areas such as the apex $8a_1$ (in FIG. 2, the upper side), is grounded. When one of the mold halves 8a has pointed areas of this kind, if, as shown in FIG. 1, the mold half 8a is connected to the power source and the other mold half 8b is grounded, energy from the power source tends to concentrate in the pointed area, and thus localized heating of an apex area 9c of the materials 9 is likely to occur. For this reason, by grounding a mold half 8a having a pointed area, as shown in FIG. 2, energy from the power source can be prevented from concentrating in the pointed area, and it is easier to prevent localized heating than with the device shown in FIG. 1.

Figure 3:
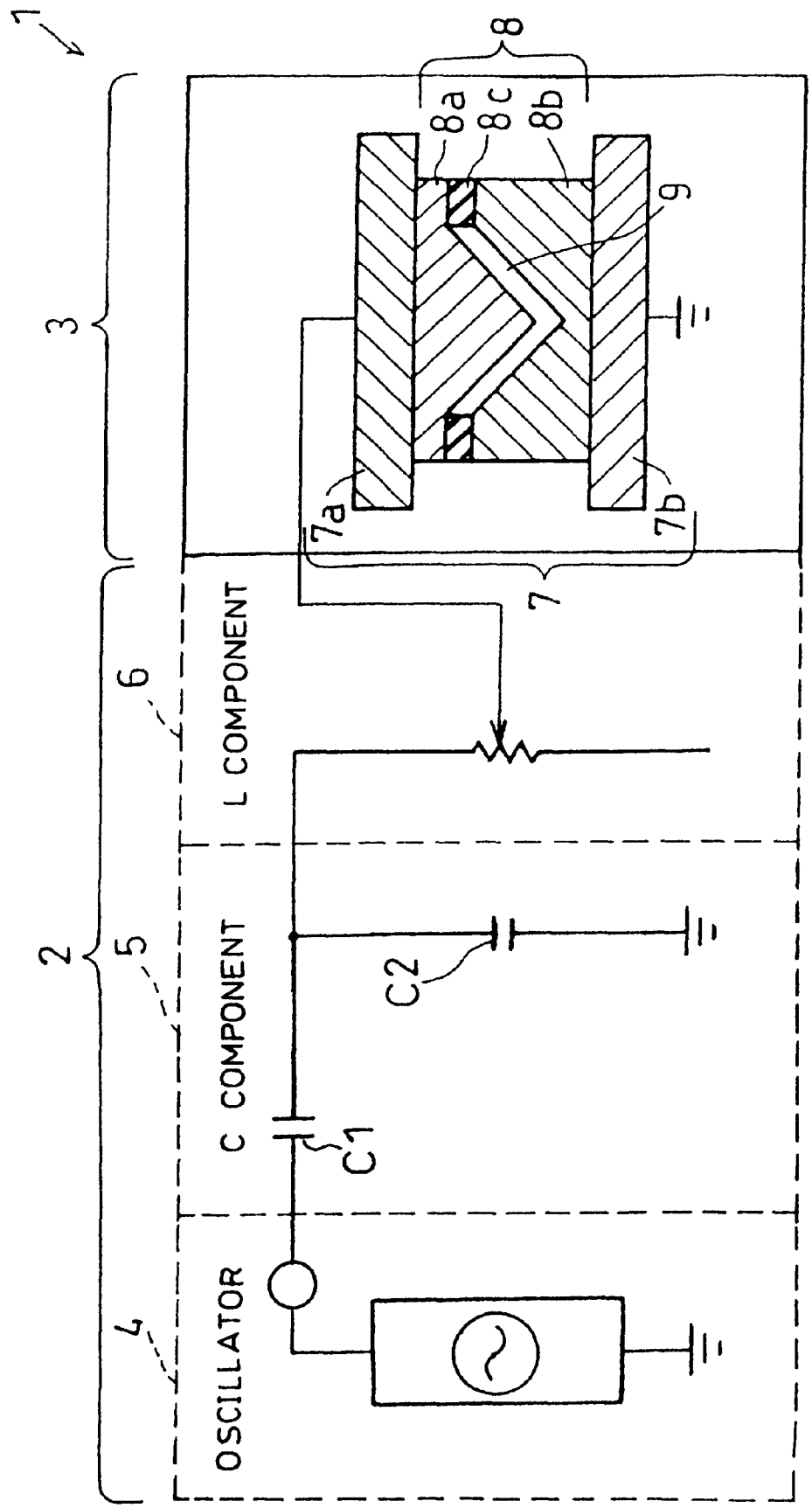
FIG. 3 is an explanatory drawing showing a further structural example of a heating device for a method of manufacturing starch-based biodegradable molded objects according to the present invention.

By providing, as shown in FIG. 3, an automatic capacitor C2 (referred to as the "C2 component") as a variable capacitor for automatic regulation and tuning, anode current from the oscillator vacuum tube can be controlled to a constant value. This anode current is controlled by an automatic tracking circuit. The automatic tracking circuit is a circuit which can automatically change an interval between the plates of an air capacitor using a motor, and which maintains a constant anode amperage in accordance with changes in the dielectric constant across the two electrodes of the heating section 3.

Here, increasing (or decreasing) the interval between the plates of the capacitor making up the C component will be referred to as "widening (or narrowing) the C component," and lengthening (or shortening) of the L component resistor length actually used in the circuit will be referred to as "lengthening (or shortening) the L component." The wider the C component, the smaller the output. When the manual capacitor C1 is at its narrowest, C1=100 , and when at its widest, C1=0. When the automatic capacitor C2 is at its narrowest, C2=10, and when at its widest, C2=0. The longer the L component, the smaller the output. When L is at its shortest, L=0, and when at its longest, L=15. Below, C component and L component values will be expressed as a proportion of their respective minimum and maximum values.

Figure 5:
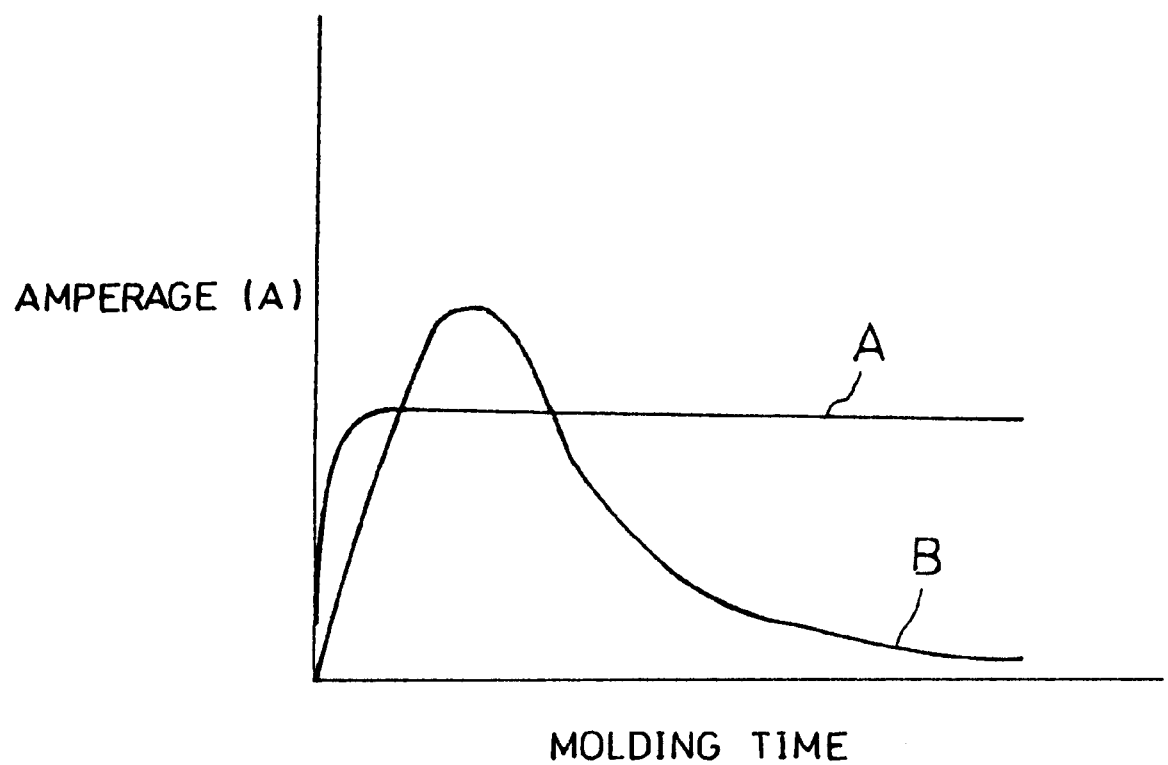
FIG. 5 is a graph showing transition in the anode current of an oscillator during heating.

When the automatic capacitor C2 is in operation, the transition in the anode amperage of the oscillator is as shown at curve A in FIG. 5. In other words, the amperage can be supplied in a constant quantity. The automatic function of the automatic capacitor C2 can also be turned off, and the amperage can be set manually. When the automatic function is turned off, the transition is as shown at curve B in FIG. 5. In other words, the amperage changes according to the conductive and dielectric properties of the object to be molded.

Figure 4:
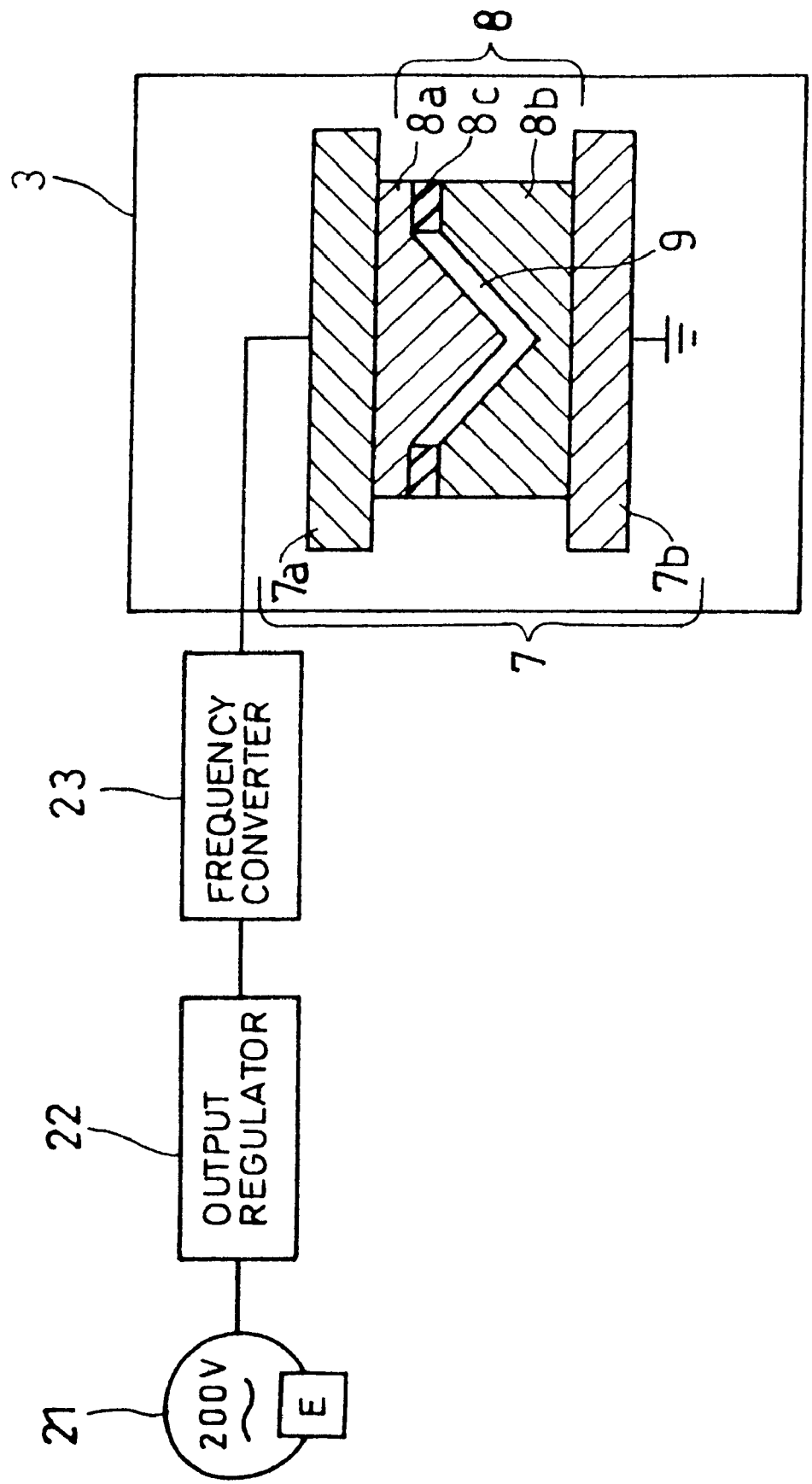
FIG. 4 is an explanatory drawing showing a further structural example of a heating device for a method of manufacturing starch-based biodegradable molded objects according to the present invention.

When the frequency is 60 Hz, 200 Hz, or 10 kHz, as shown in FIG. 4, an output regulator 22 is connected to a power source 21 of 200 V, and current is supplied to the heating section 3 at a predetermined frequency by a frequency converter 23. A transformer can be used as the output regulator 22.

As shown in FIG. 1, the heating section 3 includes upper and lower electrodes 7a and 7b. To the electrodes 7a and 7b are connected an upper mold half 8a and a lower mold half 8b, respectively. The mold halves 8a and 8b are pressed together with the insulating body 8c therebetween, and thus do not touch one another. The mold halves 8a and 8b and the insulating body 8c make up a metal mold 8. The metal mold 8 and the materials 9 will collectively be referred to as the "object to be heated." The object to be heated is placed between the electrodes 7a and 7b, to which current is supplied.

Figure 6A:
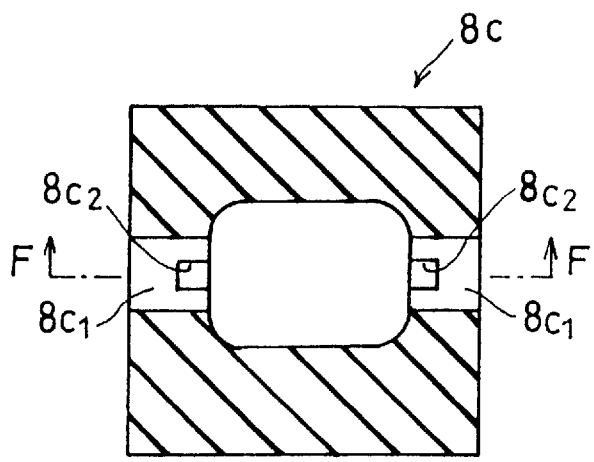
FIGS. 6(a) through 6(c) show one structural example of an insulating body.
Figure 6B:
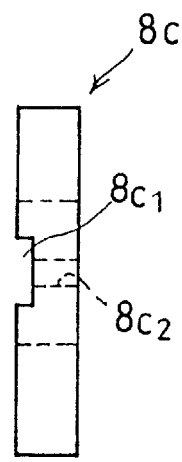
Figure 6C:
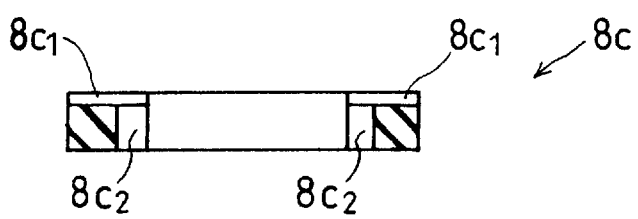
Figure 7A:
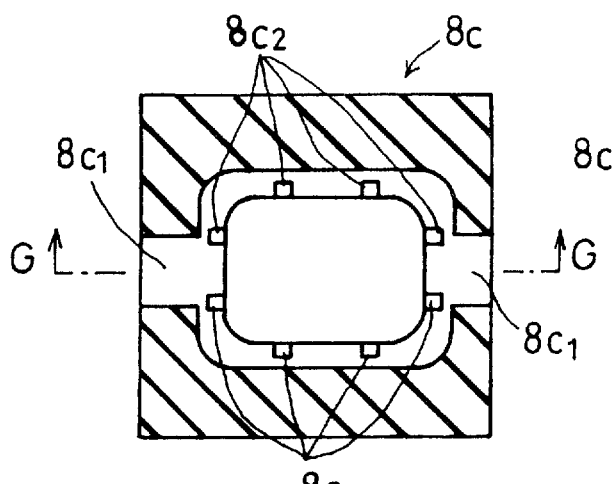
FIGS. 7(a) through 7(c) show another structural example of an insulating body.
Figure 7B:
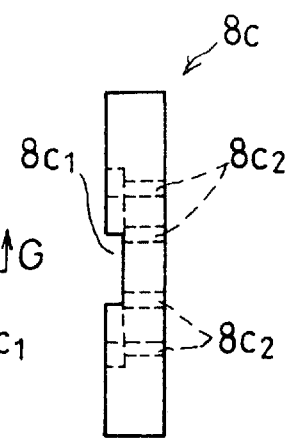
Figure 7C:
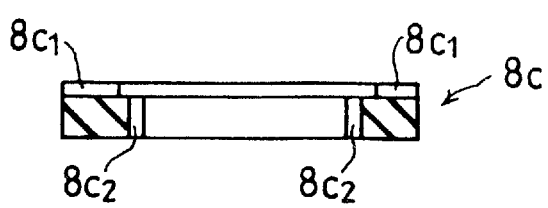

FIGS. 6(a) through 6(c) show one example of a method of releasing vapor. An insulating body 8c is provided with vapor release sections $8c_1$, and vapor release sections $8c_2$ for releasing vapor produced during heating. Vapor produced by the materials 9 (not shown) in the metal mold 8 during heating passes through the vapor release sections $8c_2$ to the vapor release sections $8c_1$, from which it is released to the exterior of the metal mold 8. As an alternative to the structure shown in FIGS. 6(*a*) through 6(*c*), a structure like that shown in FIGS. 7(*a*) through 7(*c*) may also be used, in which a plurality of vapor release sections $8c_2$ (for example eight) are provided in a circular vapor release section $8c_1$.

The number of vapor release sections $8c_2$ is usually at least two, for the sake of balance. Further, the size, shape, number, etc. of the vapor release sections $8c_1$ and the vapor release sections $8c_2$ are adjusted to those most suitable to the molded object to be produced. These must be changed as necessary in keeping with changes in the material mixture and the properties of the molded object to be produced. In the present invention, it is satisfactory if the vapor is released from the materials 9 to the exterior of the metal mold 8 in a balanced manner, and thus there is no particular limitation on the shape, size, and number of vapor release sections. Incidentally, FIGS. 6(*a*) through 6(*c*) and 7(*a*) through 7(*c*) show structures in which the vapor release sections $8c_1$ and $8c_2$ are provided in the insulating section, but, in order to mold the entirety uniformly and efficiently, vapor release sections may also be provided, as necessary, in places other than the insulating section.

As shown in FIGS. 1 and 2, one of the two electrodes 7*a* and 7*b* is a feed electrode, and the other a grounding electrode. In the arrangement shown in FIG. 1, the electrode 7*a* is the feed electrode, and electrode 7*b* the grounding electrode. In FIG. 2, the electrodes are connected in the opposite manner.

Although not shown in the drawing, the heating section 3 is provided with an electric heater and a temperature regulator, and thus the metal mold 8 can be heated at a predetermined temperature. Incidentally, when using external heating alone, current is not supplied from the power section 2, and heating and molding are performed by this heater alone.

The entirety of the heating section 3 is a vacuum chamber, and, using the aforementioned vacuum pump, the pressure therein can be reduced.

Figure 8:
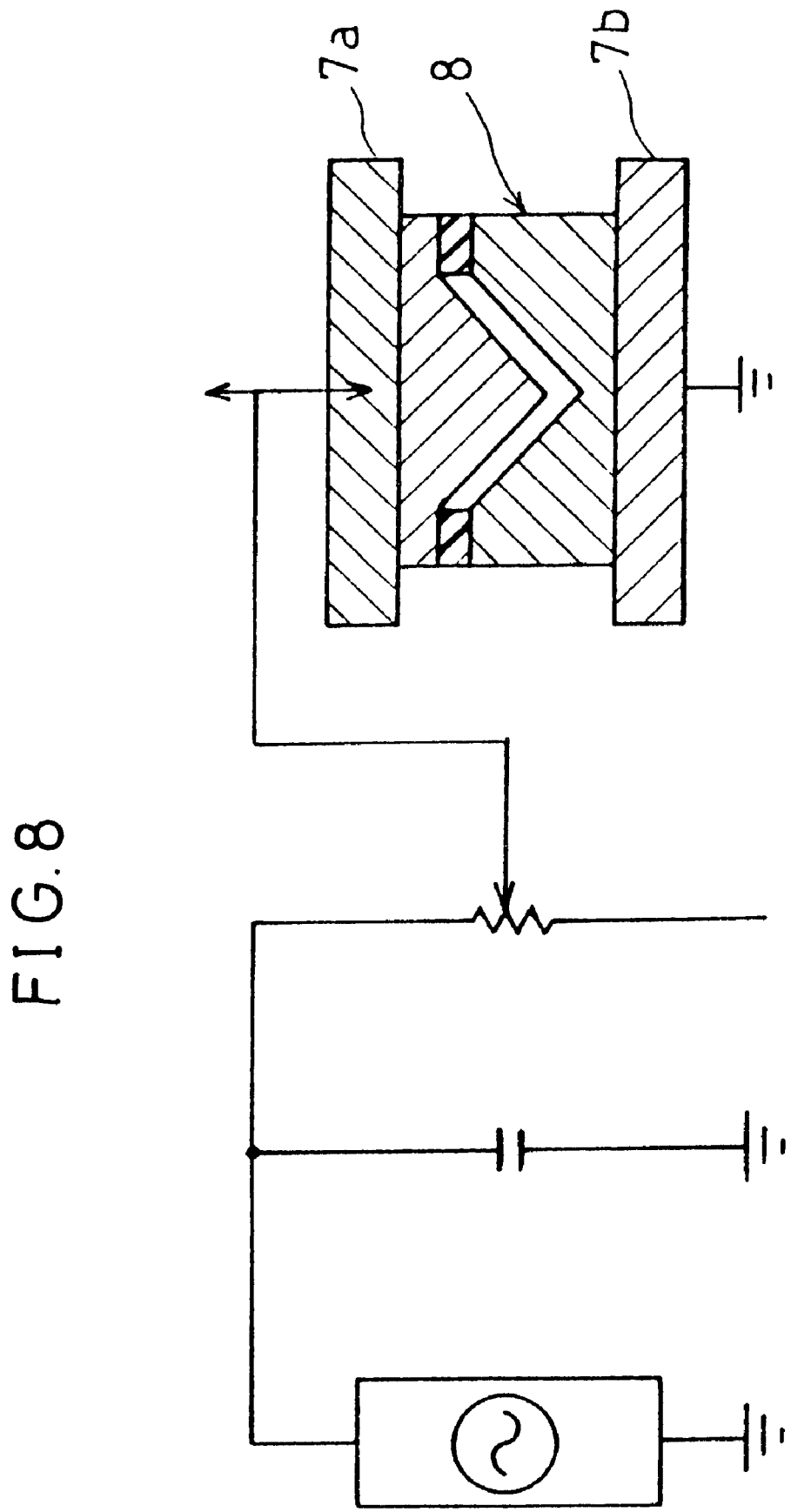
FIG. 8 is an explanatory drawing showing a structural example of a metal mold.
Figure 9:
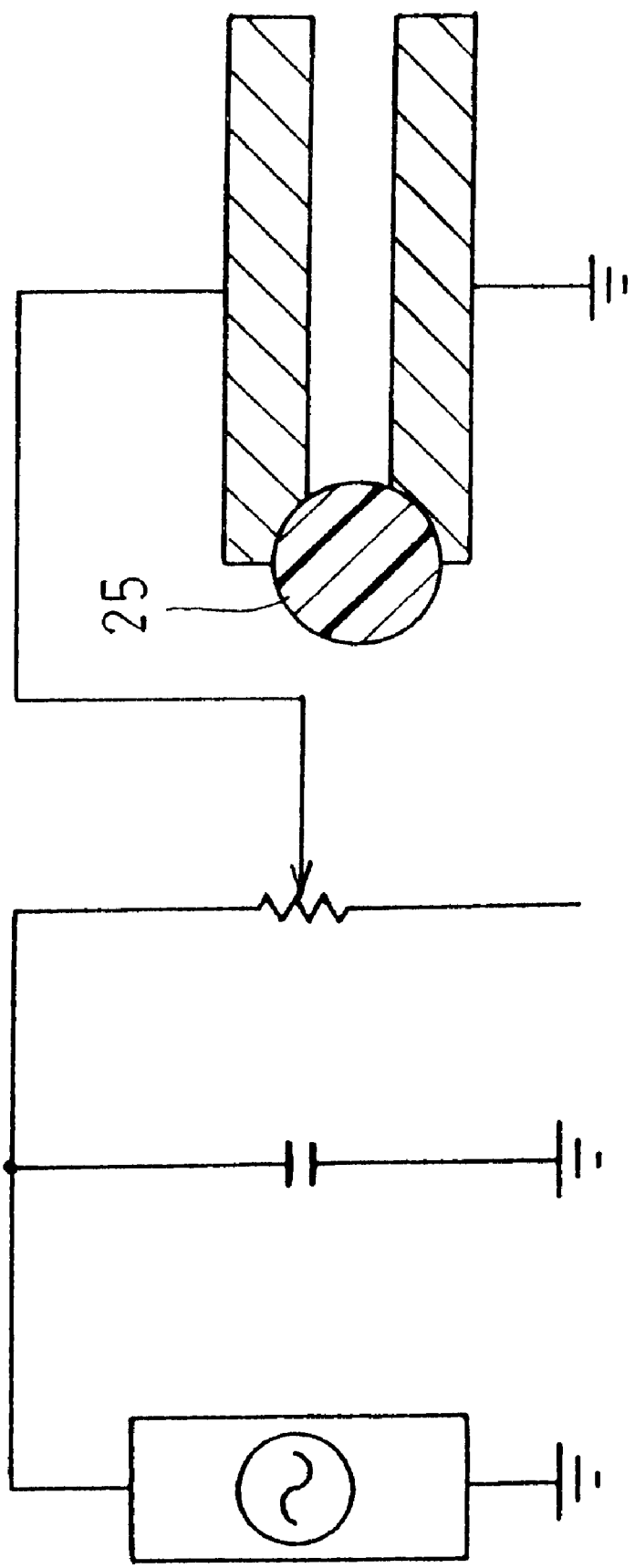
FIG. 9 is an explanatory drawing showing another structural example of a metal mold.

The metal mold 8 is fixed between the electrodes 7*a* and 7*b* using the vertical press method shown in FIG. 8. Alternatively, as shown in FIG. 9, a method may be adopted in which a hinge 25 is provided at one end of the mold, and the other end can be locked (fixed).

Mold

The following will explain the structure of the metal mold 8, which serves as the mold into which the materials are placed.

Figure 10:
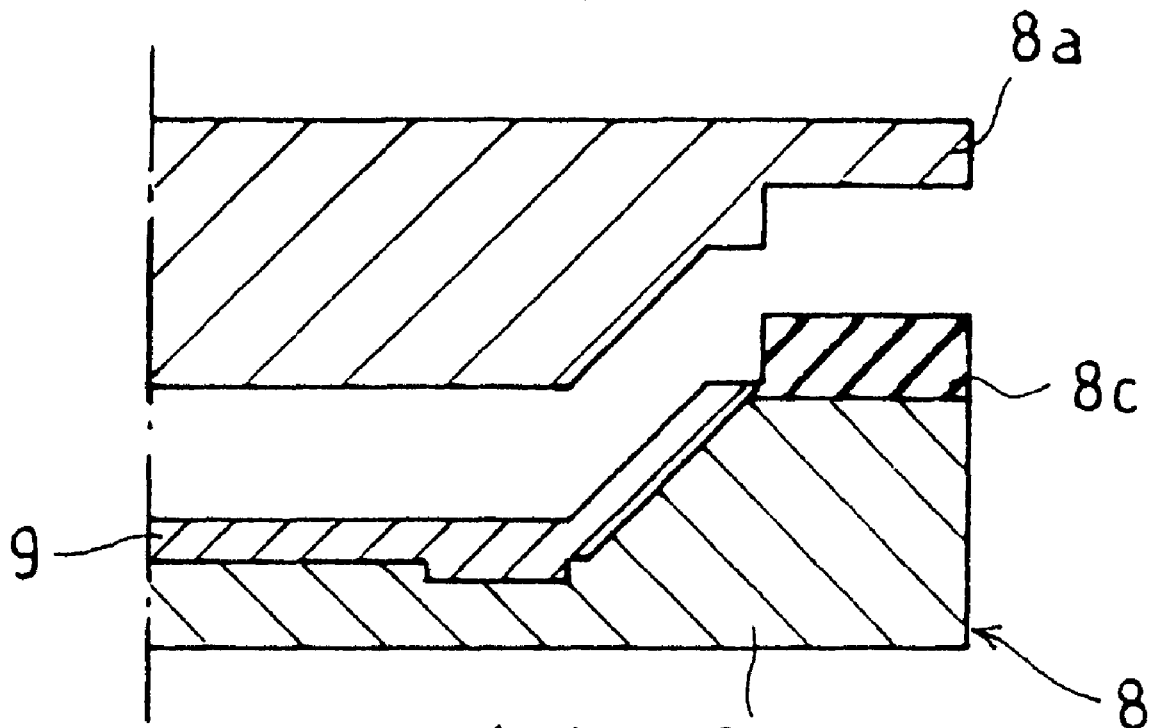
FIGS. 10(a) and 10(b) are cross-sectional views showing one example of a method of installing an insulating body.
Figure 10:
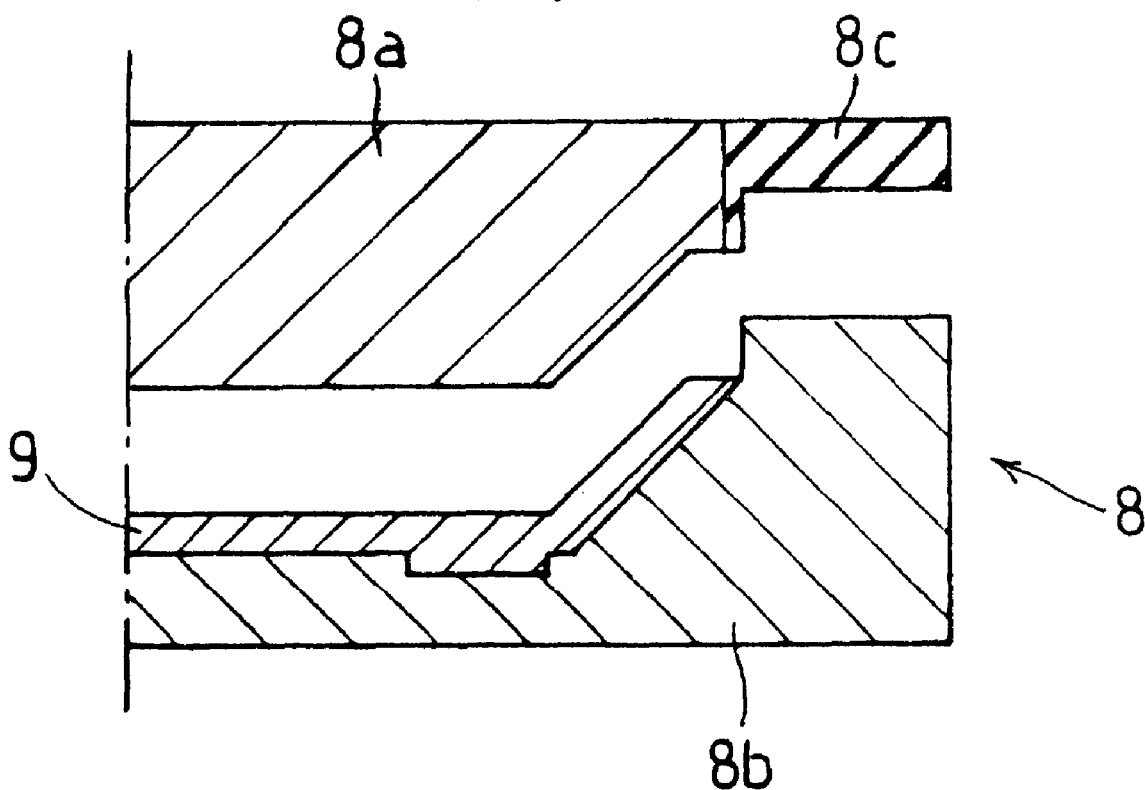

As shown in FIGS. 10(*a*) and 10(*b*), the metal mold 8 is basically divided into two blocks. Although not shown in the drawings, depending on the shape of the molded object and the method of removal, a metal mold made up of three or more parts, such as a split mold or one provided with a knockout pin, may be used, but even in these cases, the parts are grouped into two blocks: a feed electrode side and a grounding electrode side.

The parts of each group have sections which fit together closely when the mold is fixed and molding is performed. Between the one block (the mold half 8*a* side) and the other block (the mold half 8*b* side), a space for molding of the molded object and an insulating section (here, the insulating body 8*c*) are provided. As shown in FIGS. 10(*a*) and 10(*b*), the insulating body 8*c* can be attached to either block, or it can be attached to both blocks.

Figure 11A:
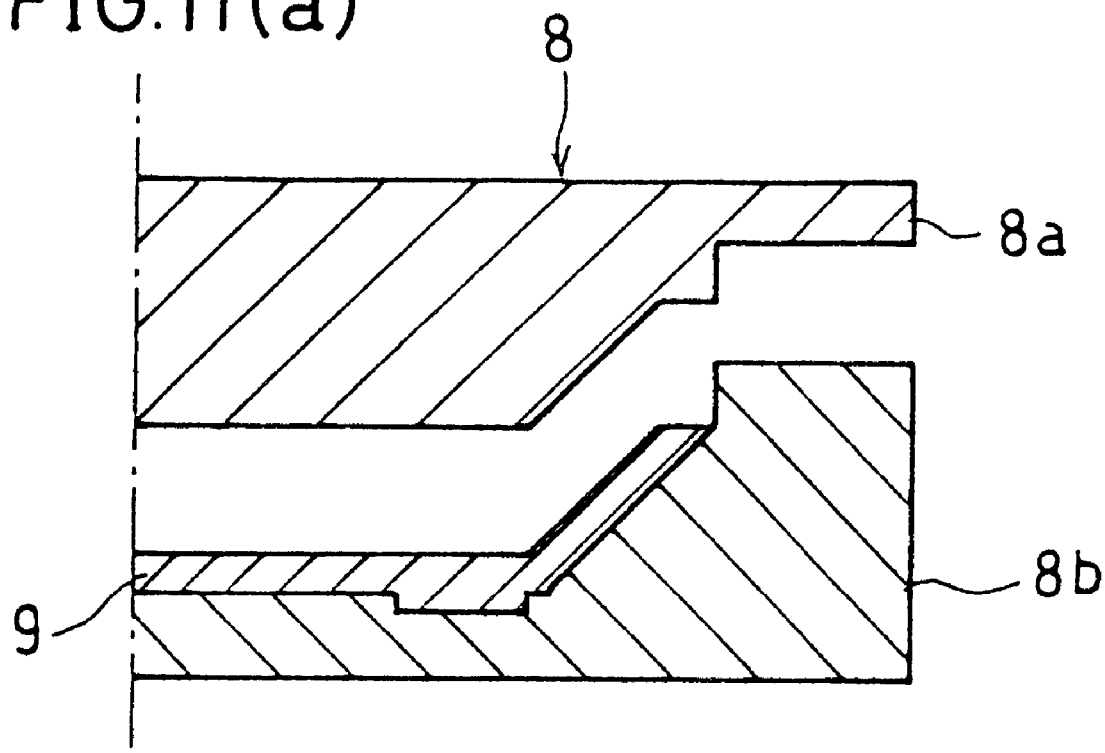
FIGS. 11(a) and 11(b) are cross-sectional views showing one example of a method of providing an insulating section of air, without installing an insulating body.
Figure 11B:
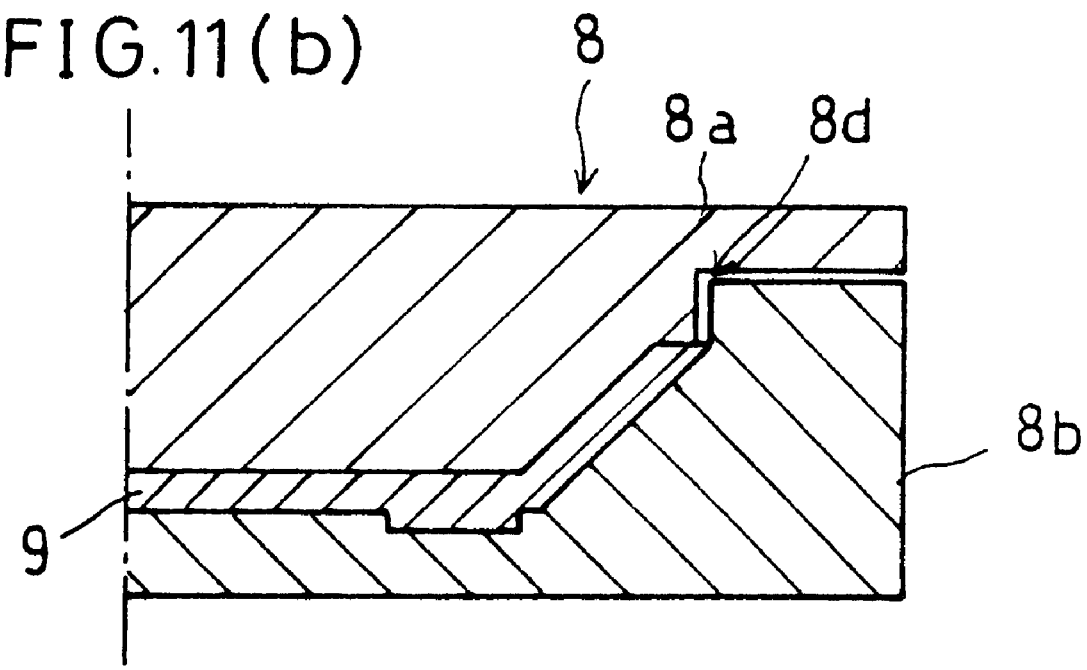
Figure 12:
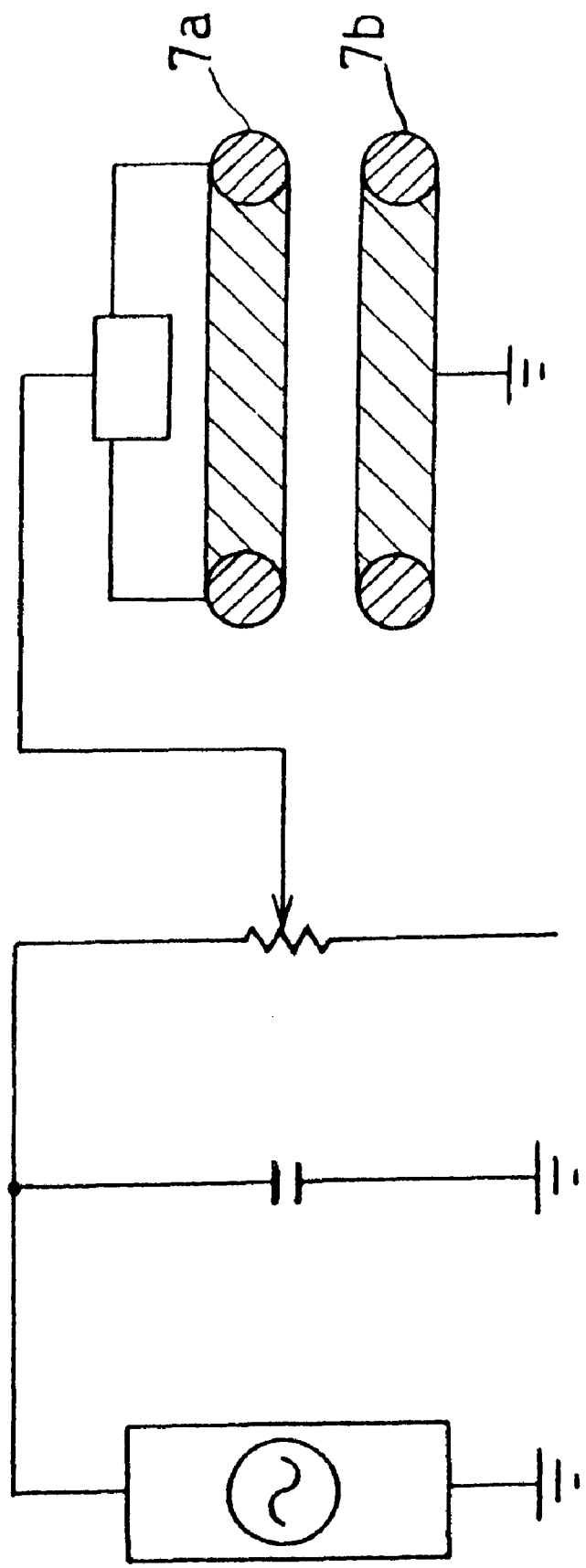
FIG. 12 is an explanatory drawing showing a further structural example of a metal mold.

Further, as shown in FIG. 11(*b*), the insulating section may be provided by means of a space 8*d* between the mold halves 8*a* and 8*b*, without using an insulating body. In this case, the range of the interval of the space 8*d* is no less than 0.3 mm and no more than one-half the thickness of the molded object. If the interval is less than 0.3 mm, insulation breakdown is likely, and sparking makes molding impossible. On the other hand, if the interval is more than one-half the thickness of the molded object, the pressure inside the mold is too low, and molding cannot be performed.

Vapor release sections are provided in order to release to the exterior of the mold large amounts of vapor produced during molding. In the case of the examples shown in FIGS. 10(*a*) and 10(*b*), these vapor release sections are provided in the insulating body 8*c*, or in a surface of the mold half 8*a* or the mold half 8*b* which is in contact with the insulating body 8*c*. In the case of the example shown in FIGS. 11(*a*) and 11(*b*), the space 8*d* (insulating section) also serves as the vapor release section.

Molded Objects

The following will explain the molded objects prepared using the foregoing materials, mold, and heating devices.

Samples shown in Table 8 and in FIGS. 13(*a*) through 19(*b*) were baked. In each case, a mold appropriate to the desired shape was used. Incidentally, although not discussed in the present embodiment, in the case of plate- or sheet-shaped cushioning material, a continuous roller method like that shown in FIG. 12 may be used, or this method may be used for post-processing of sheets.

TABLE 8

| OBJECT SHAPE | OBJECT NAME | SURFACE AREA (cm$^2$) | PROJECTED AREA (cm$^2$) | AVERAGE THICKNESS (mm) | MOLDED WEIGHT (g) | MATERIAL MIXTURE | MOLDING | |
|---|---|---|---|---|---|---|---|---|
| | | | | | | | EXTERNAL HEATING | INTERNAL HEATING |
| (1) | S TRAY | 271 | 247 | 3.5 | 14 ± 1.0 | ALL | ⊚ | ⊚ |
| (2) | D TRAY | 296 | 247 | 3.5 | 20 ± 1.5 | ALL | ⊚ | ⊚ |
| (3) | L TRAY | 532 | 484 | 3.5 | 28 ± 2.0 | ALL EXCEPT NOS. 1 THROUGH 7 | ⊚ | ⊚ |
| (4) | S TRAY (THIN) | 271 | 247 | 1.5 | 11 ± 0.5 | ALL | ⊚ | ⊚ |
| (5) | L TRAY (WITH DIVIDERS) | 581 | 484 | 3.5 | 32 ± 2.0 | ALL EXCEPT NOS. 1 THROUGH 7 | ⊚ | ⊚ |
| (6) | CUP | 208 | 43 | 2.5 | 10 ± 0.5 | ALL EXCEPT NOS. 23, 24, AND 31 | ⊚ | ⊚ |
| (7) | CORNER PAD | 188 | 100 | 50 | 50 ± 3.0 | ALL EXCEPT NOS. 23, 24, AND 31 | x | ○ |

TABLE 8-continued

| OBJECT SHAPE | OBJECT NAME | SURFACE AREA (cm²) | PROJECTED AREA (cm²) | AVERAGE THICKNESS (mm) | MOLDED WEIGHT (g) | MATERIAL MIXTURE | MOLDING EXTERNAL HEATING | MOLDING INTERNAL HEATING |
|---|---|---|---|---|---|---|---|---|
| (8) | SHEET-SHAPED OBJECT (VARYING THICKNESS) | 160 | 100 | 15 | 30 ± 3.0 | ALL | x | ⊙ |

In Table 8, object shapes (1) and (4) are shapes like that shown in FIGS. 13(a) and 13(b). For example, a length of 170 mm, a width of 145 mm, and a height of 17.5 mm, and thicknesses of 3.5 mm and 1.5 mm, respectively, may be used. The object shape (2) is a shape like that shown in FIGS. 14(a) and 14(b). For example, a length of 170 mm, a width of 145 mm, a height of 35 mm, and a thickness of 3.5 mm may be used. The object shape (3) is a shape like that shown in FIGS. 15(a) and 15(b). For example, a length of 220 mm, a width of 220 mm, a height of 2.15 mm, and a thickness of 3.5 mm may be used. The object shape (5) is a shape like that shown in FIGS. 16(a) and 16(b) having dividers. For example, a length of 220 mm, a width of 220 mm, a height of 2.15 mm, and a thickness of 3.5 mm may be used. Further, the object shape (6) is a shape like that shown in FIGS. 17(a) and 17(b). For example, a diameter of 74 mm, a height of 100 mm, and a thickness of 2.5 mm may be used. Further, the object shape (7) is a shape like that shown in FIG. 18. For example, a length of 100 mm, a width of 100 mm, a height of 100 mm, and a thickness of 50 mm may be used. Further, the object shape (8) is a shape with varying thickness like that shown in FIGS. 19(a) and 19(b). This object shape has, for example, a length of 100 mm, a width of 100 mm, a height of 100 mm, and portions where the thickness is 20 mm and portions where the thickness is 10 mm.

Since the manner in which the materials expand varies depending on the shape of the molded object, the placement of vapor release sections and mold sections in contact with the material mixture must be changed as necessary, but the method of molding is basically equivalent.

When molding by external heating, with molded objects with thick walls, such as object shape (7), the surface thereof dries during baking, but since liquid tends to remain in the interior, the molded object has no strength, and cracking, etc. makes molding difficult. Using internal heating, on the other hand, molded objects with a uniform, fine texture can be prepared not only with thin molded objects, but also with thick molded objects such as object shape (7).

Evaluation

The strength of the molded objects produced was measured and evaluated using the method shown in Table 9 and in FIGS. 20(a) and 20(b). To explain, as shown in FIGS. 20(a) and 20(b), a tray-shaped molded object 40 was placed on a hollow stand 41, and strength was measured by lowering a plunger 42 from above.

TABLE 9

MEASUREMENT OF STRENGTH

DEVICE USED: FUDOH RHEO METER NRM-2010J-CW

| MEASUREMENT NO. | MEASUREMENT 1 |
|---|---|
| SENSITIVITY | 10 kg |
| MEASURING PLUNGER SPEED | 6 cm/MINUTE |
| PLUNGER | SPHERICAL SUS; φ 20 mm |
| MEASURED VALUE ADOPTED | GREATEST MEASURED STRENGTH |

Next, the liquid content of the molded objects was measured and evaluated using the method shown in Table 10.

TABLE 10

MEASUREMENT OF LIQUID CONTENT

DEVICE USED: KETT ULTRAVIOLET LIQUID CONTENT METER FD-220

| MEASURED MATERIAL | FINELY GROUND OBJECTS |
|---|---|
| TEMPERATURE | 135° C. |
| DURATION OF MEASUREMENT | 5 TO 15 MINUTES |

Next, the extent of coloring of the molded objects was measured and evaluated using the method shown in Table 11.

TABLE 11

MEASUREMENT OF EXTENT OF COLORING

DEVICE USED: MINOLTA COLORIMETER CR-200

| MEASURED POINTS | | THREE TIMES |
|---|---|---|
| EVALUATION | L VALUE | BLACK: SMALL; WHITE: LARGE |
| | a VALUE | GREEN: SMALL; RED: LARGE |
| | b VALUE | YELLOW: SMALL; BLUE: LARGE |

Viscosity of the materials was measured using the method shown in Table 12.

TABLE 12

MEASUREMENT OF VISCOSITY OF MATERIALS

DEVICE USED: TOKYO KEIKI BM-MODEL VISCOMETER

| ROTOR | NO. 4 |
|---|---|
| REVOLUTIONS | 30 REVOLUTIONS/MINUTE |
| AT TIMES OTHER THAN WHEN IN LIQUID AND SLURRY STATES | NOT MEASURED |

Water resistant film pin-hole evaluation of the molded objects was made using the method shown in Table 13.

TABLE 13

WATER RESISTANT FILM PIN-HOLE EVALUATION

| WATER USED | COLORED WATER WITH 0.02% SURFACTANT ADDED |
|---|---|
| DURATION OF MEASUREMENT | 1 MINUTE |
| EVALUATION | ⊙ NO COLORING WHATSOEVER |
| | ○ ALMOST NO COLORING |
| | Δ SOME COLORING |
| | x ENTIRELY COLORED |

Water resistance of the molded objects was evaluated using the method shown in Table 14.

TABLE 14

EVALUATION OF WATER RESISTANCE

| WATER USED | WATER OF 20° C., 50° C., AND 80° C. TEMPERATURE |
|---|---|
| DURATION OF MEASUREMENT | 60 MINUTES |
| EVALUATION | ⊙ NO CHANGE WHATSOEVER |
| | ○ ALMOST NO CHANGE |
| | Δ SOME DEFORMATION/DETERIORATION |
| | x LEAKAGE |

Evaluation of the molding of the molded objects was made as shown in Table 15.

TABLE 15

EVALUATION OF MOLDING

| EVALUATION | ⊙ EXCELLENT |
|---|---|
| | ○ CAN BE MOLDED WITH ALMOST NO PROBLEMS |
| | Δ NEEDS IMPROVEMENT IN MOLD RELEASE, MAINTENANCE OF SHAPE, ETC. |
| | x CANNOT BE MOLDED |

Evaluation of the properties of the molded objects was made as shown in Table 16.

TABLE 16

EVALUATION OF PROPERTIES OF MOLDED OBJECTS

| PROPERTIES EVALUATED | STRENGTH, CONSISTENCY, APPEARANCE (SURFACE CONDITION, COLOR) |
|---|---|
| EVALUATION | ⊙ EXCELLENT |
| | ○ GOOD |
| | Δ FAIR |
| | x POOR |

Next, several concrete examples will be explained.

EXAMPLE 1

Specifications of the present Example were as follows.
Experiment Nos.: Nos. 1-1 through 1-42.
Material mixture: No. 3.
Heating method: As shown in Tables 17 through 20.
Object shapes: (3) and (5).

TABLE 17

OBJECT SHAPE (3)

| | CONDITIONS | | | RESULTS | | | | | | |
|---|---|---|---|---|---|---|---|---|---|---|
| | | | MOLD | | | | | | | |
| EXPERI- | | | TEMPER- | LIQUID CONTENT (%) | | | MOLDING | | | |
| MENT NO. | HEATING DEVICE | PRESSURE REDUCTION | ATURE (° C.) | AFTER 10 SECONDS | AFTER 30 SECONDS | FINAL | TIME (sec.) | PROPERTIES | MOLDING | NOTE |
| 1-1 | HA ONLY | YES | 80 | 40.5 | 37.2 | 33.5 | OVER 240 | x | x | HALF-BAKED |
| 1-2 | HA ONLY | NO | 140 | 22.1 | 15.3 | 6.5 | 150 | x | Δ | HALF-BAKED |
| 1-3 | HA ONLY | NO | 200 | 18.2 | 10.4 | 1.7 | 120 | ○ | ⊙ | |
| 1-4 | HB1 | YES | 80 | 38.5 | 35.3 | 30.0 | OVER 240 | x | x | HALF-BAKED |
| 1-5 | HB1 + HA | NO | 140 | 22.0 | 13.8 | 6.0 | 145 | Δ | Δ | HALF-BAKED |
| 1-6 | HB1 + HA | NO | 200 | 17.8 | 10.2 | 1.8 | 120 | ○ | ⊙ | |
| 1-7 | HB2 | YES | 80 | 33.4 | 28.2 | 20.2 | OVER 240 | x | x | HALF-BAKED |
| 1-8 | HB2 + HA | NO | 140 | 20.2 | 12.5 | 4.8 | 140 | Δ | Δ | |
| 1-9 | HB2 + HA | NO | 200 | 16.9 | 9.8 | 1.5 | 120 | ⊙ | ⊙ | |
| 1-10 | HB3 | YES | 80 | 30.2 | 35.3 | 13.2 | OVER 240 | x | Δ | HALF-BAKED |
| 1-11 | HB3 + HA | NO | 140 | 18.0 | 10.2 | 3.0 | 130 | ○ | ○ | |
| 1-12 | HB3 + HA | NO | 200 | 15.1 | 8.3 | 2.0 | 90 | ⊙ | ⊙ | |

TABLE 19

OBJECT SHAPE (5)

| | CONDITIONS | | | | | RESULTS | | | |
|---|---|---|---|---|---|---|---|---|---|
| EXPERI- MENT NO. | HEATING DEVICE | PRESSURE REDUCTION | MOLD TEMP. (° C.) | LIQUID CONTENT (%) AFTER 10 SECONDS | AFTER 30 SECONDS | FINAL | MOLDING TIME (sec.) | PROPERTIES | MOLDING | NOTE |
| 1-22 | HA ONLY | YES | 80 | 41.5 | 37.7 | 33.8 | OVER 240 | x | x | HALF-BAKED |
| 1-23 | HA ONLY | NO | 140 | 23.1 | 15.8 | 6.8 | 150 | x | x | DIVIDERS HALF-BAKED |
| 1-24 | HA ONLY | NO | 200 | 19.2 | 10.9 | 2.0 | 130 | ○ | ⊙ | |
| 1-25 | HB1 | YES | 80 | 39.5 | 35.8 | 30.3 | OVER 240 | x | x | HALF-BAKED |
| 1-26 | HB1 + HA | NO | 140 | 23.0 | 14.3 | 6.3 | 145 | Δ | x | DIVIDERS HALF-BAKED |
| 1-27 | HB1 + HA | NO | 200 | 18.8 | 10.7 | 2.1 | 120 | ○ | ⊙ | |
| 1-28 | HB2 | YES | 80 | 34.4 | 28.7 | 20.5 | OVER 240 | x | x | DIVIDERS HALF-BAKED |
| 1-29 | HB2 + HA | NO | 140 | 21.2 | 13.0 | 5.1 | 140 | Δ | Δ | DIVIDERS SLIGHTLY HALF-BAKED |
| 1-30 | HB2 + HA | NO | 200 | 17.9 | 10.3 | 1.8 | 120 | ⊙ | ⊙ | |
| 1-31 | HB3 | YES | 80 | 31.2 | 35.8 | 13.5 | OVER 240 | x | x | DIVIDERS HALF-BAKED |
| 1-32 | HB3 + HA | NO | 140 | 19.0 | 10.7 | 3.3 | 130 | Δ | Δ | DIVIDERS SLIGHTLY HALF-BAKED |
| 1-33 | HB3 + HA | NO | 200 | 16.1 | 8.8 | 2.3 | 90 | ⊙ | ⊙ | |

TABLE 20

OBJECT SHAPE (5)

| | CONDITIONS | | | | | RESULTS | | | |
|---|---|---|---|---|---|---|---|---|---|
| EXPERI- MENT NO. | HEATING DEVICE | PRESSURE REDUCTION | MOLD TEMP. (° C.) | LIQUID CONTENT (%) AFTER 10 SECONDS | AFTER 30 SECONDS | FINAL | MOLDING TIME (sec.) | PROPERTIES | MOLDING | NOTE |
| 1-34 | HC1 | YES | 80 | 14.2 | 8.7 | 2.8 | 120 | x | x | DIVIDERS HALF-BAKED |
| 1-35 | HC1 + HA | NO | 140 | 11.2 | 6.0 | 3.3 | 100 | ○ | Δ | DIVIDERS SLIGHTLY HALF-BAKED |
| 1-36 | HC1 + HA | NO | 200 | 9.5 | 4.6 | 3.2 | 70 | ⊙ | ⊙ | |
| 1-37 | HC2 | YES | 80 | 7.7 | 4.7 | 3.2 | 80 | x | x | DIVIDERS HALF-BAKED |
| 1-38 | HC2 + HA | NO | 140 | 6.9 | — | 3.2 | 40 | ○ | ○ | |
| 1-39 | HC2 + HA | NO | 200 | 6.1 | — | 2.1 | 35 | ⊙ | ⊙ | |
| 1-40 | HC3 | YES | 80 | 7.5 | 2.5 | 2.3 | 60 | x | x | DIVIDERS HALF-BAKED |
| 1-41 | HC3 + HA | NO | 140 | 5.8 | — | 2.3 | 30 | ○ | ○ | |
| 1-42 | HC3 + HA | NO | 200 | 4.7 | — | 2.6 | 25 | ○ | Δ | |

The results of the foregoing evaluations are as follows. Tables 18 and 20 are continuations of Tables 17 and 19, respectively.

The higher the frequency is set, the shorter the molding time, and the properties and molding of the molded objects tend to improve. However, if the frequency is set too high, sparking is likely to occur, and it becomes difficult to control sparking.

If molding time is shortened, the materials expand quickly, and the properties of the molded object tend to be weakened. Accordingly, in this case, it is necessary to select a material mixture which does not easily expand and is not likely to form keloids on its surface.

When a combination of external and internal heating is used, duration of molding is markedly shortened.

Comparing Tables 17 and 18 with Tables 19 and 20, it is evident that the difficulty of applying voltage to the divider portions makes it difficult to induce internal heating, and the divider portions may be only half-baked. This naturally impairs the properties and molding of the molded object. Since the divider portions are enclosed in the interior of one of the mold halves, when a voltage is applied to the metal mold, it is difficult to apply voltage to the dividers, and internal heating is difficult to induce. In a case like this, when a shape has portions which do not heat internally, external heating is generally also used. Further, it is also necessary to ensure that heating in these portions is equal to that in the internally heated portions by designing the metal mold so that its thickness at the portions which do not heat internally is thinner than elsewhere. In addition, another effective measure is to make it easier to apply voltage to the divider portions by adjusting the arrangement of the insulating section and the conductive body in the vicinity of the divider portions of the materials.

EXAMPLE 2

Specifications of the present Example were as follows.

Material mixtures: No. 1 through No. 7.

Object shape: (1).

Heating method: Shown in Tables 21 through 23 for material mixture Nos. 1, 3 and 6.

TABLE 21

MATERIAL MIXTURE NO. 1

| HEATING DEVICE | | | HC2 OUTPUT | | | LIQUID | MOLDING TIME (sec.) | | | SPARKING | |
|---|---|---|---|---|---|---|---|---|---|---|---|
| EXTERNAL | INTERNAL | | CONVERSION | | | CONTENT | EXTERNAL | | | FIRST | SECOND |
| HA | HB2 | HC2 | L | C1 | C2 OFF | (%) | HA | HB2 | HC2 | HALF | HALF |
| ○ | x | x | — | — | — | UNDER 3 | 150 | — | — | — | — |
| ○ | ○ | x | — | — | — | UNDER 3 | — | 150 | — | — | — |
| ○ | ○ | x | — | — | — | UNDER 3 | — | 150 | — | — | — |
| ○ | ○ | x | — | — | — | UNDER 3 | — | 150 | — | — | — |
| ○ | x | ○ | 11 | 40 | 9 | UNDER 3 | — | — | 60 | — | — |
| ○ | x | ○ | 11 | 60 | 9 | UNDER 3 | — | — | 50 | — | — |
| ○ | x | ○ | 9 | 40 | 9 | UNDER 3 | — | — | 50 | — | — |
| ○ | x | ○ | 9 | 60 | 9 | UNDER 3 | — | — | 50 | — | — |
| ○ | x | ○ | 7 | 40 | 9 | UNDER 3 | — | — | 40 | — | — |
| ○ | x | ○ | 7 | 60 | 9 | UNDER 3 | — | — | 35 | — | — |
| ○ | x | ○ | 5 | 40 | 9 | UNDER 3 | — | — | 30 | — | — |
| ○ | x | ○ | 5 | 60 | 9 | UNDER 3 | — | — | 35 | — | — |
| ○ | ○ | ○ | 11 | 40 | 9 | UNDER 3 | — | 10 | 55 | — | — |
| ○ | ○ | ○ | 11 | 60 | 9 | UNDER 3 | — | 10 | 45 | — | — |
| ○ | ○ | ○ | 9 | 40 | 9 | UNDER 3 | — | 10 | 45 | — | — |
| ○ | ○ | ○ | 9 | 60 | 9 | UNDER 3 | — | 10 | 35 | — | — |
| ○ | ○ | ○ | 7 | 40 | 9 | UNDER 3 | — | 10 | 35 | — | — |
| ○ | ○ | ○ | 7 | 60 | 9 | UNDER 3 | — | 10 | 30 | — | — |
| ○ | ○ | ○ | 5 | 40 | 9 | UNDER 3 | — | 10 | 25 | — | — |
| ○ | ○ | ○ | 5 | 60 | 9 | UNDER 3 | — | 10 | 35 | — | — |

| PROPERTIES | | | | | |
|---|---|---|---|---|---|
| STRENGTH | APPEARANCE | CONSISTENCY | EVALUATION | MOLDING | NOTE |
| HARD | POOR | COARSE | Δ | ⊙ | |
| HARD | POOR | COARSE | Δ | ⊙ | NO CURRENT FROM HB2 |
| HARD | POOR | COARSE | Δ | ⊙ | NO CURRENT FROM HB2 |
| HARD | POOR | COARSE | Δ | ⊙ | NO CURRENT FROM HB2 |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | FINE | ○ | ○ | |
| SOFT | FAIR | SLIGHTLY BURNED | Δ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | SLIGHTLY BURNED | Δ | ○ | |

TABLE 22

MATERIAL MIXTURE NO. 3

| HEATING DEVICE | | | HC2 OUTPUT CONVERSION | | | LIQUID CONTENT | MOLDING TIME (sec.) EXTERNAL | | | SPARKING | |
|---|---|---|---|---|---|---|---|---|---|---|---|
| EXTERNAL | INTERNAL | | | | | | | | | FIRST | SECOND |
| HA | HB2 | HC2 | L | C1 | C2 OFF | (%) | HA | HB2 | HC2 | HALF | HALF |
| ○ | x | x | — | — | — | UNDER 3 | 150 | — | — | — | — |
| ○ | ○ | x | — | — | — | UNDER 3 | — | 150 | — | — | — |
| ○ | ○ | x | — | — | — | UNDER 3 | — | 130 | — | — | — |
| ○ | ○ | x | — | — | — | UNDER 3 | — | 120 | — | — | — |
| ○ | x | ○ | 11 | 40 | 9 | UNDER 3 | — | — | 65 | — | — |
| ○ | x | ○ | 11 | 60 | 9 | UNDER 3 | — | — | 55 | — | — |
| ○ | x | ○ | 9 | 40 | 9 | UNDER 3 | — | — | 55 | — | — |
| ○ | x | ○ | 9 | 60 | 9 | UNDER 3 | — | — | 45 | — | — |
| ○ | x | ○ | 7 | 40 | 9 | UNDER 3 | — | — | 45 | — | — |
| ○ | x | ○ | 7 | 60 | 9 | UNDER 3 | — | — | 40 | — | — |
| ○ | x | ○ | 5 | 40 | 9 | UNDER 3 | — | — | 35 | — | — |
| ○ | x | ○ | 5 | 60 | 9 | UNDER 3 | — | — | — | YES | — |
| ○ | ○ | ○ | 11 | 40 | 9 | UNDER 3 | — | 10 | 60 | — | — |
| ○ | ○ | ○ | 11 | 60 | 9 | UNDER 3 | — | 10 | 50 | — | — |
| ○ | ○ | ○ | 9 | 40 | 9 | UNDER 3 | — | 10 | 50 | — | — |
| ○ | ○ | ○ | 9 | 60 | 9 | UNDER 3 | — | 10 | 40 | — | — |
| ○ | ○ | ○ | 7 | 40 | 9 | UNDER 3 | — | 10 | 40 | — | — |
| ○ | ○ | ○ | 7 | 60 | 9 | UNDER 3 | — | 10 | 35 | — | — |
| ○ | ○ | ○ | 5 | 40 | 9 | UNDER 3 | — | 10 | 30 | — | — |
| ○ | ○ | ○ | 5 | 60 | 9 | UNDER 3 | — | 10 | 40 | — | — |

| PROPERTIES | | | | | |
|---|---|---|---|---|---|
| STRENGTH | APPEARANCE | CONSISTENCY | EVALUATION | MOLDING | NOTE |
| HARD | POOR | COARSE | Δ | ⊙ | |
| HARD | POOR | COARSE | Δ | ⊙ | |
| HARD | FAIR | COARSE | ○ | ⊙ | |
| FAIRLY SOFT | FAIR | FAIRLY FINE | ○ | ⊙ | |
| SOFT | GOOD | FINE | ⊙ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | SLIGHTLY BURNED | Δ | ○ | |
| SOFT | FAIR | FINE | ○ | ○ | |
| — | BURNED | VERY BURNED | x | x | MATCHING UNSTABLE |
| SOFT | GOOD | FINE | ⊙ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ○ | |
| SOFT | GOOD | FINE | ⊙ | ○ | |
| SOFT | GOOD | FINE | ⊙ | ○ | |
| SOFT | FAIR | SLIGHTLY BURNED | Δ | ○ | MATCHING UNSTABLE |

TABLE 23

MATERIAL MIXTURE NO. 6

| HEATING DEVICE | | | HC2 OUTPUT CONVERSION | | | LIQUID CONTENT | MOLDING TIME (sec.) EXTERNAL | | | SPARKING | |
|---|---|---|---|---|---|---|---|---|---|---|---|
| EXTERNAL | INTERNAL | | | | | | | | | FIRST | SECOND |
| HA | HB2 | HC2 | L | C1 | C2 OFF | (%) | HA | HB2 | HC2 | HALF | HALF |
| ○ | x | x | — | — | — | UNDER 3 | 150 | — | — | — | — |
| ○ | ○ | x | — | — | — | UNDER 3 | — | 145 | — | — | — |
| ○ | ○ | x | — | — | — | UNDER 3 | — | 125 | — | — | — |
| ○ | ○ | x | — | — | — | UNDER 3 | — | 115 | — | — | — |
| ○ | x | ○ | 11 | 40 | 9 | UNDER 3 | — | — | 70 | — | — |
| ○ | x | ○ | 11 | 60 | 9 | UNDER 3 | — | — | 60 | — | — |
| ○ | x | ○ | 9 | 40 | 9 | UNDER 3 | — | — | 60 | — | — |
| ○ | x | ○ | 9 | 60 | 9 | UNDER 3 | — | — | 50 | — | — |
| ○ | x | ○ | 7 | 40 | 9 | UNDER 3 | — | — | — | YES | — |
| ○ | x | ○ | 7 | 60 | 9 | UNDER 3 | — | — | — | YES | — |
| ○ | x | ○ | 5 | 40 | 9 | UNDER 3 | — | — | — | YES | — |
| ○ | x | ○ | 5 | 60 | 9 | UNDER 3 | — | — | — | YES | — |

TABLE 23-continued

MATERIAL MIXTURE NO. 6

| | | | | | | | | | | | |
|---|---|---|---|---|---|---|---|---|---|---|---|
| ○ | ○ | ○ | 11 | 40 | 9 | UNDER 3 | — | 10 | 65 | — | — |
| ○ | ○ | ○ | 11 | 60 | 9 | UNDER 3 | — | 10 | 55 | — | — |
| ○ | ○ | ○ | 9 | 40 | 9 | UNDER 3 | — | 10 | 55 | — | — |
| ○ | ○ | ○ | 9 | 60 | 9 | UNDER 3 | — | 10 | 45 | — | — |
| ○ | ○ | ○ | 7 | 40 | 9 | UNDER 3 | — | 10 | 45 | — | — |
| ○ | ○ | ○ | 7 | 60 | 9 | UNDER 3 | — | 10 | — | YES | — |
| ○ | ○ | ○ | 5 | 40 | 9 | UNDER 3 | — | 10 | — | YES | — |
| ○ | ○ | ○ | 5 | 60 | 9 | UNDER 3 | — | 10 | — | YES | — |

| PROPERTIES | | | | | |
|---|---|---|---|---|---|
| STRENGTH | APPEARANCE | CONSISTENCY | EVALUATION | MOLDING | NOTE |
| HARD | POOR | COARSE | Δ | ⊙ | |
| HARD | POOR | COARSE | Δ | ⊙ | |
| FAIRLY SOFT | FAIR | FAIRLY FINE | ○ | ⊙ | |
| FAIRLY SOFT | FAIR | FAIRLY FINE | ○ | ⊙ | |
| SOFT | GOOD | FINE | ⊙ | ○ | |
| SOFT | GOOD | FINE | ⊙ | ⊙ | |
| SOFT | FAIR | FINE | ⊙ | ⊙ | |
| SOFT | FAIR | SLIGHTLY BURNED | ○ | ○ | |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | SLIGHTLY BURNED | ○ | ○ | |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |

In each of the Tables, the values under the headings "L," "C1," and "C2 OFF" are values for the L component, the C1 component, and the C2 component, respectively, set in order to adjust output during heating by internal heating at a predetermined frequency. "C2 OFF" indicates that, although the automatic capacitor C2 usually functions as an automatic capacitor, that function has been turned off here, and the value set manually. These matters are also true for each of the following Examples.

The results of the foregoing evaluations were as follows.

At 200 Hz, material mixture No. 1, which contained no salt, i.e., electrolyte, did not heat internally, and there was no difference from heating with external heating alone.

At 13.56 MHz, heating was possible at each of the different salt concentrations, but with higher concentrations, increased conductivity led to marked sparking, and with material mixture No. 6, it was impossible to control molding so as to prevent sparking. Even with the same concentration, sparking was more likely the higher the frequency. It was also found that sparking could be controlled by decreasing the electric field between the electrodes by holding down output.

With material mixture No. 6, because of the difficulty of controlling sparking, output had to be decreased substantially, and thus molding time was increased. With material mixture No. 7, it was found that by changing the type of electrolyte, the range of control was increased, making control easier, and better molded objects could be obtained.

EXAMPLE 3

Specifications of the present Example were as follows.

Material mixture: No. 3.

Heating method: As shown in Tables 24 and 25.

Object shape: (1).

TABLE 24

| HEATING DEVICE | | | MOLD | LIQUID | MOLDING | PROPERTIES | | | |
|---|---|---|---|---|---|---|---|---|---|
| EXTERNAL | INTERNAL | | PRESSURE | TEMP. | CONTENT | TIME | STRENGTH | COLORING | | |
| HA | HB2 | HC2 | REDUCTION | (° C.) | (%) | (sec.) | (Kg.) | L VALUE | a VALUE | b VALUE |
| x | x | x | YES | 50 | — | OVER 240 | * | — | — | — |
| x | x | x | NO | 50 | — | OVER 240 | * | — | — | — |
| ○ | x | x | YES | 110 | 18.2 | OVER 240 | * | 87 | −0.7 | 2.1 |
| ○ | x | x | NO | 110 | 20.2 | OVER 240 | * | 86.3 | −0.7 | 2.1 |
| ○ | x | x | NO | 170 | 2.8 | 130 | 1.55 | 82.6 | −0.2 | 5.1 |

TABLE 24-continued

| | | | | | | | | | | | |
|---|---|---|---|---|---|---|---|---|---|---|---|
| ○ | x | x | NO | 230 | 1.2 | 100 | 1.2 | 80.1 | 0 | 7.8 | |
| x | ○ | x | YES | 50 | 33.5 | OVER 240 | * | 87 | −0.7 | 1.9 | |
| x | ○ | x | NO | 50 | 35.2 | OVER 240 | * | 87 | −0.7 | 1.9 | |
| ○ | ○ | x | YES | 110 | 14 | 170 | 1.9 | 87 | −0.7 | 1.9 | |
| ○ | ○ | x | NO | 110 | 15 | OVER 240 | 1.8 | 86.8 | −0.7 | 2.0 | |
| ○ | ○ | x | NO | 170 | 1.7 | 120 | 1.65 | 83.5 | −0.3 | 3.9 | |
| ○ | ○ | x | NO | 230 | 1.2 | 90 | 1.2 | 81.2 | −0.1 | 6.5 | |

| PROPERTIES | | MOLDING | | |
|---|---|---|---|---|
| APPEARANCE | CONSISTENCY | EVALUATION | SHAPE MAINTENANCE | MOLD RELEASE | NOTE |
| VERY WRINKLED/DEFORMED | RAW INSIDE | x | x | x | NO CHANGE |
| VERY WRINKLED/DEFORMED | RAW INSIDE | x | x | x | NO CHANGE |
| VERY WRINKLED/DEFORMED | RAW INSIDE | x | x | x | SURFACE α-TYPE |
| VERY WRINKLED/DEFORMED | RAW INSIDE | x | x | x | SURFACE α-TYPE |
| GOOD | COARSE | ○ | ⊚ | ⊚ | |
| GOOD | COARSE | ○ | ○ | ○ | SLIGHTLY BRITTLE |
| VERY WRINKLED/DEFORMED | RAW INSIDE | x | x | x | NO CHANGE |
| VERY WRINKLED/DEFORMED | RAW INSIDE | x | x | x | NO CHANGE |
| WRINKLED/DEFORMED | RAW INSIDE | Δ | Δ | Δ | ENTIRETY α-TYPE |
| WRINKLED/DEFORMED | RAW INSIDE | Δ | x | Δ | ENTIRETY α-TYPE |
| GOOD | SLIGHTLY COARSE | ○ | ⊚ | ⊚ | |
| GOOD | SLIGHTLY COARSE | ○ | ○ | ○ | SLIGHTLY BRITTLE |

*:UNMEASURABLE

TABLE 25

| HEATING DEVICE | | | PRESSURE REDUCTION | MOLD TEMP. (° C.) | LIQUID CONTENT (%) | MOLDING TIME (sec.) | PROPERTIES | | | |
|---|---|---|---|---|---|---|---|---|---|---|
| EXTERNAL | INTERNAL | | | | | | STRENGTH (Kg.) | COLORING | | |
| HA | HB2 | HC2 | | | | | | L VALUE | a VALUE | b VALUE |
| x | x | ○ | YES | 50 | 2.9 | 90 | 2.7 | 87 | −0.8 | 1.8 |
| x | x | ○ | NO | 50 | 2.9 | 90 | 2.5 | 87 | −0.8 | 1.8 |
| ○ | x | ○ | YES | 110 | 3.3 | 60 | 2.5 | 87 | −0.8 | 1.8 |
| ○ | x | ○ | NO | 110 | 3.4 | 70 | 2.3 | 87 | −0.8 | 1.8 |
| ○ | x | ○ | NO | 170 | 2.3 | 40 | 2.4 | 86.2 | −0.6 | 2.1 |
| ○ | x | ○ | NO | 230 | 1.8 | 25 | 1.95 | 85.2 | −0.5 | 2.9 |
| x | ○ | ○ | YES | 50 | 2.6 | 100 | 2.85 | 87 | −0.8 | 1.8 |
| x | ○ | ○ | NO | 50 | 2.6 | 100 | 2.65 | 87 | −0.8 | 1.8 |
| ○ | ○ | ○ | YES | 110 | 3.4 | 70 | 2.65 | 87 | −0.8 | 1.8 |
| ○ | ○ | ○ | NO | 110 | 3.3 | 80 | 2.45 | 87 | −0.8 | 1.8 |
| ○ | ○ | ○ | NO | 170 | 1.9 | 45 | 2.55 | 85.8 | −0.6 | 2.5 |
| ○ | ○ | ○ | NO | 230 | 2.1 | 30 | 2.1 | 85.3 | −0.5 | 3.8 |

| PROPERTIES | | MOLDING | | |
|---|---|---|---|---|
| APPEARANCE | TEXTURE | EVALUATION | SHAPE MAINTENANCE | MOLD RELEASE | NOTE |
| GOOD | FINE | ○ | ⊚ | ○ | |
| VERY WRINKLED/DEFORMED | FINE | x | x | x | SPARKING |
| EXCELLENT | FINE | ⊚ | ⊚ | ⊚ | |
| GOOD | FINE | ○ | ⊚ | ⊚ | |
| EXCELLENT | FINE | ⊚ | ⊚ | ⊚ | |
| EXCELLENT | FINE | ⊚ | ⊚ | ⊚ | |
| GOOD | FINE | ○ | ⊚ | ○ | |
| VERY WRINKLED/DEFORMED | FINE | x | x | x | SPARKING |
| EXCELLENT | FINE | ⊚ | ⊚ | ⊚ | |
| GOOD | FINE | ○ | ⊚ | ⊚ | |
| EXCELLENT | FINE | ⊚ | ⊚ | ⊚ | |
| EXCELLENT | FINE | ⊚ | ⊚ | ⊚ | |

*: UNMEASURABLE

The results of the foregoing investigations are as follows. Table 25 is a continuation of Table 24.

When molding using external heating or in the low frequency range, molding could not be performed unless the mold temperature was at least 140° C. to 150° C. Further, whether molding was successful or unsuccessful had little to do with reduction of pressure, etc., but depended almost entirely on mold temperature.

With molding in the low frequency range, drying as a result of internal heating progressed somewhat more than with external heating alone, but the difference was small.

With molding in the high frequency range, when the temperature of the metal mold and the vapor release sections was 100° C. or less, reduction of pressure was definitely necessary. Without reduction of pressure, water vapor condensed, especially around the vapor release sections, and molding was impossible due to sparking. If the temperature was over 100° C., water vapor produced from the materials exited from the metal mold, and did not condense. Under these conditions, reduction of pressure was unnecessary, and good molded objects could be manufactured.

FIGS. 21(a) and 21(b) show the appearance of the materials 9 during molding. As shown in these Figures, there are deposited areas 9a, where the materials 9 are initially deposited (injected), surrounded by an expanded area 9b, into which the materials expand due to foaming. With molding by external heating, the appearance of the deposited areas 9a was poor. With molding by internal heating, the deposited areas 9a had an excellent appearance.

With external heating alone, the molded object is likely to be non-uniform, with an uneven surface in the deposited areas 9a, and a coarse internal texture. FIG. 23 shows the internal consistency of a molded object manufactured using external heating. With external heating, only the particles at the surface have small diameters, and those in the interior are coarse.

With molding in the low frequency range, in contrast, the properties obtained were somewhat better than with external heating alone. with molding in the high frequency range, properties of the molded objects tended to be excellent. Color difference between the deposited areas 9a and the expanded area 9b was small, there was little surface unevenness or difference in strength, and a molded object with fine, uniform consistency could be manufactured. FIG. 22 shows the internal texture of a molded object manufactured using internal heating. With internal heating, particle diameters both on the surface and in the interior are sufficiently small.

EXAMPLE 4

In the Examples which follow, molding with each of the object shapes was confirmed. Extracts from the results thereof will be discussed below.

In the present Example, the influence of liquid content was investigated. Specifications were as follows.

Experiment Nos.: Nos. 4-1 through 4-7.

Material mixtures: No. 8 through No. 14.

Object shape: (1).

The heating method was heating with heating device HC2 at a mold temperature of 170° C. The results were as shown in Table 26 below.

TABLE 26

| EXPERIMENT NO. | MATERIAL MIXTURE NO. | HEATING DEVICE | PROPERTIES | MOLDING | NOTE |
|---|---|---|---|---|---|
| 4-1 | 8 | HC2 | ○ | ◎ | |
| 4-2 | 9 | | ◎ | ◎ | |
| 4-3 | 10 | | ◎ | ◎ | |
| 4-4 | 11 | | ◎ | ◎ | |
| 4-5 | 12 | | ◎ | ◎ | |
| 4-6 | 13 | | ◎ | ◎ | |
| 4-7 | 14 | | ○ | ◎ | |

Varying the liquid content of the materials influenced the properties of the molded objects, but good molding was obtained in each case.

With regard to the properties of the molded objects, the lower the original liquid content, the harder the molded object obtained. Applying this principle, it can be seen that the properties of the molded object can be adjusted by varying the liquid content of the materials. However, since the materials after mixing may be in a dough state, or, even if in a slurry state, may have varying viscosities, the method of depositing the materials into the metal mold should make use of a structure in keeping with the material mixture used.

The liquid content of the materials was varied widely, but it was sufficient merely to provide a deposit (injection) structure in keeping with the properties of the materials; there were no problems with molding or with properties after molding. However, with lower liquid content and more solids, harder molded objects tended to be produced. Consequently, it was shown that the liquid content may be set in keeping with the desired shape and use of the molded object.

EXAMPLE 5

In the present Example, the influence of mold release agent was investigated. Specifications were as follows.

Experiment Nos. Nos. 5-1 through 5-7.

Material mixtures: No. 15 through No. 21.

Object shape: (2).

The heating method was heating with heating device HC2 at a mold temperature of 170° C. The results were as shown in Table 27 below.

TABLE 27

| EXPERIMENT NO. | MATERIAL MIXTURE NO. | HEATING DEVICE | PROPERTIES | MOLDING | NOTE |
|---|---|---|---|---|---|
| 5-1 | 15 | HC2 | ◎ | ◎ | |
| 5-2 | 16 | | ◎ | ◎ | |
| 5-3 | 17 | | ◎ | ◎ | |
| 5-4 | 18 | | ◎ | ◎ | |
| 5-5 | 19 | | ○ | ○ | |
| 5-6 | 20 | | ◎ | ◎ | |
| 5-7 | 21 | | ◎ | ◎ | |

Molded objects were able to be prepared even when the quantity and type of mold release agent were varied. If too much mold release agent is used, expansion of the materials is poor, and internal heating tends to be suppressed. Accordingly, the smallest quantity necessary for mold release of the molded object should be added.

Instead of vegetable oils or fatty acids, salts of fatty acids may be used.

EXAMPLE 6

In the present Example, the influence of starch was investigated. Specifications were as follows.

Experiment Nos. No. 6-1 through No. 6-30.

Material mixtures: No. 22 through No. 31. The starches used were potato, corn, and tapioca.

Object shapes: (1), (6), and (7).

The heating method was heating with heating device HC2 at a mold temperature of 170° C. The results were as shown in Tables 28 and 29 below.

TABLE 28

| EXPERIMENT NO. | MATERIAL MIXTURE NO. | SHAPE | HEATING DEVICE | PROPERTIES | MOLDING | NOTE |
|---|---|---|---|---|---|---|
| 6-1 | 22 | (1) | HC2 | ◎ | ◎ | |
| 6-2 | 23 | | | ◎ | ◎ | |
| 6-3 | 24 | | | ◎ | ◎ | |
| 6-4 | 25 | | | ◎ | ◎ | |
| 6-5 | 26 | | | ◎ | ◎ | |
| 6-6 | 27 | | | ◎ | ◎ | |
| 6-7 | 28 | | | ◎ | ◎ | |
| 6-8 | 29 | | | ◎ | ◎ | |
| 6-9 | 30 | | | ◎ | ◎ | |
| 6-10 | 31 | | | ◎ | ◎ | |
| 6-11 | 22 | (6) | HC2 | ◎ | ◎ | |
| 6-12 | 23 | | | ○ | ○ | |
| 6-13 | 24 | | | ◎ | ◎ | |
| 6-14 | 25 | | | ◎ | ◎ | |
| 6-15 | 26 | | | ◎ | ◎ | |
| 6-16 | 27 | | | ◎ | ◎ | |
| 6-17 | 28 | | | ◎ | ◎ | |
| 6-18 | 29 | | | ◎ | ◎ | |
| 6-19 | 30 | | | ◎ | ◎ | |
| 6-20 | 31 | | | △ | △ | |

TABLE 29

| EXPERIMENT NO. | MATERIAL MIXTURE NO. | SHAPE | HEATING DEVICE | PROPERTIES | MOLDING | NOTE |
|---|---|---|---|---|---|---|
| 6-21 | 22 | (7) | HC2 | ◎ | ◎ | |
| 6-22 | 23 | | | ○ | ○ | |
| 6-23 | 24 | | | △ | △ | |
| 6-24 | 25 | | | ◎ | ◎ | |
| 6-25 | 26 | | | ◎ | ◎ | |
| 6-26 | 27 | | | ◎ | ◎ | |
| 6-27 | 28 | | | ◎ | ◎ | |
| 6-28 | 29 | | | ◎ | ◎ | |
| 6-29 | 30 | | | ◎ | ◎ | |
| 6-30 | 31 | | | △ | △ | |

Varying the quantity and type of starch in the materials influenced molding, but good molding was obtained in each case. The properties of the molded objects varied greatly, especially according to the type of starch used, and since expansion, hardness, etc. could be varied, it was possible to make adjustments, by changing the type and quantity of starch, in order to obtain necessary expansion (shape), hardness, etc. Various amounts of starch were included in the material mixtures, but this caused no problems with regard to molding and properties of the molded objects.

Object shapes (1) through (5) are long in an in-plane direction, and thus expansion in this direction, i.e., in-plane expansion, is important. Object shape (6) is long in the direction of the axis of the cup, and thus expansion in this direction, i.e., longitudinal expansion, is important. With object shape (7), it is preferable to use a starch having superior expansion.

EXAMPLE 7

In the present Example, re-use of molded objects was investigated. Specifications were as follows.

Experiment Nos.: Nos. 7-1 and 7-2.

Material mixtures: Nos. 15 through 21, No. 25, and Nos. 32 through 38.

Object shape: (1).

The heating method was heating with heating device HC2 at a mold temperature of 170° C. The results were as shown in Table 30 below. The results for material mixtures 25 and 32 are shown here.

TABLE 30

| EXPERIMENT NO. | MATERIAL MIXTURE NO. | HEATING DEVICE | PROPERTIES | MOLDING | NOTE |
|---|---|---|---|---|---|
| 7-1 | 25 | HC2 | ◎ | ◎ | |
| 7-2 | 32 | HC2 | ◎ | ◎ | |

Previously molded objects and burrs protruding from between the mold halves were gathered, impurities were removed therefrom, and they were ground and added to the mixer with the starch, etc., and stirred and mixed together. Good molding and good properties were obtained, and in this way burrs and defective molded objects can be re-used, and loss reduced.

Further, it was proven in the present Example that burrs produced during molding, and defective molded objects, can be re-used by mixing with the original materials after purification and grinding.

In addition, since viscosity of the material mixture was increased by the addition of the ground matter, the quantity of stabilizers added had to be reduced to the same extent. However, there was almost no significant difference in properties and molding; both of these were good. Further, smoothness of the materials was increased, and this enabled improvement of depositing.

EXAMPLE 8

In the present Example, the influence of strength/flexibility imparting agents was investigated. Specifications were as follows.

Experiment Nos. Nos. 8-1 through 8-14.

Material mixtures: No. 32 through No. 38.

Object shapes: (1) and (3).

The heating method was heating with heating device HC2 at a mold temperature of 170° C. The results were as shown in Table 31 below.

TABLE 31

| EXPERIMENT NO. | MATERIAL MIXTURE NO. | SHAPE | HEATING DEVICE | PROPERTIES | MOLDING | NOTE |
|---|---|---|---|---|---|---|
| 8-1 | 32 | (1) | HC2 | ◎ | ◎ | |
| 8-2 | 33 | | | ◎ | ◎ | |
| 8-3 | 34 | | | ◎ | ◎ | |
| 8-4 | 35 | | | ◎ | ◎ | |
| 8-5 | 36 | | | ◎ | ◎ | |
| 8-6 | 37 | | | ◎ | ◎ | |
| 8-7 | 38 | | | ◎ | ◎ | |
| 8-8 | 32 | (3) | HC2 | ○ | ◎ | |
| 8-9 | 33 | | | ◎ | ◎ | |
| 8-10 | 34 | | | ◎ | ◎ | |
| 8-11 | 35 | | | ◎ | ◎ | |
| 8-12 | 36 | | | ◎ | ◎ | |
| 8-13 | 37 | | | ○ | ◎ | |
| 8-14 | 38 | | | ◎ | ◎ | |

Strength and flexibility of the molded objects was increased by adding strength/flexibility imparting agents, and better molded objects could be obtained. With molded objects having shapes with large surface area, such as object shapes (3) and (5), it is more necessary to increase strength per unit surface area than with molded objects having shapes such as object shape (1), and in this case adding strength/flexibility imparting agents was effective.

EXAMPLE 9

In the present Example, the influence of adding colorant was investigated. Specifications were as follows.
Experiment Nos. Nos. 9-1 through 9-7.
Material mixtures: No. 39 through No. 45.
Object shape: (1).
The heating method was heating with heating device HC2 at a mold temperature of 170° C. The results were as shown in Table 33 below.

TABLE 32

| EXPERIMENT NO. | MATERIAL MIXTURE NO. | HEATING DEVICE | PROPERTIES | MOLDING | NOTE |
|---|---|---|---|---|---|
| 9-1 | 39 | HC2 | ◎ | ◎ | |
| 9-2 | 40 | | ◎ | ◎ | |
| 9-3 | 41 | | ◎ | ◎ | |
| 9-4 | 42 | | ◎ | ◎ | |
| 9-5 | 43 | | ◎ | ◎ | |
| 9-6 | 44 | | ◎ | ◎ | |
| 9-7 | 45 | | ◎ | ◎ | |

It was confirmed that, using the same colorant, internal heating was able to obtain an equivalent color difference using less colorant than with external heating alone.

EXAMPLE 10

First, using FIGS. 24 through 30, the following will explain setting of a good oscillator vacuum tube anode current for molding by internal heating (high frequency range).

If a graph is prepared of the relationship between heating time (horizontal axis) and the oscillator vacuum tube anode amperage flowing through the metal mold (vertical axis), as shown in FIG. 24, at the commencement of heating, there are cases in which too much current flows, and this excessive current (output) can lead to sparking, burning of the molded object, etc. Possible reasons for this include:

(1) The maximum amperage is too high (output is too large);
(2) The materials in the metal mold are in an unstable state;
(3) The quantity of salt contained is too large; and
(4) Pressure inside the metal mold is too high.

In such cases, measures are taken such as decreasing the output (as shown by curve A in FIG. 25), making the slope of the increase in current more gradual (as shown by curve B in FIG. 25), etc. Alternatively, as shown in FIG. 26, measures may be taken to stabilize the state of the materials in the initial stage of heating by adding a material stabilization step C in the initial stage of heating. By means of these measures, excessive increase of the anode amperage can be controlled.

As shown in FIG. 27, in the latter half of heating, there are cases in which the current remains at an unnecessarily high level, and since the amperage during the drying stage is too high, sparking, burning of the molded object, etc. may occur. Possible reasons for this include:

(1) The quantity of salt contained is too large;
(2) The materials contain a large quantity of materials which easily burn; and
(3) The quantity of materials is insufficient.

In such cases, as shown in FIG. 28, measures are taken to reduce output. Alternatively, as shown by the solid line in FIG. 29, measures may be taken to prolong the time the maximum amperage is maintained. By means of these measures, excessive anode amperage in the latter half of heating can be controlled.

For example, as shown in FIG. 30, output can be changed by changing the L component and the C component. Curve a is a case in which the L component is short, and the C component is narrow. Curve c is a case in which the L component is long, and the C component is wide. Curve b is a case in which the values of the L component and the C component are intermediate between their respective values in curves a and c. If the L component and the C component are changed, heating conditions can be changed by altering the shape of this graph, and the aforementioned control of amperage can be performed.

If suitable control of output is used in this way to control at least initial current, sparking during the latter half, and burning, then superior, soft molded objects with a uniform, fine consistency and good appearance can be obtained. Accordingly, the key is to find optimum settings for mold structure, material mixture, and internal heating conditions.

In order to find such optimum conditions, the following experiments were carried out.
Material mixture: No. 3
Object shape: (1)
The heating method and results are shown in Tables 33 through 36.

In Tables 35 and 36, "C2 ON" indicates that the automatic capacitor C2 is functioning as an automatic capacitor, and "AUTOMATIC" indicates that it actually functioned automatically. These matters are also true for each of the following Examples.

TABLE 33

| HEATING DEVICE | | | HC2 OUTPUT | | | LIQUID | MOLDING TIME (sec.) | | | SPARKING | |
|---|---|---|---|---|---|---|---|---|---|---|---|
| EXTERNAL | INTERNAL | | CONVERSION | | | CONTENT | EXTERNAL | | | FIRST | SECOND |
| HA | HB2 | HC2 | L | C1 | C2 OFF | (%) | HA | HB2 | HC2 | HALF | HALF |
| ○ | x | x | — | — | — | 2.8 | 150 | — | — | — | — |
| ○ | ○ | x | — | — | — | 2.8 | — | 120 | — | — | — |
| ○ | x | ○ | 11 | 40 | 9 | 2.4 | — | — | 60 | — | — |
| ○ | x | ○ | 11 | 60 | 9 | 2.4 | — | — | 50 | — | — |
| ○ | x | ○ | 9 | 40 | 9 | 2.9 | — | — | 50 | — | — |
| ○ | x | ○ | 9 | 60 | 9 | 2.7 | — | — | 40 | — | — |

TABLE 33-continued

| | | | | | | | | | | | |
|---|---|---|---|---|---|---|---|---|---|---|---|
| ○ | x | ○ | 7 | 40 | 9 | 2.4 | — | — | 40 | — | — |
| ○ | x | ○ | 7 | 60 | 9 | 2.4 | — | — | 30 | — | — |
| ○ | x | ○ | 5 | 40 | 9 | 2.7 | — | — | 30 | — | — |
| ○ | x | ○ | 5 | 60 | 9 | 2.9 | — | — | — | YES | — |
| ○ | ○ | ○ | 11 | 40 | 9 | 2.7 | — | 5 | 60 | — | — |
| ○ | ○ | ○ | 11 | 60 | 9 | 2.3 | — | 5 | 50 | — | — |
| ○ | ○ | ○ | 9 | 40 | 9 | 2.5 | — | 5 | 50 | — | — |
| ○ | ○ | ○ | 9 | 60 | 9 | 2.9 | — | 5 | 40 | — | — |
| ○ | ○ | ○ | 7 | 40 | 9 | 2.4 | — | 5 | 40 | — | — |
| ○ | ○ | ○ | 7 | 60 | 9 | 2.4 | — | 5 | 35 | — | — |
| ○ | ○ | ○ | 5 | 40 | 9 | 2.7 | — | 5 | 35 | — | — |
| ○ | ○ | ○ | 5 | 60 | 9 | 2.9 | — | 5 | 40 | — | — |

| PROPERTIES | | | | | |
|---|---|---|---|---|---|
| HARDNESS | APPEARANCE | TEXTURE | EVALUATION | MOLDING | NOTE |
| HARD | POOR | COARSE | Δ | ⊚ | |
| SLIGHTLY SOFT | FAIR | FAIRLY FINE | ○ | ⊚ | |
| SOFT | GOOD | FINE | ⊚ | ○ | |
| SOFT | GOOD | FINE | ⊚ | ○ | |
| SOFT | GOOD | FINE | ⊚ | ○ | |
| SOFT | GOOD | FINE | ⊚ | ⊚ | |
| SOFT | GOOD | FINE | ⊚ | ⊚ | |
| SOFT | FAIR | SLIGHTLY BURNED | Δ | ○ | |
| SOFT | FAIR | FINE | ○ | ○ | |
| — | BURNED | VERY BURNED | x | x | MATCHING UNSTABLE |
| SOFT | GOOD | FINE | ⊚ | ○ | |
| SOFT | GOOD | FINE | ⊚ | ○ | |
| SOFT | GOOD | FINE | ⊚ | ○ | |
| SOFT | GOOD | FINE | ⊚ | ⊚ | |
| SOFT | GOOD | FINE | ⊚ | ⊚ | |
| SOFT | GOOD | FINE | ⊚ | ○ | |
| SOFT | GOOD | FINE | ⊚ | ○ | |
| SOFT | FAIR | SLIGHTLY BURNED | Δ | ○ | MATCHING UNSTABLE |

TABLE 34

| HEATING DEVICE | | HC2 OUTPUT | | | LIQUID | MOLDING TIME (sec.) | | | SPARKING | |
|---|---|---|---|---|---|---|---|---|---|---|
| EXTERNAL | INTERNAL | CONVERSION | | | CONTENT | EXTERNAL | | | FIRST | SECOND |
| HA | HB2 HC2 | L | C1 | C2 OFF | (%) | HA | HB2 | HC2 | HALF | HALF |
| ○ | x ○ | 11 | 40 | 7 | 2.3 | — | — | 80 | — | — |
| ○ | x ○ | 11 | 60 | 7 | 2.8 | — | — | 70 | — | — |
| ○ | x ○ | 9 | 40 | 7 | 2.9 | — | — | 70 | — | — |
| ○ | x ○ | 9 | 60 | 7 | 2.7 | — | — | 60 | — | — |
| ○ | x ○ | 7 | 40 | 7 | 2.3 | — | — | 60 | — | — |
| ○ | x ○ | 7 | 60 | 7 | 2.8 | — | — | 50 | — | — |
| ○ | x ○ | 5 | 40 | 7 | 2.9 | — | — | 45 | — | — |
| ○ | x ○ | 5 | 60 | 7 | 2.7 | — | — | 45 | — | — |
| ○ | ○ ○ | 11 | 40 | 7 | 2.7 | — | 5 | 80 | — | — |
| ○ | ○ ○ | 11 | 60 | 7 | 2.5 | — | 5 | 70 | — | — |
| ○ | ○ ○ | 9 | 40 | 7 | 2.8 | — | 5 | 70 | — | — |
| ○ | ○ ○ | 9 | 60 | 7 | 2.4 | — | 5 | 60 | — | — |
| ○ | ○ ○ | 7 | 40 | 7 | 2.8 | — | 5 | 60 | — | — |
| ○ | ○ ○ | 7 | 60 | 7 | 2.4 | — | 5 | 50 | — | — |
| ○ | ○ ○ | 5 | 40 | 7 | 2.7 | — | 5 | 45 | — | — |
| ○ | ○ ○ | 5 | 60 | 7 | 2.9 | — | 5 | 45 | — | — |

| PROPERTIES | | | | | |
|---|---|---|---|---|---|
| HARDNESS | APPEARANCE | TEXTURE | EVALUATION | MOLDING | NOTE |
| SOFT | FAIR | FINE | ⊚ | ⊚ | |
| SOFT | FAIR | FINE | ⊚ | ⊚ | |
| SOFT | FAIR | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | FAIR | SLIGHTLY BURNED | Δ | ○ | |
| SOFT | FAIR | FINE | ○ | ○ | |
| SOFT | FAIR | FINE | ○ | ○ | |
| SOFT | FAIR | FINE | ○ | ⊚ | |

TABLE 34-continued

| | | | | |
|---|---|---|---|---|
| SOFT | GOOD | FINE | ⊙ | ⊙ |
| SOFT | GOOD | FINE | ⊙ | ⊙ |
| SOFT | GOOD | FINE | ⊙ | ⊙ |
| SOFT | GOOD | FINE | ⊙ | ⊙ |
| SOFT | GOOD | FINE | ⊙ | ⊙ |

TABLE 35

| HEATING DEVICE | | | HC2 OUTPUT | | | AMPERAGE | LIQUID CONTENT | MOLDING TIME (sec.) | | |
|---|---|---|---|---|---|---|---|---|---|---|
| EXTERNAL | INTERNAL | | CONVERSION | | | | | EXTERNAL | | |
| HA | HB2 | HC2 | L | C1 | C2 ON | (A) | (%) | HA | HB2 | HC2 |
| o | x | o | 11 | 60 | AUTOMATIC | 1 | 2.3 | — | — | 40 |
| o | x | o | 11 | 80 | AUTOMATIC | 1 | 2.8 | — | — | 30 |
| o | x | o | 9 | 60 | AUTOMATIC | 1 | 2.9 | — | — | 35 |
| o | x | o | 9 | 80 | AUTOMATIC | 1 | 2.7 | — | — | — |
| o | x | o | 7 | 60 | AUTOMATIC | 1 | 2.3 | — | — | — |
| o | x | o | 7 | 80 | AUTOMATIC | 1 | 2.8 | — | — | — |
| o | x | o | 5 | 60 | AUTOMATIC | 1 | 2.9 | — | — | — |
| o | x | o | 5 | 80 | AUTOMATIC | 1 | 2.7 | — | — | — |
| o | o | o | 11 | 60 | AUTOMATIC | 1 | 2.9 | — | 5 | 40 |
| o | o | o | 11 | 80 | AUTOMATIC | 1 | 2.7 | — | 5 | 30 |
| o | o | o | 9 | 60 | AUTOMATIC | 1 | 2.8 | — | 5 | 35 |
| o | o | o | 9 | 80 | AUTOMATIC | 1 | 2.4 | — | 5 | 30 |
| o | o | o | 7 | 60 | AUTOMATIC | 1 | 2.8 | — | 5 | 25 |
| o | o | o | 7 | 80 | AUTOMATIC | 1 | 2.4 | — | 5 | — |
| o | o | o | 5 | 60 | AUTOMATIC | 1 | 2.7 | — | 5 | — |
| o | o | o | 5 | 80 | AUTOMATIC | 1 | 2.9 | — | 5 | — |

| SPARKING | | PROPERTIES | | | | | |
|---|---|---|---|---|---|---|---|
| FIRST HALF | SECOND HALF | HARDNESS | APPEARANCE | TEXTURE | EVALUATION | MOLDING | NOTE |
| — | — | SOFT | GOOD | FINE | ⊙ | o | |
| — | — | SOFT | FAIR | SLIGHTLY BURNED | Δ | o | |
| — | — | SOFT | GOOD | FINE | ⊙ | ⊙ | |
| — | YES | SOFT | BURNED | SLIGHTLY BURNED | Δ | x | * |
| — | YES | SOFT | BURNED | SLIGHTLY BURNED | x | x | * |
| YES | — | — | BURNED | VERY BURNED | x | x | * |
| YES | — | — | BURNED | VERY BURNED | x | x | * |
| YES | — | — | BURNED | VERY BURNED | x | x | * |
| — | — | SOFT | GOOD | FINE | ⊙ | o | |
| — | — | SOFT | GOOD | FINE | ⊙ | o | |
| — | — | SOFT | GOOD | FINE | ⊙ | ⊙ | |
| — | — | SOFT | GOOD | FINE | ⊙ | ⊙ | |
| — | — | SOFT | GOOD | FINE | ⊙ | o | |
| — | YES | SOFT | BURNED | SLIGHTLY BURNED | x | x | * |
| YES | — | — | BURNED | VERY BURNED | x | x | * |
| YES | — | — | BURNED | VERY BURNED | x | x | * |

*: MATCHING UNSTABLE

TABLE 36

| HEATING DEVICE | | | HC2 OUTPUT | | | AMPERAGE | LIQUID CONTENT | MOLDING TIME (sec.) | | |
|---|---|---|---|---|---|---|---|---|---|---|
| EXTERNAL | INTERNAL | | CONVERSION | | | | | EXTERNAL | | |
| HA | HB2 | HC2 | L | C1 | C2 ON | (A) | (%) | HA | HB2 | HC2 |
| o | x | o | 11 | 60 | AUTOMATIC | 0.6 | 2.3 | — | — | 75 |
| o | x | o | 11 | 80 | AUTOMATIC | 0.6 | 2.8 | — | — | 65 |
| o | x | o | 9 | 60 | AUTOMATIC | 0.6 | 2.9 | — | — | 65 |
| o | x | o | 9 | 80 | AUTOMATIC | 0.6 | 2.7 | — | — | 50 |
| o | x | o | 7 | 60 | AUTOMATIC | 0.6 | 2.3 | — | — | 50 |
| o | x | o | 7 | 80 | AUTOMATIC | 0.6 | 2.8 | — | — | 50 |
| o | x | o | 5 | 60 | AUTOMATIC | 0.6 | 2.9 | — | — | — |
| o | x | o | 5 | 80 | AUTOMATIC | 0.6 | 2.7 | — | — | — |
| o | o | o | 11 | 60 | AUTOMATIC | 0.6 | 2.7 | — | 5 | 75 |
| o | o | o | 11 | 80 | AUTOMATIC | 0.6 | 2.5 | — | 5 | 65 |
| o | o | o | 9 | 60 | AUTOMATIC | 0.6 | 2.8 | — | 5 | 65 |

TABLE 36-continued

| | | | | | | | | | | |
|---|---|---|---|---|---|---|---|---|---|---|
| ◯ | ◯ | ◯ | 9 | 80 | AUTOMATIC | 0.6 | 2.4 | — | 5 | 50 |
| ◯ | ◯ | ◯ | 7 | 60 | AUTOMATIC | 0.6 | 2.8 | — | 5 | 50 |
| ◯ | ◯ | ◯ | 7 | 80 | AUTOMATIC | 0.6 | 2.4 | — | 5 | 50 |
| ◯ | ◯ | ◯ | 5 | 60 | AUTOMATIC | 0.6 | 2.7 | — | 5 | — |
| ◯ | ◯ | ◯ | 5 | 80 | AUTOMATIC | 0.6 | 2.9 | — | 5 | — |

| SPARKING | | PROPERTIES | | | | | |
|---|---|---|---|---|---|---|---|
| FIRST HALF | SECOND HALF | HARDNESS | APPEARANCE | TEXTURE | EVALUATION | MOLDING | NOTE |
| — | — | SOFT | GOOD | FINE | ⊚ | ◯ | |
| — | — | SOFT | GOOD | FINE | ⊚ | ◯ | |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | Δ | * |
| — | YES | SOFT | FAIR | SLIGHTLY BURNED | Δ | x | * |
| YES | — | — | BURNED | VERY BURNED | x | x | * |
| — | — | SOFT | GOOD | FINE | ⊚ | ◯ | |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | ◯ | |
| — | YES | SOFT | FAIR | SLIGHTLY BURNED | Δ | Δ | * |
| YES | — | — | BURNED | VERY BURNED | x | x | * |

*: MATCHING UNSTABLE

With internal heating, expansion and drying of the materials are rapid, and the properties of the molded object are much better than with external heating.

With heating at 200 Hz, although not shown in the Tables, effects in the initial stage of expansion are great, and the greater the output, the shorter the molding time and the better the properties of the molded object.

With heating at 13.56 MHz, change of the L and C components greatly alters molding time. Making conditions too strict is likely to cause sparking, and to lead to a state in which the molded object is burned on the inside, but is not yet dry.

The range within which both L and C components are optimum varies according to material mixture and shape. For this reason, internal heating conditions must be set in accordance with each material mixture and object shape. If conditions are set too strictly, the materials in the metal mold are sometimes difficult to heat, and loss is great. Accordingly, setting of conditions is important. If, using strict conditions, the materials are expanded too rapidly, holes may form in the molded object, pressure inside the mold may rise excessively, and sparking and defective molding may result. For this reason, adjustment of the material mixture and the structure of the metal mold (vapor release sections) are necessary. By making such adjustments, sparking can be controlled.

When heating using both 200 Hz and 13.56 MHz, if a low frequency range is used initially, expansion is more stable, burning and sparking are less likely, and the properties of the molded object are also more stable. Consequently, the useable high frequency range is extended.

In Table 34, since output is controlled with the interval between the plates of the capacitor set wider than in Table 33, the range of control of the L component is extended, and more stable molded objects can be obtained.

In Tables 35 and 36, the anode amperage was held constant by automatic control of one of the capacitors, i.e., of the automatic capacitor C2. Consequently, molding time was able to be shortened.

Further, burning and sparking are likely to occur in the latter stage of drying when the L component is lengthened, and are likely to occur at the moment of commencement of heating when the L component is shortened.

Under the heating conditions shown in Table 35, the amperage is 1 A. As can be seen from the Table, the range of control of the L component and the C component is narrow, and since the constant amperage is high, sparking is likely to occur. Under the conditions shown in Table 36, on the other hand, the amperage is 0.6 A. As can be seen from the Table, the range of control of the L component and the C component is wider than in Table 35, and burning and sparking are less likely.

EXAMPLE 11

Specifications of the present Example were as follows.

Material mixture: No. 3

Object shape: (1)

The heating method was as shown in Tables 37 through 39. In the Tables, "AMPERAGE: SETTING 1" and "SETTING 2" indicate that the amperage was set at setting 1 during the initial stage of heating, and was then switched to setting 2 later during heating.

TABLE 37

| HEATING DEVICE | | | HC2 OUTPUT CONVERSION | | | AMPERAGE (A) | | MOLD TEMP. | LIQUID CONTENT | MOLDING TIME (sec.) EXTERNAL | | HC2 | | PROPERTIES | MOLDING | NOTE |
|---|---|---|---|---|---|---|---|---|---|---|---|---|---|---|---|---|
| EXTERNAL HA | INTERNAL HB2 | HC2 | L | C1 | C2 ON | SETTING 1 | SETTING 2 | (°C.) | (%) | HA | HB2 | SETTING 1 | SETTING 2 | | | |
| o | x | x | — | — | — | — | — | 170 | 2.8 | 150 | — | — | — | Δ | ⊙ | |
| o | o | x | — | — | — | — | — | 170 | 2.7 | — | 150 | — | — | Δ | ⊙ | |
| o | o | x | — | — | — | — | — | 170 | 2.5 | — | 130 | — | — | o | ⊙ | |
| o | o | x | — | — | — | — | — | 170 | 2.8 | — | 120 | — | — | o | ⊙ | |
| o | x | o | 11 | 50 | AUTOMATIC | 1 | 0.6 | 170 | 2.4 | — | — | 35 | 20 | ⊙ | o | |
| o | x | o | 11 | 90 | AUTOMATIC | 1 | 0.6 | 170 | 2.4 | — | — | 25 | 15 | ⊙ | o | |
| o | x | o | 9 | 50 | AUTOMATIC | 1 | 0.6 | 170 | 2.9 | — | — | 25 | 15 | ⊙ | ⊙ | |
| o | x | o | 9 | 90 | AUTOMATIC | 1 | 0.6 | 170 | 2.7 | — | — | 20 | 10 | ⊙ | ⊙ | |
| o | x | o | 7 | 50 | AUTOMATIC | 1 | 0.6 | 170 | 2.4 | — | — | 20 | 10 | ⊙ | ⊙ | |
| o | x | o | 7 | 90 | AUTOMATIC | 1 | 0.6 | 170 | 2.4 | — | — | 15 | 10 | ⊙ | o | |
| o | x | o | 5 | 50 | AUTOMATIC | 1 | 0.6 | 170 | 2.7 | — | — | 15 | 10 | Δ | x | * |
| o | x | o | 5 | 90 | AUTOMATIC | 1 | 0.6 | 170 | 2.9 | — | — | 15 | 20 | x | x | * |
| o | o | o | 11 | 50 | AUTOMATIC | 1 | 0.6 | 170 | 2.7 | — | 5 | 35 | 20 | ⊙ | o | |
| o | o | o | 11 | 90 | AUTOMATIC | 1 | 0.6 | 170 | 2.3 | — | 5 | 25 | 15 | ⊙ | ⊙ | |
| o | o | o | 9 | 50 | AUTOMATIC | 1 | 0.6 | 170 | 2.5 | — | 5 | 25 | 15 | ⊙ | ⊙ | |
| o | o | o | 9 | 90 | AUTOMATIC | 1 | 0.6 | 170 | 2.9 | — | 5 | 20 | 10 | ⊙ | ⊙ | |
| o | o | o | 7 | 50 | AUTOMATIC | 1 | 0.6 | 170 | 2.4 | — | 5 | 20 | 10 | ⊙ | ⊙ | |
| o | o | o | 7 | 90 | AUTOMATIC | 1 | 0.6 | 170 | 2.4 | — | 5 | 15 | 10 | ⊙ | o | |
| o | o | o | 5 | 50 | AUTOMATIC | 1 | 0.6 | 170 | 2.7 | — | 5 | 15 | 10 | Δ | Δ | * |
| o | o | o | 5 | 90 | AUTOMATIC | 1 | 0.6 | 170 | 2.9 | — | 5 | 15 | 20 | x | x | * |

*: MATCHING UNSTABLE

TABLE 38

| HEATING DEVICE | | | HC2 OUTPUT CONVERSION | | | AMPERAGE (A) | | MOLD TEMP. |
|---|---|---|---|---|---|---|---|---|
| EXTERNAL HA | INTERNAL HB2 | HC2 | L | C1 | C2 ON | SETTING 1 | SETTING 2 | (°C.) |
| o | x | o | 11 | 50 | AUTOMATIC | 0.7 | 0.4 | 170 |
| o | x | o | 11 | 90 | AUTOMATIC | 0.7 | 0.4 | 170 |
| o | x | o | 9 | 50 | AUTOMATIC | 0.7 | 0.4 | 170 |
| o | x | o | 9 | 90 | AUTOMATIC | 0.7 | 0.4 | 170 |
| o | x | o | 7 | 50 | AUTOMATIC | 0.7 | 0.4 | 170 |
| o | x | o | 7 | 90 | AUTOMATIC | 0.7 | 0.4 | 170 |
| o | x | o | 5 | 50 | AUTOMATIC | 0.7 | 0.4 | 170 |
| o | x | o | 5 | 90 | AUTOMATIC | 0.7 | 0.4 | 170 |
| o | o | o | 11 | 50 | AUTOMATIC | 0.7 | 0.4 | 170 |
| o | o | o | 11 | 90 | AUTOMATIC | 0.7 | 0.4 | 170 |
| o | o | o | 9 | 50 | AUTOMATIC | 0.7 | 0.4 | 170 |
| o | o | o | 9 | 90 | AUTOMATIC | 0.7 | 0.4 | 170 |
| o | o | o | 7 | 50 | AUTOMATIC | 0.7 | 0.4 | 170 |

TABLE 38-continued

| | | | | | | | | |
|---|---|---|---|---|---|---|---|---|
| ○ | ○ | ○ | 7 | 90 | AUTOMATIC | 0.7 | 0.4 | 170 |
| ○ | ○ | ○ | 5 | 50 | AUTOMATIC | 0.7 | 0.4 | 170 |
| ○ | ○ | ○ | 5 | 90 | AUTOMATIC | 0.7 | 0.4 | 170 |

| LIQUID CONTENT (%) | MOLDING TIME (sec.) EXTERNAL HA | HB2 | HC2 SETTING 1 | SETTING 2 | PROPERTIES | MOLDING | NOTE |
|---|---|---|---|---|---|---|---|
| 2.7 | — | — | 60 | 30 | ⊚ | ○ | |
| 2.4 | — | — | 50 | 25 | ⊚ | ⊚ | |
| 2.5 | — | — | 50 | 25 | ⊚ | ⊚ | |
| 2.3 | — | — | 40 | 20 | ⊚ | ⊚ | |
| 2.9 | — | — | 40 | 20 | ⊚ | ⊚ | |
| 2.5 | — | — | 30 | 20 | ⊚ | ⊚ | |
| 2.3 | — | — | 30 | 20 | ⊚ | ⊚ | |
| 2.5 | — | — | 30 | 15 | ⊚ | ○ | |
| 2.5 | — | 5 | 60 | 30 | ⊚ | ○ | |
| 2.6 | — | 5 | 50 | 25 | ⊚ | ⊚ | |
| 2.5 | — | 5 | 50 | 25 | ⊚ | ⊚ | |
| 2.7 | — | 5 | 40 | 20 | ⊚ | ⊚ | |
| 2.4 | — | 5 | 40 | 20 | ⊚ | ⊚ | |
| 2.5 | — | 5 | 30 | 20 | ⊚ | ⊚ | |
| 2.7 | — | 5 | 30 | 20 | ⊚ | ⊚ | |
| 2.9 | — | 5 | 30 | 15 | ⊚ | ○ | |

TABLE 39

| HEATING DEVICE | | | HC2 OUTPUT CONVERSION | | | AMPERAGE (A) | | MOLD TEMP. |
|---|---|---|---|---|---|---|---|---|
| EXTERNAL HA | INTERNAL HB2 | HC2 | L | C1 | C2 ON | SETTING 1 | SETTING 2 | (° C.) |
| ○ | x | ○ | 11 | 50 | AUTOMATIC | 1 | 0.4 | 170 |
| ○ | x | ○ | 11 | 90 | AUTOMATIC | 1 | 0.4 | 170 |
| ○ | x | ○ | 9 | 50 | AUTOMATIC | 1 | 0.4 | 170 |
| ○ | x | ○ | 9 | 90 | AUTOMATIC | 1 | 0.4 | 170 |
| ○ | x | ○ | 7 | 50 | AUTOMATIC | 1 | 0.4 | 170 |
| ○ | x | ○ | 7 | 90 | AUTOMATIC | 1 | 0.4 | 170 |
| ○ | x | ○ | 5 | 50 | AUTOMATIC | 1 | 0.4 | 170 |
| ○ | x | ○ | 5 | 90 | AUTOMATIC | 1 | 0.4 | 170 |
| ○ | ○ | ○ | 11 | 50 | AUTOMATIC | 1 | 0.4 | 170 |
| ○ | ○ | ○ | 11 | 90 | AUTOMATIC | 1 | 0.4 | 170 |
| ○ | ○ | ○ | 9 | 50 | AUTOMATIC | 1 | 0.4 | 170 |
| ○ | ○ | ○ | 9 | 90 | AUTOMATIC | 1 | 0.4 | 170 |
| ○ | ○ | ○ | 7 | 50 | AUTOMATIC | 1 | 0.4 | 170 |
| ○ | ○ | ○ | 7 | 90 | AUTOMATIC | 1 | 0.4 | 170 |
| ○ | ○ | ○ | 5 | 50 | AUTOMATIC | 1 | 0.4 | 170 |
| ○ | ○ | ○ | 5 | 90 | AUTOMATIC | 1 | 0.4 | 170 |

| LIQUID CONTENT (%) | MOLDING TIME (sec.) EXTERNAL HA | HB2 | HC2 SETTING 1 | SETTING 2 | PROPERTIES | MOLDING | NOTE |
|---|---|---|---|---|---|---|---|
| 2.4 | — | — | 35 | 30 | ⊚ | ⊚ | |
| 2.4 | — | — | 25 | 25 | ⊚ | ⊚ | |
| 2.9 | — | — | 25 | 25 | ⊚ | ⊚ | |
| 2.7 | — | — | 20 | 20 | ⊚ | ⊚ | |
| 2.4 | — | — | 20 | 20 | ⊚ | ⊚ | |
| 2.4 | — | — | 15 | 20 | ⊚ | ⊚ | |
| 2.7 | — | — | 15 | 20 | ⊚ | ⊚ | |
| 2.9 | — | — | 15 | 15 | ○ | ○ | |
| 2.7 | — | 5 | 35 | 30 | ⊚ | ⊚ | |
| 2.3 | — | 5 | 25 | 25 | ⊚ | ⊚ | |
| 2.5 | — | 5 | 25 | 25 | ⊚ | ⊚ | |
| 2.9 | — | 5 | 20 | 20 | ⊚ | ⊚ | |
| 2.4 | — | 5 | 20 | 20 | ⊚ | ⊚ | |
| 2.4 | — | 5 | 15 | 20 | ⊚ | ⊚ | |
| 2.7 | — | 5 | 15 | 20 | ⊚ | ⊚ | |
| 2.9 | — | 5 | 15 | 15 | ⊚ | ⊚ | |

As was clear from Example 10, when a constant output is applied, shortening molding time leads to instability such as sparking, etc., but stabilizing molding makes molding time comparatively longer. Accordingly, in the present Example, molding conditions were switched from a high output in the initial stage of heating, when the liquid content remaining in the materials is high, to a low output in the latter stage of heating (drying period), when the remaining liquid content is low. As a result, molded objects with good properties could be manufactured stably and more efficiently. In other words, in Tables 37, 38, and 39, stable molded objects were able to be manufactured more efficiently than in Tables 35 and 36 of Example 10.

In Table 38, in which the outputs of both settings 1 and 2 are lower than in Table 37, molding time is lengthened, but the range of control is wider, and good molded objects were obtained. Further, in Table 39, only the output of setting 2 was lower than that of Table 37, but molding time was shorter than in Table 38, and molding could be performed with a wider range of control than in Table 37. In this way, it was proven that providing a large difference in output between the initial stage and latter stage of molding made it possible to perform stable molding in a short time.

EXAMPLE 12

Specifications of the present Example were as follows.

Material mixture: No. 3

Object shape: (1)

The heating method was as shown in Table 40. Control of the output of the oscillator was performed by adjusting the L component and the C component. Drying was ended when the anode amperage reached a constant level. The results are shown in Tables 40 and 41 and in FIGS. 31 through 33. In the "HEATING DEVICES" column in Table 40, "○" indicates that the heating device was used, and "x" indicates that the heating device was not used. Table 41 shows the anode amperage (A) when heating at 13.56 MHz (Experiments No. 12-4 through No. 12-15).

TABLE 40

| EXPERI- MENT NO. | HEATING DEVICE EXTERNAL HA | HEATING DEVICE INTERNAL HB2 | HC2 | NUMBER OF MOLDS | 200 Hz OUTPUT (W) | OSCILLATOR OUTPUT (KW) | ANODE CURRENT (A) | HC2 CONDITIONS L | HC2 CONDITIONS C1 | HC2 CONDITIONS C2 | MOLDING TIME (sec.) | PROPER- TIES | MOLD- ING |
|---|---|---|---|---|---|---|---|---|---|---|---|---|---|
| 12-1  | ○ | x | x | 1  | — | —  | —          | —  | —  | — | 150  | ○ | ⊚ |
| 12-2  | ○ | x | x | 4  | — | —  | —          | —  | —  | — | 150  | ○ | ⊚ |
| 12-3  | ○ | x | x | 16 | — | —  | —          | —  | —  | — | 150  | ○ | ⊚ |
| 12-4  | ○ | x | ○ | 1  | — | 7  | 0.6 ± 0.05 | 9  | 60 | 9 | 30   | ⊚ | ⊚ |
| 12-5  | ○ | x | ○ | 2  | — | 7  | 0.6 ± 0.05 | 5  | 60 | 9 | 30   | ⊚ | ⊚ |
| 12-6  | ○ | x | ○ | 4  | — | 7  | 0.6 ± 0.05 | 2  | 60 | 9 | 35   | ⊚ | ⊚ |
| 12-7  | ○ | x | ○ | 8  | — | 7  | 0.6 ± 0.05 | 2  | 60 | 9 | 40   | ⊚ | ⊚ |
| 12-8  | ○ | x | ○ | 16 | — | 15 | 0.6 ± 0.05 | 2  | 60 | 9 | 50   | ⊚ | ⊚ |
| 12-9  | ○ | ○ | ○ | 1  | 200 | 7  | 0.6 ± 0.05 | 11 | 60 | 9 | 8–25 | ⊚ | ⊚ |
| 12-10 | ○ | ○ | ○ | 2  | 200 | 7  | 0.6 ± 0.05 | 7  | 60 | 9 | 8–25 | ⊚ | ⊚ |
| 12-11 | ○ | ○ | ○ | 4  | 200 | 7  | 0.6 ± 0.05 | 3  | 60 | 9 | 8–30 | ⊚ | ⊚ |
| 12-12 | ○ | ○ | ○ | 8  | 200 | 15 | 0.6 ± 0.05 | 3  | 60 | 9 | 8–35 | ⊚ | ⊚ |
| 12-13 | ○ | ○ | ○ | 16 | 200 | 30 | 0.6 ± 0.05 | 3  | 60 | 9 | 8–45 | ⊚ | ⊚ |
| 12-14 | ○ | x | ○ | 16 | 200 | 30 | 0.8 ± 0.05 | 3  | 70 | 9 | 38   | ⊚ | ⊚ |
| 12-15 | ○ | x | ○ | 16 | 200 | 30 | 0.9 ± 0.05 | 3  | 80 | 9 | 32   | ⊚ | ⊚ |

TABLE 41

| EXPERI- MENT NO. | MOLDING TIME (sec.) | | | | | | | | | | |
|---|---|---|---|---|---|---|---|---|---|---|---|
|  | 0 | 6 | 12 | 18 | 24 | 30 | 36 | 42 | 48 | 54 | 60 |
| 12-4  | 0 | 0.59 | 0.49 | 0.43 | 0.40 | 0.39 | 0.39 | 0.38 | 0.38 | 0.38 | 0.38 |
| 12-5  | 0 | 0.58 | 0.47 | 0.44 | 0.40 | 0.39 | 0.39 | 0.38 | 0.38 | 0.37 | 0.37 |
| 12-6  | 0 | 0.55 | 0.58 | 0.61 | 0.58 | 0.57 | 0.52 | 0.47 | 0.45 | 0.44 | 0.43 |
| 12-7  | 0 | 0.51 | 0.53 | 0.56 | 0.61 | 0.59 | 0.54 | 0.48 | 0.44 | 0.44 | 0.43 |
| 12-8  | 0 | 0.46 | 0.47 | 0.52 | 0.60 | 0.58 | 0.53 | 0.49 | 0.42 | 0.39 | 0.38 |
| 12-9  |   |      | 0    | 0.60 | 0.50 | 0.43 | 0.39 | 0.38 | 0.38 | 0.38 | 0.38 |
| 12-10 |   |      | 0    | 0.55 | 0.45 | 0.43 | 0.38 | 0.38 | 0.38 | 0.38 | 0.38 |
| 12-11 |   |      | 0    | 0.55 | 0.58 | 0.48 | 0.44 | 0.41 | 0.40 | 0.40 | 0.40 |
| 12-12 |   |      | 0    | 0.51 | 0.56 | 0.53 | 0.45 | 0.42 | 0.40 | 0.39 | 0.39 |
| 12-13 |   |      | 0    | 0.47 | 0.55 | 0.50 | 0.47 | 0.45 | 0.43 | 0.41 | 0.39 |
| 12-14 | 0 | 0.74 | 0.81 | 0.68 | 0.51 | 0.46 | 0.42 | 0.42 |      |      |      |
| 12-15 | 0 | 0.81 | 0.93 | 0.75 | 0.52 | 0.44 | 0.43 | 0.43 |      |      |      |

Even when the number of molds was increased, there was no change in the properties and molding of the molded objects, which were excellent. By setting output higher and slightly increasing the anode amperage the greater the number of molds added, molding could be performed with little change in molding time.

Localized heating was more likely the greater the number of molds, but by switching from the heating device shown in FIG. 1 to that shown in FIG. 2, sparking was less likely, and stable molding was obtained.

EXAMPLE 13

Specifications of the present Example were as follows.

Material mixture: No. 3.

Object shapes: (1) through (7).

The heating method was heating using heating device HC2 under the conditions below. The results are shown in Tables 42 and 43, and in FIGS. 34 and 35.

Table 42 shows the transition in anode amperage (A) for molding of various object shapes with a mold temperature of 170° C., C1=60, C2=9, and L=9. FIG. 34 is a graph of the same information.

Table 43 shows the transition in anode amperage (A) for molding of object shape (3) with a mold temperature of 170° C., C1=60, C2=9, and various values of L in addition to 9. FIG. 35 is a graph of the same information.

shape (1) in the graph in FIG. 34 is similar to the pattern of the amperage for object shape (3) shown in Table 43 and FIG. 35. From this it can be seen that, with object shape (3), if output is increased by shortening the L component, a good molded object can be obtained with approximately the same molding time as with object shape (1).

As can be seen from Table 42 and the graph in FIG. 34, the peak anode amperage for object shape (7) is approximately equal to that with object shape (1), but since this shape is thicker than object shape (1), the rise in anode amperage is slower. Thus molding time for this shape takes that much longer than for object shape (1). However, good molded objects completely different from object shape (1), having thickness and softness, which are suited for use as cushioning material in corner pads, etc., may be obtained.

EXAMPLE 14

The present Example investigated imparting of water resistance by laminating.

Molding materials in the form of a sheet were obtained using an extruder. The material mixtures were No. 8 and No. 9. A water-resistant sheet film was laminated onto these molding materials. The chief materials of these sheet films were protein, natural resins, waxes, etc., as shown in Table 44. Thickness of the sheet films is also shown in the Table.

TABLE 42

| OBJECT | ANODE AMPERAGE (A) MOLDING TIME (sec.) | | | | | | | | | | |
|---|---|---|---|---|---|---|---|---|---|---|---|
| SHAPE | 0 | 6 | 12 | 18 | 24 | 30 | 36 | 42 | 48 | 54 | 60 |
| (1) | 0 | 0.78 | 0.65 | 0.53 | 0.45 | 0.40 | 0.40 | 0.40 | 0.40 | 0.40 | 0.40 |
| (2) | 0 | 0.75 | 0.68 | 0.55 | 0.48 | 0.43 | 0.40 | 0.39 | 0.39 | 0.39 | 0.39 |
| (3) | 0 | 0.50 | 0.52 | 0.50 | 0.48 | 0.46 | 0.44 | 0.42 | 0.40 | 0.38 | 0.38 |
| (4) | 0 | 0.81 | 0.66 | 0.52 | 0.43 | 0.41 | 0.41 | 0.41 | 0.41 | 0.41 | 0.41 |
| (5) | 0 | 0.49 | 0.51 | 0.50 | 0.50 | 0.48 | 0.46 | 0.44 | 0.42 | 0.40 | 0.38 |
| (6) | 0 | 0.83 | 0.65 | 0.52 | 0.45 | 0.43 | 0.40 | 0.40 | 0.40 | 0.40 | 0.40 |
| (7) | 0 | 0.43 | 0.54 | 0.63 | 0.72 | 0.78 | 0.65 | 0.52 | 0.43 | 0.42 | 0.40 |

TABLE 43

| | ANODE AMPERAGE (A) MOLDING TIME (sec.) | | | | | | | | | | | |
|---|---|---|---|---|---|---|---|---|---|---|---|---|
| L | 0 | 6 | 12 | 18 | 24 | 30 | 36 | 42 | 48 | 54 | 60 | NOTE |
| 9 | 0 | 0.50 | 0.52 | 0.50 | 0.48 | 0.46 | 0.44 | 0.42 | 0.40 | 0.38 | 0.38 | NO BURNING |
| 7 | 0 | 0.65 | 0.62 | 0.55 | 0.49 | 0.45 | 0.43 | 0.41 | 0.40 | 0.40 | 0.40 | NO BURNING |
| 5 | 0 | 0.80 | 0.65 | 0.53 | 0.47 | 0.44 | 0.42 | 0.42 | 0.42 | 0.42 | 0.42 | BURNING AT 42 TO 48 SEC. |
| 3 | 0 | 0.98 | 0.72 | 0.50 | 0.50 | 0.50 | | | | | | MATCHING UNSTABLE |

As can be seen from Table 42 and the graph in FIG. 34, since object shapes (3) and (5) have greater surface areas than object shape (1), the anode amperage is more difficult to increase using the same output, and a longer molding time is required. However, the pattern of the amperage for object

TABLE 44

IMPARTING OF WATER RESISTANCE BY LAMINATING

| CHIEF MATERIAL OF WATER-RESISTANT FILM | | SOY PROTEIN | ZEIN | DAMMAR RESIN | GUM ROSIN | SHELLAC | PARAFFIN WAX | MICRO-CRYSTALLINE WAX | NO FILM |
|---|---|---|---|---|---|---|---|---|---|
| THICKNESS (μm) | | 50 | 40 | 65 | 50 | 50 | 80 | 75 | 0 |
| WATER-RESISTANT FILM PINHOLE | | ⊙ | ⊙ | ⊙ | ⊙ | ⊙ | Δ | ○ | x |
| WATER RESISTANCE | 20° C. | ○ | ⊙ | ⊙ | ⊙ | ⊙ | Δ | ○ | x |
| | 50° C. | ○ | ○ | ○ | ○ | ○ | Δ | Δ | x |
| | 80° C. | Δ | Δ | ○ | Δ | Δ | x | x | x |
| COLOR | | BROWN | LIGHT YELLOW | COLORLESS | COLORLESS | LIGHT YELLOW | LIGHT YELLOW | COLORLESS | — |

After the foregoing laminating, molding by internal heating was performed using a 13.56 MHz oscillator, yielding a molded object with the protein sheet film pressure-fixed thereto.

In the same way, sheet films made chiefly of natural resins, waxes, etc. were pressed and molded to sheet-shaped molding materials, and water resistance of the molded objects obtained thereby, as well as that of the foregoing molded object with the protein sheet film pressure-fixed thereto, were investigated. The results thereof are shown in Table 44.

As is clear from the Table, molded objects with sheet films of each material had better water resistance than molded objects not provided with sheet films. In other words, by pressing and molding a water-resistant sheet film with sheet-shaped molding materials obtained by extrusion, molded objects having water resistance were obtained. The molded objects laminated with the sheet film made chiefly of dammar resin had particularly good water resistance.

EXAMPLE 15

The present Example investigated imparting of water resistance by coating by airbrushing.

Water resistant agents (water resistance impairing agents) No. 1 through No. 9, made up of the materials shown in Table 45, were coated on molded objects having object shape (1). Specifically, materials chiefly including natural resins were dissolved in various solvents and prepared to 50 cp (centipoise) to 1000 cp. Using two flat-pattern airbrushes for coating, both surfaces of the molded object were coated simultaneously. The quantity of coating was 2.0 g±0.2 g. Incidentally, coating methods include airbrushing, roll coating, dipping, powder fusion coating, etc., and any of these coating methods may be used in the present invention. The present embodiment made use of airbrushing, with which it is particularly easy to control the quantity of coating. After coating, conditioning such as leveling was performed, and the coated molded objects were dried for around 10 minutes, yielding molded objects having water resistance. The water resistance of these molded objects was confirmed. The results are also shown in Table 45.

TABLE 45

| NO. | 1 | 2 | 3 | 4 | 5 | 6 | 7 | 8 | 9 |
|---|---|---|---|---|---|---|---|---|---|
| DAMMAR RESIN | 25 | 0 | 0 | 0 | 0 | 0 | 12 | 12 | 7 |
| SHELLAC | 0 | 25 | 0 | 0 | 0 | 0 | 10 | 5 | 5 |
| GUM ROSIN | 0 | 0 | 25 | 0 | 0 | 0 | 0 | 0 | 5 |
| SANDARAC | 0 | 0 | 0 | 25 | 0 | 0 | 0 | 0 | 0 |
| ZEIN | 0 | 0 | 0 | 0 | 25 | 22 | 0 | 5 | 5 |
| SILICON | 0 | 0 | 0 | 0 | 0 | 3 | 3 | 3 | 3 |
| ETHANOL | 70 | 70 | 20 | 50 | 60 | 50 | 50 | 50 | 50 |
| ACETONE | 0 | 0 | 50 | 20 | 10 | 20 | 20 | 20 | 20 |
| PROPYLENE GLYCOL | 5 | 5 | 5 | 5 | 5 | 5 | 5 | 5 | 5 |
| WATER-RESISTANT FILM PINHOLE | Δ | ○ | Δ | ○ | ○ | ⊙ | ⊙ | ⊙ | ⊙ |
| WATER RESISTANCE AT 20° C. | ○ | ⊙ | ○ | Δ | ○ | ○ | ⊙ | ⊙ | ⊙ |
| WATER RESISTANCE AT 50° C. | ○ | ○ | ○ | Δ | ○ | ○ | ○ | ⊙ | ⊙ |
| WATER RESISTANCE AT 80° C. | ○ | Δ | ○ | Δ | Δ | Δ | ○ | ○ | ⊙ |

As is clear from the Table, particularly good water resistant films were formed using water resistant agents No. 7 through No. 9, and water resistance was improved.

EXAMPLE 16

The present Example investigated imparting of water resistance in the same manner as in Example 15, using other water resistant agents.

Water resistance agents No. 10 through No. 18 with high melting points, made of the materials shown in Table 46, were coated onto molded objects having object shape (1). The quantity of coating was 3.0 g±0.3 g. After coating, conditioning and drying were performed, yielding molded objects having water resistance. The water resistance of these molded objects was confirmed. The results are also shown in Table 46.

TABLE 46

| NO. | 10 | 11 | 12 | 13 | 14 | 15 | 16 | 17 | 18 |
|---|---|---|---|---|---|---|---|---|---|
| DAMMAR RESIN | 80 | 0 | 0 | 0 | 0 | 0 | 0 | 0 | 0 |
| GUM ROSIN | 0 | 80 | 0 | 0 | 0 | 0 | 0 | 0 | 20 |
| RICE BRAN WAX | 0 | 0 | 80 | 0 | 0 | 0 | 0 | 0 | 0 |
| CARNAUBA WAX | 0 | 0 | 0 | 80 | 0 | 0 | 0 | 0 | 0 |
| PARAFFIN WAX | 0 | 0 | 0 | 0 | 80 | 0 | 0 | 20 | 0 |
| MICROCRYSTALLINE WAX | 0 | 0 | 0 | 0 | 0 | 80 | 0 | 20 | 0 |
| HIGH MELTING POINT WAX | 0 | 0 | 0 | 0 | 0 | 0 | 80 | 40 | 60 |
| EVA | 0 | 0 | 20 | 20 | 20 | 20 | 20 | 20 | 15 |
| PROPYLENE GLYCOL | 20 | 20 | 0 | 0 | 0 | 0 | 0 | 0 | 5 |
| WATER-RESISTANT FILM PINHOLE | ○ | Δ | ○ | ○ | ⊚ | ⊚ | ○ | ⊚ | ⊚ |
| WATER RESISTANCE AT 20° C. | ⊚ | ○ | ○ | ○ | ⊚ | ⊚ | ⊚ | ⊚ | ⊚ |
| WATER RESISTANCE AT 50° C. | ⊚ | ○ | ○ | ○ | ⊚ | ⊚ | ⊚ | ⊚ | ⊚ |
| WATER RESISTANCE AT 80° C. | ⊚ | ○ | Δ | Δ | Δ | ○ | ⊚ | ○ | ⊚ |

As is clear from the Table, particularly good water resistant films were formed using water resistant agents No. 10 and No. 14 through No. 18, and water resistance was improved.

As is clear from this Table, molded objects having water resistance can be obtained by coating water-resistant materials onto molded objects produced by internal heating.

EXAMPLE 17

In the present Example, variation in water resistance due to coating quantity and molding method was confirmed.

Specifically, since good water resistance was obtained above by preparing the water resistant agents No. 9 and No. 18, here an experiment was performed in which the state of the water-resistant film resulting from the molding method was confirmed by using various coating quantities. The results are shown in Tables 47 and 48.

TABLE 47

| COATING OF WATER RESISTANT AGENT NO. 9 | | | | | | | |
|---|---|---|---|---|---|---|---|
| MOLDING METHOD | SURFACE CONDITION OF MOLDED OBJECT | COATING METHOD | COATING QUANTITY (g) | WATER-RESISTANT FILM PINHOLE | WATER RESISTANCE | | |
| | | | | | 20° C. | 50° C. | 80° C. |
| EXTERNAL HEATING | UNEVEN; POOR | AIR-BRUSHING | 1.5 | Δ | Δ | Δ | Δ |
| | | | 2.0 | ○ | ○ | Δ | Δ |
| | | | 2.5 | ⊚ | ⊚ | ○ | ○ |
| BOTH EXTERNAL AND INTERNAL HEATING | FAIR | AIR-BRUSHING | 1.5 | ○ | ⊚ | ○ | ○ |
| | | | 2.0 | ⊚ | ⊚ | ○ | ○ |
| | | | 2.5 | ⊚ | ⊚ | ⊚ | ○ |
| INTERNAL HEATING | GOOD | AIR-BRUSHING | 1.5 | ○ | ⊚ | ○ | ○ |
| | | | 2.0 | ⊚ | ⊚ | ⊚ | ⊚ |
| | | | 2.5 | ⊚ | ⊚ | ⊚ | ⊚ |

TABLE 48

| COATING OF WATER RESISTANT AGENT NO. 18 | | | | | | | |
|---|---|---|---|---|---|---|---|
| MOLDING METHOD | SURFACE CONDITION OF MOLDED OBJECT | COATING METHOD | COATING QUANTITY (g) | WATER-RESISTANT FILM PINHOLE | WATER RESISTANCE | | |
| | | | | | 20° C. | 50° C. | 80° C. |
| EXTERNAL HEATING | UNEVEN; POOR | AIR-BRUSHING | 1.5 | Δ | Δ | x | x |
| | | | 2.0 | ○ | Δ | Δ | x |
| | | | 2.5 | ○ | ⊚ | Δ | Δ |
| | | | 3.0 | ⊚ | ⊚ | ○ | ○ |
| BOTH EXTERNAL AND INTERNAL HEATING | FAIR | AIR-BRUSHING | 1.5 | ○ | ⊚ | ○ | x |
| | | | 2.0 | ⊚ | ⊚ | ○ | Δ |
| | | | 2.5 | ⊚ | ⊚ | ⊚ | ○ |
| | | | 3.0 | ⊚ | ⊚ | ⊚ | ⊚ |
| INTERNAL HEATING | GOOD | AIR-BRUSHING | 1.5 | ○ | ⊚ | ○ | x |
| | | | 2.0 | ⊚ | ⊚ | ⊚ | ○ |
| | | | 2.5 | ⊚ | ⊚ | ⊚ | ⊚ |
| | | | 3.0 | ⊚ | ⊚ | ⊚ | ⊚ |

As is clear from the Tables, with regard to surface consistency and evenness of the molded objects, molded objects produced by internal heating were excellent. Further, internal heating is also significant with regard to adhesion and bonding of the water-resistant film. Comparing externally heated and internally heated molded objects, it was found that the internally heated molded objects had better water resistance with a smaller coating quantity, which is effective in imparting the function of food container, etc.

EXAMPLE 18

The present Example investigated imparting of water resistance by using water resistant materials.

After adding to the material mixtures No. 1 and No. 3 the water-resistant materials shown in Table 49, stirring, and mixing, the materials were molded by internal heating.

TABLE 49

| NO. | 19 | 20 | 21 | 22 | 23 | 24 |
|---|---|---|---|---|---|---|
| DAMMAR RESIN | 8 | 0 | 0 | 1 | 4 | 0 |
| SILICON | 0 | 2 | 0 | 2 | 0 | 0 |
| PARAFFIN WAX | 0 | 0 | 4 | 1 | 0 | 0 |
| SHELLAC | 0 | 0 | 0 | 0 | 2 | 0 |
| GUM ROSIN | 0 | 0 | 0 | 0 | 2 | 0 |
| FATTY ACID ESTER | 0 | 0 | 0.4 | 0.1 | 0 | 0 |
| WATER-RESISTANT FILM PINHOLE | Δ | Δ | Δ | Δ | Δ | x |
| WATER RESISTANCE AT 20° C. | o | o | o | o | o | x |
| WATER RESISTANCE AT 50° C. | o | Δ | x | o | o | x |
| WATER RESISTANCE AT 80° C. | Δ | x | x | Δ | Δ | x |

As is clear from the Table, when molding using molding materials to which have been added the foregoing water-resistant materials, the molded objects obtained have greater water resistance than when water-resistant materials are not added.

Completely waterproof molded objects were not obtained, but in order to give the molded objects greater water resistance, materials including the foregoing water-resistant materials are molded, and then after molding, a water-resistant film is provided on the surface of the molded object, yielding a molded object with better water resistance. In this case, better water resistance can be obtained the higher the compatibility between the foregoing water-resistant materials added prior to molding and the material (water-resistant agent) of the water-resistant film provided on the surface of the molded object after molding.

If water-resistant materials are added to the molding materials, water resistance is somewhat better than if such materials are not added, and if a water-resistant film is further provided on the surface of the molded object, not only is water resistance increased throughout, but adhesion and bonding of the surface of the molded object and the water-resistant film is also improved, and a stronger water-resistant film is formed.

EXAMPLE 19

The present Example investigated the molding and properties of molded objects having a thin shape. Specifications were as follows.

Material mixture: No. 20

Object shape: (4)

The heating method and results were as shown in Tables 50 through 53.

TABLE 50

| HEATING DEVICE | | | HC2 OUTPUT | | | AMPERAGE | LIQUID CONTENT | MOLDING TIME (sec.) | | |
|---|---|---|---|---|---|---|---|---|---|---|
| EXTERNAL | INTERNAL | | CONVERSION | | | | | EXTERNAL | | |
| HA | HB2 | HC2 | L | C1 | C2 ON | (A) | (%) | HA | HB2 | HC2 |
| o | x | x | — | — | — | — | 2.8 | 90 | — | — |
| o | o | x | — | — | — | — | 2.7 | — | 90 | — |
| o | o | x | — | — | — | — | 2.5 | — | 70 | — |
| o | o | x | — | — | — | — | 2.8 | — | 50 | — |
| o | x | o | 15 | 70 | AUTOMATIC | 0.9 | 2.7 | 8 | — | 15 |
| o | x | o | 15 | 90 | AUTOMATIC | 0.9 | 2.3 | 8 | — | 15 |
| o | x | o | 13 | 70 | AUTOMATIC | 0.9 | 2.5 | 8 | — | 12 |
| o | x | o | 13 | 90 | AUTOMATIC | 0.9 | 2.9 | 8 | — | 12 |
| o | x | o | 9 | 70 | AUTOMATIC | 0.9 | 2.4 | 8 | — | 10 |
| o | x | o | 9 | 90 | AUTOMATIC | 0.9 | 2.4 | 8 | — | 10 |
| o | x | o | 7 | 70 | AUTOMATIC | 0.9 | 2.7 | 8 | — | 10 |
| o | x | o | 7 | 90 | AUTOMATIC | 0.9 | 2.9 | 8 | — | 10 |

| SPARKING | | PROPERTIES | | | | | |
|---|---|---|---|---|---|---|---|
| FIRST HALF | SECOND HALF | HARDNESS | APPEARANCE | CONSISTENCY | EVALUATION | MOLDING | NOTE |
| — | — | HARD | POOR | COARSE | Δ | ⊚ | |
| — | — | HARD | POOR | COARSE | Δ | ⊚ | |
| — | — | HARD | FAIR | COARSE | o | ⊚ | |
| — | — | SLIGHTLY SOFT | FAIR | FAIRLY FINE | o | ⊚ | |
| — | — | SOFT | GOOD | FINE | ⊚ | ⊚ | |
| — | — | SOFT | GOOD | FINE | ⊚ | ⊚ | |
| — | — | SOFT | GOOD | FINE | o | o | |
| — | — | SOFT | GOOD | FINE | o | o | |
| — | — | SOFT | KELOIDS | COARSE | x | x | * |

TABLE 50-continued

| | | SOFT | KELOIDS | COARSE | x | x | * |
| --- | --- | --- | --- | --- | --- | --- | --- |
| — | — | SOFT | KELOIDS | COARSE | x | x | * |
| — | — | SOFT | KELOIDS | COARSE | x | x | * |
| — | — | SOFT | KELOIDS | COARSE | x | x | * |

*: MATCHING UNSTABLE

TABLE 51

| HEATING DEVICE | | | HC2 OUTPUT | | | AMPERAGE | LIQUID CONTENT | MOLDING TIME (sec.) | | |
| --- | --- | --- | --- | --- | --- | --- | --- | --- | --- | --- |
| EXTERNAL | INTERNAL | | CONVERSION | | | | | EXTERNAL | | |
| HA | HB2 | HC2 | L | C1 | C2 ON | (A) | (%) | HA | HB2 | HC2 |
| ○ | x | ○ | 15 | 70 | AUTOMATIC | 0.6 | 2.7 | 8 | — | 30 |
| ○ | x | ○ | 15 | 90 | AUTOMATIC | 0.6 | 2.3 | 8 | — | 30 |
| ○ | x | ○ | 13 | 70 | AUTOMATIC | 0.6 | 2.5 | 8 | — | 25 |
| ○ | x | ○ | 13 | 90 | AUTOMATIC | 0.6 | 2.9 | 8 | — | 25 |
| ○ | x | ○ | 9 | 70 | AUTOMATIC | 0.6 | 2.4 | 8 | — | 20 |
| ○ | x | ○ | 9 | 90 | AUTOMATIC | 0.6 | 2.4 | 8 | — | 20 |
| ○ | x | ○ | 7 | 70 | AUTOMATIC | 0.6 | 2.7 | 8 | — | 15 |
| ○ | x | ○ | 7 | 90 | AUTOMATIC | 0.6 | 2.9 | 8 | — | 15 |

| SPARKING | | PROPERTIES | | | | | |
| --- | --- | --- | --- | --- | --- | --- | --- |
| FIRST HALF | SECOND HALF | HARDNESS | APPEARANCE | CONSISTENCY | EVALUATION | MOLDING | NOTE |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | ⊚ | |
| — | — | SOFT | GOOD | FINE | ⊚ | ○ | |
| — | — | SOFT | GOOD | FINE | ○ | ○ | |
| — | — | SOFT | KELOIDS | COARSE | ○ | ○ | * |
| — | — | SOFT | KELOIDS | COARSE | ○ | ○ | * |

*: MATCHING UNSTABLE

TABLE 52

| HEATING DEVICE | | | HC2 OUTPUT | | | AMPERAGE (A) | | MOLD TEMP. |
| --- | --- | --- | --- | --- | --- | --- | --- | --- |
| EXTERNAL | INTERNAL | | CONVERSION | | | | | |
| HA | HB2 | HC2 | L | C1 | C2 ON | SETTING 1 | SETTING 2 | (° C.) |
| ○ | x | ○ | 15 | 70 | AUTOMATIC | 0.6 | 1 | 180 |
| ○ | x | ○ | 15 | 100 | AUTOMATIC | 0.6 | 1 | 180 |
| ○ | x | ○ | 13 | 70 | AUTOMATIC | 0.6 | 1 | 180 |
| ○ | x | ○ | 13 | 100 | AUTOMATIC | 0.6 | 1 | 180 |
| ○ | x | ○ | 11 | 70 | AUTOMATIC | 0.6 | 1 | 180 |
| ○ | x | ○ | 11 | 100 | AUTOMATIC | 0.6 | 1 | 180 |
| ○ | x | ○ | 9 | 70 | AUTOMATIC | 0.6 | 1 | 180 |
| ○ | x | ○ | 9 | 100 | AUTOMATIC | 0.6 | 1 | 180 |

| LIQUID CONTENT | MOLDING TIME (sec.) | | | | | | |
| --- | --- | --- | --- | --- | --- | --- | --- |
| | EXTERNAL | | HC2 | | | | |
| (%) | HA | HB2 | SETTING 1 | SETTING 2 | PROPERTIES | MOLDING | NOTE |
| 2.5 | 3 | — | 10 | 10 | ⊚ | ○ | |
| 2.6 | 3 | — | 8 | 8 | ⊚ | ⊚ | |
| 2.5 | 3 | — | 8 | 8 | ⊚ | ⊚ | |
| 2.7 | 3 | — | 7 | 7 | ⊚ | ⊚ | |
| 2.4 | 3 | — | 7 | 7 | ⊚ | ⊚ | |
| 2.5 | 3 | — | 7 | 7 | ⊚ | ⊚ | |
| 2.7 | 3 | — | 7 | 7 | ○ | ○ | |
| 2.9 | 3 | — | 7 | 7 | ○ | ○ | |

TABLE 53

| HEATING DEVICE | | | HC2 OUTPUT | | | | | MOLD |
|---|---|---|---|---|---|---|---|---|
| EXTERNAL | INTERNAL | | | CONVERSION | | AMPERAGE (A) | | TEMP. |
| HA | HB2 | HC2 | L | C1 | C2 ON | SETTING 1 | SETTING 2 | (° C.) |
| ○ | x | ○ | 15 | 70 | AUTOMATIC | 0.5 | 0.8 | 180 |
| ○ | x | ○ | 15 | 100 | AUTOMATIC | 0.5 | 0.8 | 180 |
| ○ | x | ○ | 13 | 70 | AUTOMATIC | 0.5 | 0.8 | 180 |
| ○ | x | ○ | 13 | 100 | AUTOMATIC | 0.5 | 0.8 | 180 |
| ○ | x | ○ | 11 | 70 | AUTOMATIC | 0.5 | 0.8 | 180 |
| ○ | x | ○ | 11 | 100 | AUTOMATIC | 0.5 | 0.8 | 180 |
| ○ | x | ○ | 9 | 70 | AUTOMATIC | 0.5 | 0.8 | 180 |
| ○ | x | ○ | 9 | 100 | AUTOMATIC | 0.5 | 0.8 | 180 |

| LIQUID CONTENT (%) | MOLDING TIME (sec.) | | | | PROPERTIES | MOLDING | NOTE |
|---|---|---|---|---|---|---|---|
| | EXTERNAL HA | HB2 | HC2 SETTING 1 | SETTING 2 | | | |
| 2.7 | 3 | — | 15 | 15 | ◉ | ◉ | |
| 2.3 | 3 | — | 12 | 12 | ◉ | ◉ | |
| 2.5 | 3 | — | 12 | 12 | ◉ | ◉ | |
| 2.9 | 3 | — | 10 | 10 | ◉ | ◉ | |
| 2.4 | 3 | — | 10 | 10 | ◉ | ◉ | |
| 2.4 | 3 | — | 8 | 8 | ◉ | ◉ | |
| 2.7 | 3 | — | 8 | 8 | ◉ | ◉ | |
| 2.9 | 3 | — | 8 | 8 | ◉ | ◉ | |

As with the thick molded objects (3.5 mm thickness) in Example 2, molding and properties of the molded objects were good, and stable molded objects could be obtained in a shorter time than with the thick molded objects.

Thickness of thin molded objects varies with output and the conditions set, but here it was possible to mold objects 1.5 mm in thickness. Consequently, when the molded objects are stacked they fit together better, thus improving their stackability, and simplifying storage and shipping in large quantities. Here, "stackability" indicates the height of the entire stack when a plurality of molded objects are stacked together, and a low total height is referred to as "good stackability."

By reducing the thickness of the molded objects, it was possible to further shorten molding time. With molded objects 1.5 mm in thickness, molding time could be shortened to one-half to one-third of that in Example 2 (3.5 mm thickness). Consequently, production efficiency can be improved.

As is evident from Table 50, with heating conditions of 0.9 A amperage, range of control of the L component and the C component is narrow, and since the constant current is high, molding is difficult to control. In contrast, as is evident from Table 51, with an amperage of 0.6 A, range of control of the L component and the C component is wider, and molded objects can be obtained stably.

In molding thin molded objects, if a constant output is always applied, it is difficult to attain molded objects with a uniform surface consistency. Accordingly, in the present Example, as is evident from Table 52, by slowly expanding the materials with a low output in the initial stage of heating, and then drying them with a high output, it was possible to efficiently and stably mold good molded objects. Further, as is evident from Table 53, when output was reduced for both setting 1 and setting 2, there was a wide range of control, and good molded objects could be obtained.

Further, when equivalent experiments were performed using molded objects of the same shape as object shape (4) but with a thickness of 1.0 mm, the range of control was narrowed, but good molded objects were obtained.

EXAMPLE 20

The present Example investigated molded objects having a thick shape. Specifications were as follows.

Material mixtures: No. 22 through No. 31.

Object shape: (8).

The heating method and results were as shown in Table 54.

TABLE 54

| HEATING DEVICE | | | HC2 OUTPUT | | | AMPERAGE | LIQUID | MOLDING TIME (sec.) | | |
|---|---|---|---|---|---|---|---|---|---|---|
| EXTERNAL | INTERNAL | | CONVERSION | | | | CONTENT | EXTERNAL | | |
| HA | HB2 | HC2 | L | C1 | C2 ON | (A) | (%) | HA | HB2 | HC2 |
| ○ | x | x | — | — | — | — | UNDER 3 | 240 | — | — |
| ○ | ○ | x | — | — | — | — | UNDER 3 | — | 180 | — |
| ○ | ○ | x | — | — | — | — | UNDER 3 | — | 160 | — |
| ○ | ○ | x | — | — | — | — | UNDER 3 | — | 140 | — |
| ○ | x | ○ | 11 | 60 | AUTOMATIC | 0.5 | UNDER 3 | — | — | 60 |

TABLE 54-continued

| | | | | | | | | | | |
|---|---|---|---|---|---|---|---|---|---|---|
| ○ | x | ○ | 11 | 80 | AUTOMATIC | 0.5 | UNDER 3 | — | — | 60 |
| ○ | x | ○ | 9 | 60 | AUTOMATIC | 0.5 | UNDER 3 | — | — | 55 |
| ○ | x | ○ | 9 | 80 | AUTOMATIC | 0.5 | UNDER 3 | — | — | 55 |
| ○ | x | ○ | 7 | 60 | AUTOMATIC | 0.5 | UNDER 3 | — | — | 50 |
| ○ | x | ○ | 7 | 80 | AUTOMATIC | 0.5 | UNDER 3 | — | — | 50 |
| ○ | x | ○ | 5 | 60 | AUTOMATIC | 0.5 | UNDER 3 | — | — | 45 |
| ○ | x | ○ | 5 | 80 | AUTOMATIC | 0.5 | UNDER 3 | — | — | 45 |

| PROPERTIES | | | | | |
|---|---|---|---|---|---|
| HARDNESS | APPEARANCE | CONSISTENCY | EVALUATION | MOLDING | NOTE |
| — | — | — | x | x | HALF-BAKED |
| — | — | — | x | x | HALF-BAKED |
| — | — | — | x | x | HALF-BAKED |
| — | — | — | x | x | HALF-BAKED |
| SOFT | GOOD | FINE | ◎ | ○ | |
| SOFT | GOOD | FINE | ◎ | ◎ | |
| SOFT | FAIR | FINE | ◎ | ◎ | |
| SOFT | FAIR | FINE | ○ | ○ | |
| SOFT | FAIR | FAIRLY FINE | ○ | ○ | |
| SOFT | FAIR | FAIRLY FINE | ○ | ○ | |
| SOFT | BURNED | SLIGHTLY BURNED | ○ | ○ | |
| SOFT | BURNED | SLIGHTLY BURNED | ○ | ○ | |

When molding by external heating, with thick molded objects, the surface thereof dries during baking, but since liquid tends to remain in the interior, the molded object has no strength, and cracking, etc. makes molding difficult. Moreover, with shapes such as that shown in FIGS. 19(a) and 19(b), whose thickness is not constant but varies greatly, there is marked uneven heating due to differences in thickness, making molding even more difficult.

With internal heating, on the other hand, molded objects with a uniform, fine texture can be prepared, even with thick molded objects, and molding is possible even with shapes like that shown in FIGS. 19(a) and 19(b), whose thickness is not constant but varies greatly.

In such a case, as is evident from Table 54, when molding thick objects, uniform molded objects could be obtained by slow heating at comparatively low output. If output is too strong, uneven heating occurs due to the thickness of the object, and burning may occur.

As discussed above, the first method of manufacturing starch-based biodegradable molded objects according to the present invention is a method of manufacturing molded objects by placing biodegradable materials including starch in a mold made up of first and second conductive mold halves and an insulating section therebetween, and applying across both mold halves alternating current from an alternating current power source, thus heating and expanding the materials by means of resistance heating and/or dielectric heating, in which the insulating section of the mold is provided with a vapor release section, pressure is reduced outside the mold, and the heating is performed while releasing vapor produced thereby through the vapor release section.

During heating and molding of the molded objects, a large amount of vapor is produced, and this vapor condenses in the vapor release section provided in the insulating section, causing insulation breakdown. However, with the foregoing method, by reducing pressure, condensation of the vapor is prevented. Consequently, insulation breakdown can be prevented.

The second method of manufacturing starch-based biodegradable molded objects is a method of manufacturing molded objects by placing biodegradable materials including starch in a mold made up of first and second conductive mold halves and an insulating section therebetween, and applying across both mold halves alternating current from an alternating current power source, thus heating and expanding the materials by means of resistance heating and/or dielectric heating, in which the insulating section of the mold is provided with a vapor release section, the vapor release section is heated during heating of the materials, and the heating of the materials is performed while releasing vapor produced thereby through the vapor release section.

During heating and molding of the molded objects, a large amount of vapor is produced, and this vapor condenses in the vapor release section provided in the insulating section, causing insulation breakdown. However, with the foregoing method, by heating the vapor release section, condensation of the vapor is prevented. Consequently, insulation breakdown can be prevented.

The third method of manufacturing starch-based biodegradable molded objects is either the first or second method above, in which external heating is also used to heat the materials.

By also using external heating, molding time can be further shortened.

With the foregoing method, heating can be performed even when it is difficult to heat using the other heating methods mentioned above because of complicated structures, such as ribs, which make it difficult to provide electrodes opposite one another, and to which, accordingly, it is difficult to apply a voltage. In such a case, it is sufficient to externally heat only those portions which are difficult to heat using the other heating methods mentioned above, and accordingly the structure of the external heating device can be made simpler than when molding by external heating alone. Further, the temperature control conditions for external heating may be more relaxed than when molding by external heating alone. Thus it is possible to obtain a desired final molded object within a wide external heating temperature range such as "from 100° C. through 230° C." Consequently, the structure of the external heating device can be further simplified in comparison with molding by external heating alone.

The fourth method of manufacturing starch-based biodegradable molded objects is any one of the first through third methods above, in which the materials have a composition with a weight ratio of 100 to 200 starch and 70 to 240 water, and water makes up 30% to 70% by weight of the whole.

Incidentally, it is preferable if water makes up 40% to 60% by weight. Further, additional materials selected, as necessary, from among strength/flexibility imparting agents, colorant, mold release agent, foaming agent, salts, water resistance imparting agents, etc., may be added with a weight ratio of 0 to 22 parts to the foregoing materials.

The fifth method of manufacturing starch-based biodegradable molded objects is any one of the first through fourth methods above, in which a water resistance imparting agent is coated onto the molded object.

With the foregoing method, by coating a water resistance imparting agent onto a molded object having a uniform surface condition free of traces of injection of the materials, the water-resistant film is strengthened, and water resistance is improved.

The sixth method of manufacturing starch-based biodegradable molded objects is any one of the first through fifth methods above, in which the molded object has a thickness of 1 mm through 50 mm.

The foregoing molded object can be applied to a variety of shapes, and, with regard to not only the thin molded objects but thick ones as well, molded objects with superior molding and properties can be manufactured.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

INDUSTRIAL APPLICABILITY

The present method of manufacturing starch-based biodegradable molded objects is capable of preventing insulation breakdown caused by condensation of large amounts of vapor produced by materials during heating and molding of starch-based biodegradable molded objects by means of resistance heating or dielectric heating.

We claim:

1. A method of manufacturing starch-based biodegradable molded objects by placing materials having biodegradability and including starch in a mold having first and second conductive mold halves and an insulating section therebetween, and applying across both said mold halves alternating current from an alternating current power source, thus heating and expanding said materials by means of resistance heating and/or dielectric heating, wherein:

said insulating section of said mold is provided with a vapor release section; and pressure is reduced outside said mold, and said heating is performed while releasing vapor produced thereby through said vapor release section.

2. The method of manufacturing starch-based biodegradable molded objects set forth in claim 1 wherein:

external heating is also used to heat said materials.

3. The method of manufacturing starch-based biodegradable molded objects set forth in claim 2, wherein:

heating of said materials is performed using for said mold a mold whose thickness in areas corresponding to portions of said materials which do not heat internally is thinner than in areas corresponding to portions of said materials which heat internally.

4. The method of manufacturing starch-based biodegradable molded objects set forth in claim 1, wherein:

heating of said materials is performed by maintaining constant an amperage of said alternating current.

5. The method of manufacturing starch-based biodegradable molded objects set forth in claim 1, wherein:

heating of said materials is performed using an amperage of said alternating current which is smaller during a latter stage of heating, when a quantity of liquid in said materials is small, than during an initial stage of heating, when the quantity of liquid in said materials is large.

6. The method of manufacturing starch-based biodegradable molded objects set forth in claim 1, wherein:

heating of said materials is performed using as a grounded side one of said first and second mold halves which has more pointed areas than the other of said first and second mold halves.

7. The method of manufacturing starch-based biodegradable molded objects set forth in claim 1, wherein:

said materials have a composition with a weight ratio of 100 to 200 starch and 70 to 240 water, and water makes up 30% to 70% by weight of the whole.

8. The method of manufacturing starch-based biodegradable molded objects set forth in claim 7, wherein:

in the composition of said materials, water makes up 40% to 60% by weight of the whole.

9. The method of manufacturing starch-based biodegradable molded objects set forth in claim 1, wherein:

heating of said materials is performed after forming a water-resistant film on the surface thereof.

10. The method of manufacturing starch-based biodegradable molded objects set forth in claim 9, wherein:

said materials are formed into a sheet shape by an extruder, said water-resistant film is laminated onto the surface thereof, and then heating is performed.

11. The method of manufacturing starch-based biodegradable molded objects set forth in claim 1, wherein:

said molded objects are coated with a water resistance imparting agent.

12. The method of manufacturing starch-based biodegradable molded objects set forth in claim 1, wherein:

heating of said materials is performed after adding a water resistant substance thereto.

13. The method of manufacturing starch-based biodegradable molded objects set forth in claim 12, wherein:

a water-resistant film is formed on the surface of said molded objects.

14. The method of manufacturing starch-based biodegradable molded objects set forth in claim 1, wherein:

said molded objects have a thickness of from 1 mm through 50 mm.

15. The method of manufacturing starch-based biodegradable molded objects set forth in claim 1, wherein:

heating of said materials is performed using an amperage of said alternating current which is smaller when said materials have not yet expanded due to said heating, than when said materials have expanded due to said heating.

16. A method of manufacturing starch-based biodegradable molded objects by placing materials having biodegradability and including starch in a mold having first and second conductive mold halves and an insulating section therebetween, and applying across both said mold halves alternating current from an alternating current power source, thus heating and expanding the materials by means of resistance heating and/or dielectric heating, wherein:

said insulating section of said mold is provided with a vapor release section; and said vapor release section is heated during heating of said materials, and heating of said materials is performed while releasing vapor produced thereby through said vapor release section.

17. The method of manufacturing starch-based biodegradable molded objects set forth in claim 16, wherein:

external heating is also used to heat said materials.

18. The method of manufacturing starch-based biodegradable molded objects set forth in claim 17, wherein:

heating of said materials is performed using for said mold a mold whose thickness in areas corresponding to portions of said materials which do not heat internally is thinner than in areas corresponding to portions of said materials which heat internally.

19. The method of manufacturing starch-based biodegradable molded objects set forth in claim 16, wherein:

heating of said materials is performed by maintaining constant an amperage of said alternating current.

20. The method of manufacturing starch-based biodegradable molded objects set forth in claim 16, wherein:

heating of said materials is performed using an amperage of said alternating current which is smaller during a latter stage of heating, when a quantity of liquid in said materials is small, than during an initial stage of heating, when the quantity of liquid in said materials is large.

21. The method of manufacturing starch-based biodegradable molded objects set forth in claim 16, wherein:

heating of said materials is performed using as a grounded side one of said first and second mold halves which has more pointed areas than the other of said first and second mold halves.

22. The method of manufacturing starch-based biodegradable molded objects set forth in claim 16, wherein:

said materials have a composition with a weight ratio of 100 to 200 starch and 70 to 240 water, and water makes up 30% to 70% by weight of the whole.

23. The method of manufacturing starch-based biodegradable molded objects set forth in claim 22, wherein:

in the composition of said materials, water makes up 40% to 60% by weight of the whole.

24. The method of manufacturing starch-based biodegradable molded objects set forth in claim 16, wherein:

heating of said materials is performed after forming a water-resistant film on the surface thereof.

25. The method of manufacturing starch-based biodegradable molded objects set forth in claim 24, wherein:

said materials are formed into a sheet shape by an extruder, said water-resistant film is laminated onto the surface thereof, and then heating is performed.

26. The method of manufacturing starch-based biodegradable molded objects set forth in claim 16, wherein:

said molded objects are coated with a water resistance imparting agent.

27. The method of manufacturing starch-based biodegradable molded objects set forth in claim 16, wherein:

heating of said materials is performed after adding a water-resistant substance thereto.

28. The method of manufacturing starch-based biodegradable molded objects set forth in claim 27, wherein:

a water-resistant film is formed on the surface of said molded objects.

29. The method of manufacturing starch-based biodegradable molded objects set forth in claim 16, wherein:

said molded objects have a thickness of from 1 mm through 50 mm.

30. The method of manufacturing starch-based biodegradable molded objects set forth in claim 16, wherein:

heating of said materials is performed using an amperage of said alternating current which is smaller when said materials have not yet expanded due to said heating, than when said materials have expanded due to said heating.

* * * * *